United States Patent
Mizuta et al.

(10) Patent No.: US 9,015,410 B2
(45) Date of Patent: Apr. 21, 2015

(54) STORAGE CONTROL APPARATUS UNIT AND STORAGE SYSTEM COMPRISING MULTIPLE STORAGE CONTROL APPARATUS UNITS

(75) Inventors: Rikiya Mizuta, Odawara (JP); Yuko Matsui, Odawara (JP); Masayuki Yamamoto, Sagamihara (JP); Shigeo Homma, Odawara (JP); Hiroshi Kawano, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1089 days.

(21) Appl. No.: 13/061,291

(22) PCT Filed: Jan. 5, 2011

(86) PCT No.: PCT/JP2011/000009
§ 371 (c)(1),
(2), (4) Date: Feb. 28, 2011

(87) PCT Pub. No.: WO2012/093417
PCT Pub. Date: Jul. 12, 2012

(65) Prior Publication Data
US 2012/0173813 A1    Jul. 5, 2012

(51) Int. Cl.
*G06F 12/00* (2006.01)
*G06F 3/06* (2006.01)

(52) U.S. Cl.
CPC ............ *G06F 3/0665* (2013.01); *G06F 3/0607* (2013.01); *G06F 3/0631* (2013.01); *G06F 3/067* (2013.01)

(58) Field of Classification Search
None
See application file for complete search history.

(56) References Cited

U.S. PATENT DOCUMENTS

| | | |
|---|---|---|
| 6,658,478 B1 | 12/2003 | Singhal et al. |
| 6,684,209 B1 | 1/2004 | Ito et al. |
| 7,337,350 B2 | 2/2008 | Mimatsu et al. |
| 7,441,095 B2 | 10/2008 | Tamura et al. |
| 7,555,601 B2 | 6/2009 | Yamagami |
| 7,587,551 B2 | 9/2009 | Fujibayashi et al. |
| 2006/0271758 A1 | 11/2006 | Innan et al. |
| 2007/0233997 A1 | 10/2007 | Kobara |
| 2008/0184000 A1 | 7/2008 | Kawaguchi |
| 2008/0263190 A1 | 10/2008 | Serizawa et al. |
| 2012/0005668 A1* | 1/2012 | Serizawa et al. .................. 718/1 |

OTHER PUBLICATIONS

Specification and Drawings of U.S. Appl. No. 12/918,608, filed Aug. 20, 2010.

* cited by examiner

*Primary Examiner* — Baboucarr Faal
(74) *Attorney, Agent, or Firm* — Mattingly & Malur, PC

(57) ABSTRACT

A first storage control apparatus unit has a first logical volume. A second storage control apparatus unit has a second logical volume, which is a virtual logical volume and is mapped to the first logical volume, and a third logical volume that is associated with the first logical volume. The second storage control apparatus unit receives, from a host, an I/O command which has information including, as information denoting an I/O-destination area, an ID of the second logical volume and an address of an area of the second logical volume. The second storage control apparatus unit identifies a logical volume having an area that serves as an entity of the I/O-destination area, and a storage control apparatus unit that has this logical volume.

11 Claims, 38 Drawing Sheets

FIG. 12

Virtual page management main table (#H1) 325M

| DP-LU ID | Virtual page address | Allocation status | Pool LU ID | Actual page address |
|---|---|---|---|---|
| 1 | 0x00 | Unallocated | – | – |
| | 0x01 | Allocated | A | 0x00 |
| | 0x02 | Unallocated | – | – |
| | 0x03 | Releasing | B | 0x01 |
| | 0x04 | Unallocated | – | – |
| | 0x05 | Allocated | C | 0x02 |
| | .. | .. | .. | .. |

Tier management table (#H1) 321

| LU ID | Coupling mode |
|---|---|
| 1 | First coupling mode |
| A | Third coupling mode |
| B | Third coupling mode |
| C | First coupling mode |

FIG. 14

Tier management table (#H0) 321

| LU ID | Coupling mode |
|---|---|
| 0 | Third coupling mode |
| Y | First coupling mode |

LU mapping table (#H1)    322

Third coupling mode

| LU ID (1501) | DKC ID (1502) | External LU ID (1503) | LU type (1504) |
|---|---|---|---|
| A | H0 | Y | Non-DP LU |
| B | H2 | X | Non-DP LU |

FIG. 16

LU mapping table (#H0)   322

| LU ID (1501) | DKC ID (1502) | External LU ID (1503) | LU type (1504) |
|---|---|---|---|
| | | Third coupling mode | |
| 0 | H1 | 1 | DP-LU |

FIG. 17

LU reverse mapping table (#H1) 323

| External LU ID 1701 | DKC ID 1702 | DP-LU ID 1703 |
|---|---|---|
| 1 | H0 | 0 |

FIG. 18

Consolidated LU mapping table (#H1)    1800

| Virtual DKC ID | Virtual LU ID | External DKC ID | External LU ID |
|---|---|---|---|
| H1 | A | H0 | Y |
| H1 | B | H2 | X |
| H0 | 0 | H1 | 1 |

Virtual page management sub-table (#H0)

325S

| 1901 | 1902 | 1903 | 1904 | 1905 | 1906 | 1907 | 1908 |
|---|---|---|---|---|---|---|---|
| DP-LU DKC ID | DP-LU ID | Virtual page address | Allocation status | Pool LU coupling mode | Pool LU DKC ID | Pool LU ID | Actual page address |
| H1 | 1 | 0x00 | Confirmation required | — | — | — | — |
| | | 0x01 | Allocated | Third coupling mode | H0 | Y | 0x00 |
| | | 0x02 | Confirmation required | — | — | — | — |
| | | 0x03 | Confirmation required | Third coupling mode | H2 | X | 0x01 |
| | | 0x04 | Confirmation required | — | — | — | — |
| | | 0x05 | Allocated | First coupling mode | — | — | — |
| | | .. | .. | | | .. | .. |

FIG. 20A

Actual page management table (#H1) 326

| Table pointer | Pool LU ID | Actual page address | Allocation status | DP-LU ID | Unallocated queue pointer |
|---|---|---|---|---|---|
| 0x0000 | A | 0x00 | Allocated | 1 | — |
| 0x0001 | | 0x01 | Unallocated | — | 0x1000 |
| 0x0002 | | 0x02 | Unallocated | — | 0x1002 |
| : | | : | : | : | : |
| 0x1000 | B | 0x00 | Unallocated | — | 0x2000 |
| 0x1001 | | 0x01 | Allocated | 1 | — |
| 0x1002 | | 0x02 | Unallocated | — | 0x2001 |
| : | | : | : | : | : |
| 0x2000 | C | 0x00 | Unallocated | — | 0x0002 |
| 0x2001 | | 0x01 | Unallocated | — | 0x3000 |
| 0x2002 | | 0x02 | Allocated | 1 | — |
| : | | : | : | : | : |
| 0x20FF | | 0xFF | Unallocated | — | — |

Top-of-queue management table (#H1) 327

| First-page pointer | Last-page pointer |
|---|---|
| 0x0001 | 0x20FF |

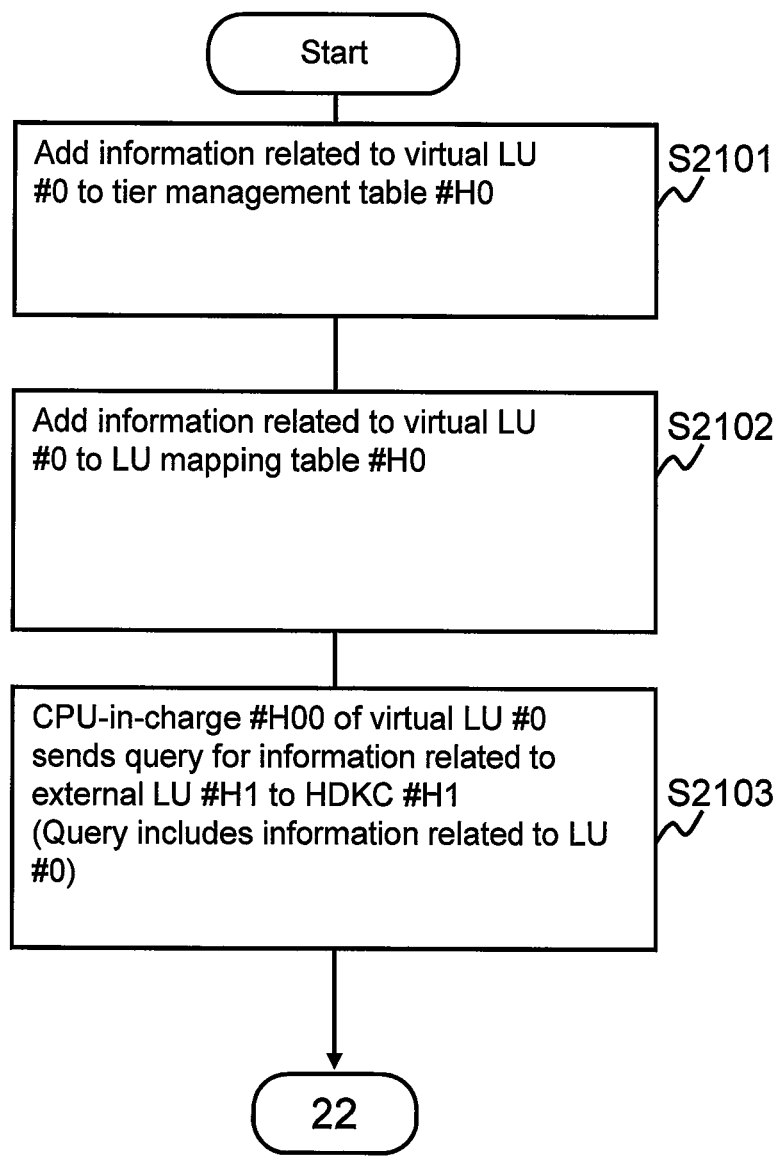

STORAGE CONTROL APPARATUS UNIT AND STORAGE SYSTEM COMPRISING MULTIPLE STORAGE CONTROL APPARATUS UNITS

TECHNICAL FIELD

The present invention relates to a storage control apparatus unit, and a storage system that comprises multiple storage control apparatus units. Furthermore, the present invention can cite the specifications and drawings of U.S. patent application Ser. No. 12/918,608 (and/or PCT/JP 2010/004621) (Matsui et al.) in the United States.

BACKGROUND ART

For example, in Patent Literature 1, there is disclosed a technology in which a low-performance disk array system is coupled to a high-performance disk array system, the high-performance disk array system virtualizes a logical volume inside the low-performance disk array system and provides this logical volume to a host device.

Furthermore, in Patent Literature 2, there is disclosed multiple intercoupled RAID (Redundant Array of Independent (or Inexpensive) Disks) controllers, and a technique for transferring data between multiple RAID controllers

CITATION LIST

Patent Literature

[PTL 1]
U.S. Pat. No. 7,441,095
[PTL 2]
U.S. Pat. No. 6,658,478

SUMMARY OF INVENTION

Technical Problem

But this literature does not take into account the differences in performance between multiple storage apparatuses, the distance between multiple storage apparatuses, and so forth.

Moreover, for example, using the same design for expansion in a case where a storage control apparatus comprising the same level of performance and/or functionality as an existing storage control apparatus (hereinafter, the existing apparatus) is added to this existing apparatus and in a case where a storage control apparatus comprising a different level of performance and/or functionality from this existing apparatus is added to this existing apparatus results in unnecessary load and waste being placed on the performance and/or functionality of the individual storage control apparatuses, raising the likelihood of a situation in which it is not possible to realize the performance and/or functionality appropriate for the system comprising the multiple storage control apparatuses as a whole.

Furthermore, for example, when installation space restrictions are taken into account, there also arises the need to construct a second data center by adding a storage control apparatus to a site other than a first data center where the existing apparatus is disposed. Since the distance between the sites can impact performance in this case, expansion that uses the same design as a case in which a storage control apparatus is added to the same site is likely to result in user-required performance not being met.

This is not only a problem at expansion time, but rather is a common problem that must also be taken into account at the time of an initial configuration that utilizes multiple storage control apparatuses.

Further, flexibly and efficiently linking multiple storage control apparatuses installed at either the same or different sites is seen as important for the construction, control and/or management of flexible and efficient storage systems in cloud environments as well.

Furthermore, for example, in a case where multiple storage control apparatuses are distributed among multiple sites, in prior art, the user (for example, the user of a computer that is accessing data stored in a storage control apparatus) has been aware of the distance between sites, resulting in a system configuration that lacks flexibility.

Therefore, an object of the present invention is to provide a storage system in which the difference in performance and/or functionality between multiple storage control apparatuses, and the distance between multiple storage control apparatuses, and so forth are taken into account.

Furthermore, another object of the present invention is to flexibly configure a system that comprises multiple storage control apparatuses.

Solution to the Problem

A storage system comprises multiple storage control apparatus units comprising first and second storage control apparatus units. Each storage control apparatus unit comprises one or more storage control apparatuses coupled to one or more hosts. The first storage control apparatus unit comprises a first logical volume. The second storage control apparatus unit comprises a second logical volume, which is a virtual logical volume that is mapped to the first logical volume, and a third logical volume that is associated with the first logical volume. The second storage control apparatus unit receives, from the host, an I/O command which comprises information including, as information denoting an I/O-destination area, an ID of the second logical volume and an address of an area of the second logical volume. The second storage control apparatus unit identifies a logical volume including an area that serves as an entity of the I/O-destination area, and a storage control apparatus unit that comprises this logical volume. In a case where the second storage control apparatus unit and the third logical volume have been identified, the second storage control apparatus unit carries out an I/O with respect to an area serving as the entity of the I/O-destination area in the third logical volume.

The third logical volume may be a logical volume based on a physical storage device of the second storage control apparatus unit, or may be a virtual logical volume mapped to a logical volume inside a storage control apparatus unit coupled to the second storage control apparatus unit.

BRIEF DESCRIPTION OF DRAWINGS

FIG. 12 shows the configuration of a virtual page management main table 325M (#H1).

FIG. 13 shows the configuration of a tier management table #H1.

FIG. 14 shows the configuration of a tier management table #H0.

FIG. 15 shows the configuration of a LU mapping table #H1.

FIG. 16 shows the configuration of a LU mapping table #H0.

FIG. 17 shows the configuration of a LU reverse mapping table #H1.

FIG. 18 shows the configuration of a consolidated LU mapping table 1800.

FIG. 19 shows the configuration of a virtual page management sub-table 325S (#H0).

FIG. 20A shows the configuration of an actual page management table 326 (for example, #H1). FIG. 20B shows the configuration of a queue management table 327 (#H1).

FIG. 21 shows a first part of an example of the flow of LU mapping processing.

DESCRIPTION OF EMBODIMENTS

A number of embodiments of the present invention will be explained below.

In the following explanation, various types of information will be explained using the expression "xxx table", but these various types of information may be expressed using a data structure other than a table. To show that the information is not dependent on the data structure, "xxx table" may be called "xxx information".

Further, an ID (identifier), a number or the like will be used as information for identifying some target in the following explanation, but identification is not limited to this, and other types of identification information may also be used.

In the following explanation, there may be instances when "program" is used as the subject in explaining a process, but since a prescribed process is performed in accordance with a program being executed by a processor (for example, a CPU (Central Processing Unit)) while using a storage resource (for example, a memory) and/or a communication interface device (for example, a communication port) as needed, the subject of the processing may also be the processor. The processor may comprise a hardware circuit for processing either all or a portion of a process performed by the processor. A computer program may be installed in respective computers from a program source. The program source, for example, may be a program delivery server or a storage medium.

<Configuration Storage System Related to First Embodiment of Present Invention>

Figure 1:
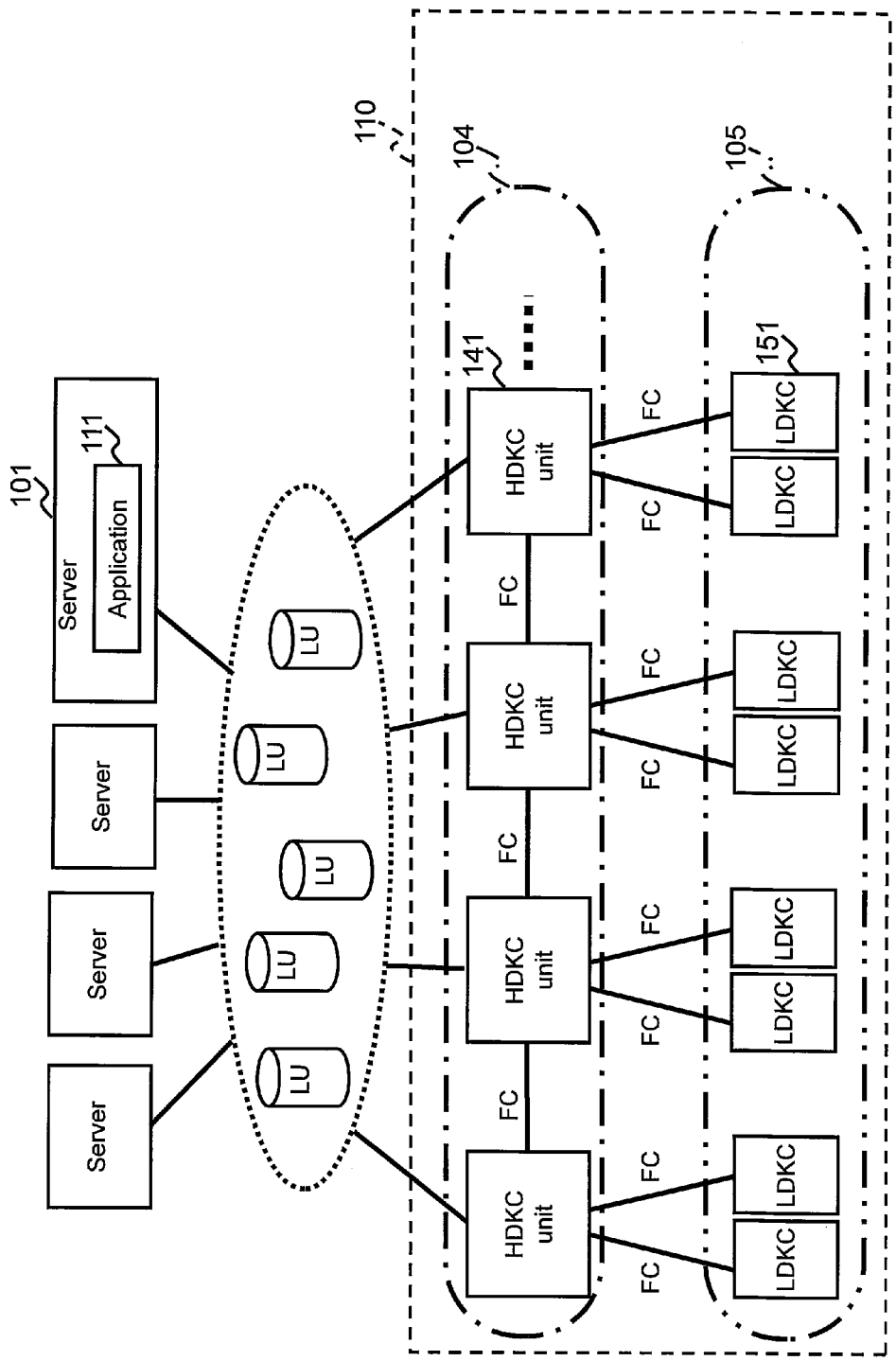
FIG. 1 shows the configuration of a storage system related to a first embodiment of the present invention.

FIG. 1 shows the configuration of a storage system related to a first embodiment of the present invention.

One or more servers 101 are coupled to a storage system 110. Each server 101, for example, is coupled to the storage system 110 via a communication network. The communication network, for example, is a FC (Fibre Channel) network, a LAN (Local Area Network), or the Internet.

The server 101 is one example of a host apparatus. The server 101, for example, comprises a communication interface device, which is coupled to the storage system 110, a storage resource, which stores a computer program, and a processor (typically a CPU (Central Processing Unit)), which is coupled to the communication interface device and the storage resource. The processor reads a computer program from the storage resource and executes this program. The computer programs are typically an OS (Operating System) and an application program 111. The application program 111 accesses a LU (Logical Unit) provided from the storage system 110. The LU is a logical storage device, and may be called a logical volume. Furthermore, either one or multiple servers 101 may comprise either one or multiple virtual servers inside the either one or multiple servers 101.

The storage system 110 comprises multiple storage control apparatuses. The storage control apparatus, for example, is an apparatus (for example, a disk array apparatus), which comprises a controller (hereinafter, the internal controller) that controls the storage of data in multiple physical storage mediums using RAID (Redundant Array of Inexpensive Disks) control. Since the physical storage medium may also be called a physical storage device, hereinafter this may be abbreviated as "PDEV" (Physical Device). The PDEV, for example, is a disk-type storage medium (for example, a HDD (Hard Disk Drive)). Accordingly, in the following explanation, the storage control apparatus may be called a disk control apparatus, and abbreviated as "DKC" (Disk Control Apparatus). In particular, a high-performance and/or high-functionality DKC may be called "HDKC" (High Performance and/or High Functionality DKC), a low-performance and/or low-functionality DKC (for example, a DKC with lower performance and/or lower functionality than the HDKC) may be called "LDKC" (Low Performance and/or Low Functionality DKC), and in a case where no particular distinction is made between the HDKC and the LDKC, the disk control apparatus may simply be called "DKC". The PDEV may be built into the HDKC and/or LDKC, or may be attached externally to the HDKC and/or the LDKC. In addition, the disk-type storage medium, for example, may also be a FC (Fibre Channel), a SAS (Serial Attached SCSI), an ATA (Advanced Technology Attachment), a SATA (Serial ATA) or other such drive. Furthermore, instead of a disk-type storage medium, the PDEV may also be another type of physical storage medium, such as, for example, a SSD (Solid State Drive), a semiconductor memory storage device/board, or the like.

The storage system 110 comprises a HDKC unit group 104, and a LDKC group 105, which is at a lower level than the HDKC unit group 104.

The HDKC unit group 104 comprises multiple HDKC units 141.

The HDKC unit 141 is configured from one or more HDKC. That is, the HDKC unit 141 may be the HDKC itself, or a set of multiple HDKCs. In the case of a HDKC unit 141 that is a set of multiple HDKCs, these multiple HDKCs, for example, are coupled in series. Two HDKCs are coupled to one another via a coupling medium (hereinafter, the internal bus) that enables short-distance coupling inside the HDKC unit 141. The internal bus, for example, is short, measuring a maximum of several meters in length. The internal bus, for example, is either a PCI bus or a PCI-Express (PCIe) bus. In this embodiment, the HDKC-to-HDKC coupling mode in the HDKC unit 141 is called the "first coupling mode". An internal bus according to the first coupling mode may be called the "first coupling medium" (or the first data transfer line).

Multiple HDKC units 141, for example, are coupled in series. An HDKC inside the HDKC unit 141 and an HDKC inside another HDKC unit 141 are coupled to one another via the long-distance coupling medium (hereinafter, the external bus). The external bus in this embodiment is a FC (Fibre Channel) cable, but a different coupling medium like FCoE (Fibre Channel over Ethernet) may be used instead. The coupling mode of an HDKC inside the HDKC unit 141 and an HDKC inside another HDKC unit 141 is called the "third coupling mode" in this embodiment. An external bus according to the third coupling mode may be called a "third coupling medium" (or a third data transfer line). Hereinbelow, in a case where a first HDKC is coupled to a second HDKC via the external bus (the third coupling medium) without going through another HDKC, the first HDKC is directly coupled to the second HDKC, and in a case where the first HDKC is coupled to the second HDKC via another HDKC and the external bus (the third coupling mode), the first HDKC and the second HDKC are indirectly coupled.

The LDKC group 105 comprises one or more LDKC 151. The LDKC 151 is coupled to the HDKC via the external bus. The coupling mode of the LDKC 151 and the HDKC in this embodiment is called the "second coupling mode". The external bus according to the second coupling mode may be called the "second coupling medium" (or the second data transfer line). The LDKC 151, for example, comprises multiple PDEV, and manages one or more LUs (Logical Units) based thereon. The LU is a logical storage device (a logical volume). The LU inside the LDKC is managed virtually as a LU inside the HDKC.

The server 101 is coupled to either one or multiple HDKCs via the external bus (a communication network), but the storage system 110 is able to perceive this as a single DKC that is virtually coupled to this server 101. Multiple LUs are provided to the server 101 from the HDKC (called the "target HDKC" in the explanation of FIG. 1) that is coupled to this server 101, but these multiple LUs, for example, may include at least one of (x1) through (x5) below.

(x1) A LU of the target HDKC.
(x2) A LU provided via the first coupling medium. That is, a LU of another HDKC inside the HDKC unit (the "target HDKC unit" in the explanation of FIG. 1) that comprises the target HDKC.
(x3) A LU provided via the third coupling medium. That is, a virtual LU mapped to a LU of another HDKC unit that is coupled either directly or indirectly to the target HDKC unit.
(x4) A LU provided via the second coupling medium. That is, a virtual LU mapped to a LU of a LDKC unit that is coupled to the target HDKC unit.
(x5) A LU provided via the second coupling medium and the third coupling medium. That is, a virtual LU mapped to a virtual LU (a virtual LU that is mapped to a LU of a LDKC unit that is coupled to another HDKC unit) of another HDKC unit.

The capacity and/or number of units of PDEV mounted to the DKC generally increases. For this reason, the storage capacity that the DKC supports also generally increases.

However, the performance and/or functionality of the DKC internal controller do/does not improve proportional to the increase in the DKC-supported storage capacity.

There are also discrepancies in the requirements (storage capacity, performance, number of ports) placed on the DKC by the users who utilize the storage system.

In a case where the storage system is constructed to meet the needs of a high-end user, the storage system comprises too much performance and/or functionality, and, in addition, is too high priced for the low-end user. Even in a case where the storage system is gradually built up from a small-scale system to a larger one, there is still a tendency for the initial installation costs to be high.

According to Patent Literature 2 mentioned above, coupling multiple DKCs or internal controllers together via an internal bus makes it possible to enhance scalability. However, for example, this gives rise to the following problems.
(1) The distance between the DKCs and/or between the internal controllers must be short (for example, no longer than several meters). A case in which the storage system is to be scaled up requires a large space on the same site. Insufficient space means the system will not be able to be expanded.
(2) The number of DKCs and/or internal controllers capable of being coupled together is restricted by the type of interface.

In this embodiment, either instead of or in addition to the first coupling medium, the HDKCs are coupled using the third coupling medium (the external bus), which enables long-distance coupling, and multiple HDKCs coupled via the third coupling medium are treated virtually as a single DKC. For this reason, it is possible to install multiple HDKCs in respectively separate locations, doing away with the need for a large amount of space on the same site. Furthermore, since there are no particular restrictions on the number of DKCs that can be coupled together, scalability improves.

This makes it possible to provide a technology that enables the realization of a flexible and efficient scale-out from a small-scale configuration to a large-scale configuration while reducing the initial installation costs. Furthermore, flexibly and efficiently linking multiple storage control apparatuses (for example, a HDKC unit 141, a HDKC and/or a LDKC 151) installed at either the same or different sites is a necessary and important technology for constructing, controlling and/or managing flexible and efficient storage systems in a cloud environment.

The storage system 110 comprises either HDKCs or LDKCs, but can be perceived by the server 101 as a single DKC comprising multiple LUs. In accordance with this, even when an additional HDKC is added, the higher-level device with respect to the HDKC (for example, the server or a switch configuring a communication network) do not recognize the addition of the HDKC, but rather only the addition of a front-end communication port (hereinafter, the FE port). The FE port is a communication port of a HDKC and is coupled to a front-end device. The front-end device means a device located outside the HDKC and, for example, is a server, a switch inside a communication network, a HDKC coupled using the first coupling mode, a HDKC coupled using the third coupling mode, or a LDKC coupled using the second coupling mode.

Furthermore, the storage system may be perceived by the server 101 not as a single DKC, but rather as multiple DKCs. Also, in a case where a HDKC has been added, the server 101 may be aware of the fact that the HDKC has been added.

For the HDKC, "high performance and/or high functionality" may be performance that is higher than a first performance threshold and/or a prescribed type of functionality, or performance and/or functionality that are higher than the performance and/or functionality of another DKC (performance and/or functionality that are practically the same level as those of another DKC). Furthermore, the HDKC is not limited to a disk array apparatus, and may be another type of storage control apparatus (for example, an intelligent switch that comprises a storage virtualization function).

Technical objects related to the HDKC, for example, are (a) through (d) below.
(a) To provide a control method and a post-coupling utilization method for when multiple HDKCs are coupled;
(b) to provide a control method and a post-coupling utilization method for when a HDKC is similarly coupled to a site that differs from that of a certain HDKC;
(c) when coupling multiple HDKCs, to appropriately manage the tier levels and other such attributes of the LUs created in the HDKCs that are to be coupled and to provide an appropriate post-coupling utilization method in accordance with the coupling relationship and distance between the respective DKCs (a "tier" will be explained hereinbelow); and
(d) when coupling a certain HDKC to other multiple HDKCs, to appropriately manage the tier levels and other such attributes of the LUs created for each of the other HDKCs and to provide an appropriate post-coupling utilization method in accordance with the differences in performance between these other multiple HDKCs and the distance from this certain HDKC.

For the LDKC, "low performance and/or low functionality" may be performance that is lower than a second performance threshold and/or a prescribed type of functionality, or performance and/or functionality that is lower than the performance and/or functionality of the other DKC (practically the same levels of performance and/or functionality as the other DKC). The second performance threshold may be equal to or lower than the first performance threshold. Furthermore, the LDKC is not limited to a disk array apparatus, but rather may be another type of storage control apparatus.

Technical objects related to the LDKC, for example, are (p) and (q) below.
(p) When coupling a certain HDKC and a LDKC, to appropriately manage the tier level and other such attributes of the LU created in the LDKC and to provide an appropriate post-coupling utilization method in accordance with the difference in performance and distance between the respective DKCs; and
(q) when coupling a certain HDKC to multiple LDKC, to appropriately manage the tier levels and other such attributes of the LUs created for each LDKC and to provide an appropriate post-coupling utilization method in accordance with the difference in performance between these multiple LDKC and the distance from the HDKC.

Figure 2:
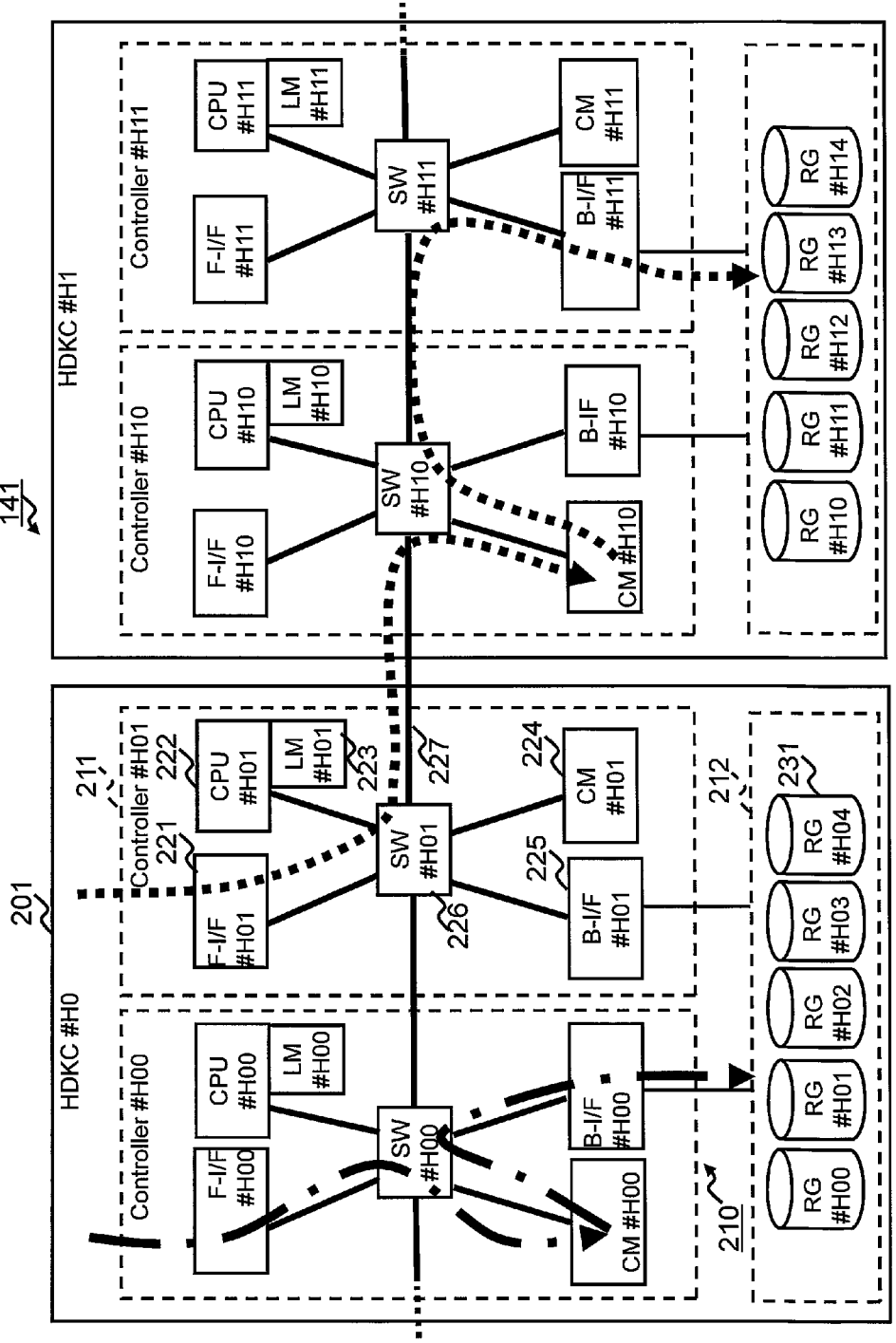
FIG. 2 shows two HDKCs (high-performance and/or high-functionality storage control apparatuses (DKC (Disk Control Apparatus))) in a first coupling mode.

The respective coupling modes will be explained next.
<First Coupling Mode>
FIG. 2 shows two HDKCs that have been coupled using the first coupling mode.

Reference signs and IDs have been assigned to the hardware elements in FIG. 2. In the following explanation, when making a distinction between elements of the same type, the elements will be represented by using the ID (for example, HDKC #H0), and when no particular distinction is made between same type elements, the elements will be represented using the reference signs (for example, HDKC 201).

The ID of the HDKC is a combination (a two-part sign) of an alphabet letter "H" and a single digit numeral, but in a case where the HDKC includes multiple hardware elements of the same type, the multiple hardware elements of the same type may be distinguished using a three-part sign (ID) that includes this HDKC ID in the higher level. Specifically, for example, the IDs of the two CPUs of the HDKC #H0 are H00 and H01. Furthermore, in a case where "CPU #H0" is used as an inclusive code, CPU #H0 is at least one of CPU #H00 and #H01. This is not limited to the CPU, but rather holds true for the other types of hardware elements as well.

The HDKC 201 can be broadly divided into a PDEV group and an internal controller.

The PDEV group comprises one or more RG 231. The RG 231 is a RAID (Redundant Array of Independent (or Inexpensive) Disks) group, and is configured from two or more PDEV.

The internal controller, for example, is configured from two controller modules 211. There may also be one, or three or more controller modules 211 in a single HDKC 201.

The controller module 211 comprises a front interface (F-I/F) 221, a backend interface (B-I/F) 225, a cache memory (CM) 224, a CPU 222, a switch (SW) 226, and a local memory (LM) 223.

The F-I/F 221 is a communication interface device that couples to the server 101. The F-I/F 221 comprises either one or multiple higher-level ports. The higher-level port is a communication port that couples to a higher-level device, such as a server or a switch.

The B-I/F 225 is a communication interface device that couples to one or more RG 231.

The CM 224 temporarily stores data that is to be written to the RG 231 and data that has been read from the RG 231. At least one CM 224 may comprise a storage area that is used as the shared memory (SM) of multiple controller modules (an SM area) in addition to a storage area that is used as the cache memory (CM area).

The LM 223 may store information to be used in the CPU 222 and a computer program to be executed by the CPU 222.

The LM 223 is coupled to the CPU 222 and is not coupled to the SW 226, but the LM 223 may also be coupled to the SW 226.

The CPU 222 is able to execute a computer program (hereinafter, the control program) that is stored in the LM 223. The control program may be stored in another storage resource either instead of or in addition to the LM 223.

The SW 226 is coupled to the F-I/F 221, the CPU 222, the CM 224, the B-I/F 225, and the SW 226 inside the nearest other controller module 211. The SW 226 switches the connections between these elements. The interface between the SW 226 and the respective elements, for example, is PCI-Express (PCIe).

Two SWs 226 (for example SW #H00 and #H01) inside two controller modules 211 are coupled via an internal bus 227 in a single HDKC. Similarly, two SWs 226 (SW #H01 and #H10) inside separate HDKCs #H0 and #1, which are coupled using the first coupling mode, are coupled via the internal bus 227.

In accordance with this configuration, it is possible to make shared use of the hardware elements inside multiple controller modules 211 and the RG 231 inside multiple HDKCs 201 in the HDKC unit 141. In addition, management information (for example, one or more tables that will be explained hereinbelow) inside the multiple HDKCs 201 may also be shared. For this reason, it is possible to manage the information of multiple HDKCs 201 using a single internal controller (or one controller module), and the HDKC unit 141 is able to behave like a single HDKC. For example, the CPU #H01 is able to access any of the CMs #H00, #H10 and #H11 the same as accessing the CM #H01. In addition, the CPU #H01 is also able to perform I/O (Input/Output) with respect to any of RGs #H10 through #H14 the same as it performs I/O with respect to the RGs #H00 through #14.

Specifically, for example, in a case where the controller module 211, which receives a write command with respect to the LU corresponding to a specified LUN (Logical Unit Number) from the server 101, and the write-destination RG 231 according to this write command are inside the same HDKC 201, data may be written to the RG 231 using the flow indicated by the dashed-dotted line. That is, the controller module #H00 that received the write command (it may also be a different controller module) writes the data to the CM #H00 (may also be a different CM), and writes the data inside the CM #H00 to the write-destination RG #H01. Furthermore, the present invention is not limited to this process, and a different controller module than the controller module that received the I/O command may perform the I/O with respect to the I/O-destination RG.

Further, for example, in a case where the controller module 211, which receives the write command, and this write-destination RG 231 are inside different HDKCs 201, the data may be written to the RG 231 using the flow indicated by the dotted line. That is, the controller module #H01 that received the write command (may also be another controller module) may write the data to the CM #H10 (may also be another CM) by way of the SWs #H01 and #H10, and the controller module #H10 (may also be another controller module) may write the data inside the CM #H10 to the write-destination RG #H13 by way of the SWs #H10 and #11.

Furthermore, the LU that provides the HDKC unit 141 to the server 101 may be a virtual LU according to Thin Provisioning.

When a controller module inside one HDKC accesses a controller module or RG inside another HDKC, there is no need to reference the LU mapping table, which will be explained hereinbelow. This is because each controller module in the HDKC unit is able to access the hardware elements (for example, the CM and the RG) inside a different HDKC from the HDKC that comprises this controller module the same as if the hardware elements were inside this controller module's HDKC.

As described above, since the controller modules and HDKCs in the HDKC unit 141 are coupled via an internal bus, the distance between the controller modules and the distance between the HDKCs are short compared with a case of external bus coupling.

The preceding has been an explanation of the first coupling mode. Furthermore, the LDKC may also comprise an internal controller and a PDEV group. The configuration of the LDKC may be same configuration as that of the HDKC. The configuration of the internal controller of the LDKC may differ from the configuration of the HDKC internal controller.

In the United States, U.S. Pat. No. 7,587,551 (Fujibayashi et al.) and/or US Patent Application Publication No. 2008/0263190 (Serizawa et al.) (specification and drawings) are cited in relation to the first coupling mode. The storage apparatus disclosed in at least one of these publications may be applied to the HDKC and/or HDKC unit.

<Second Coupling Mode>

Figure 3:
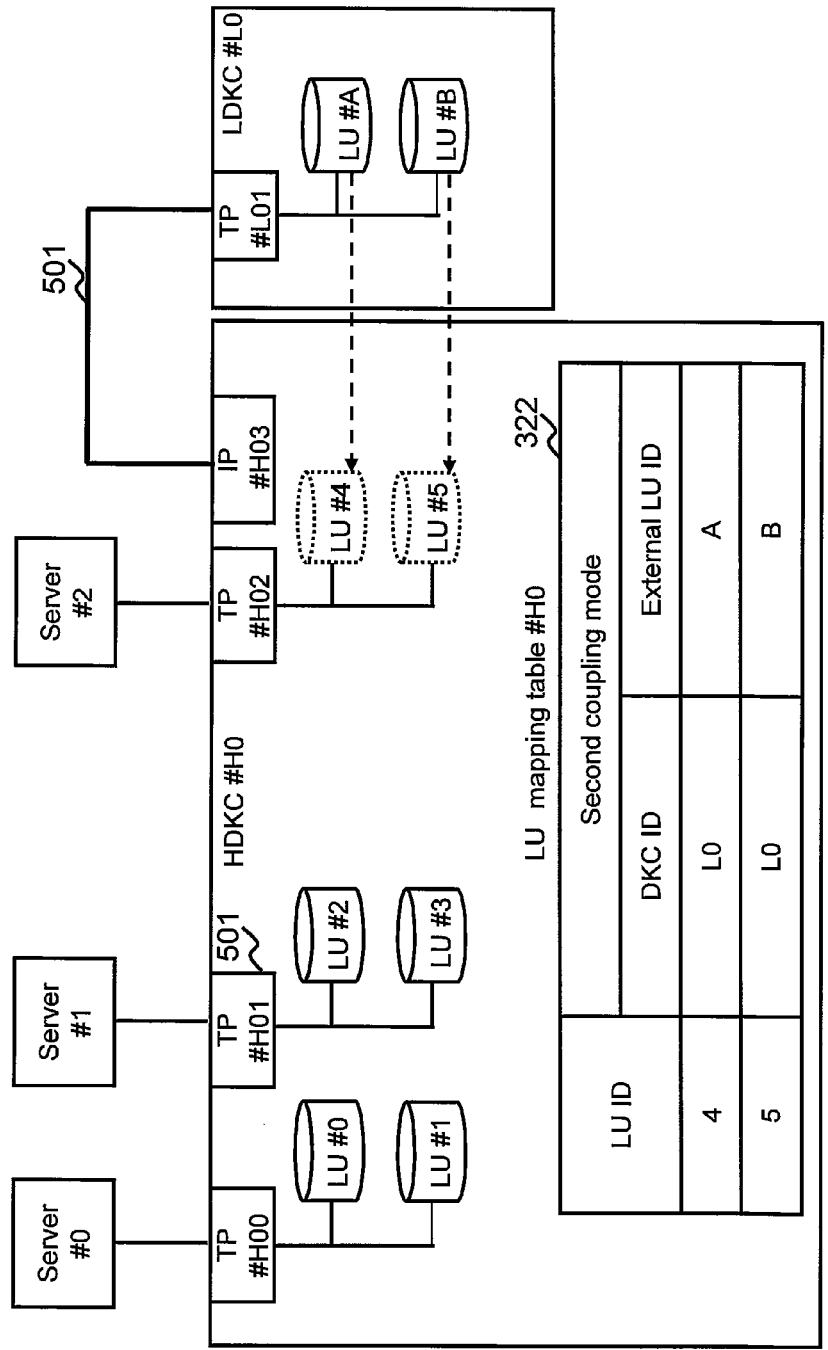
FIG. 3 shows an example of LU (Logical Unit) mapping according to a second coupling mode.

FIG. 3 shows an example of LU mapping according to the second coupling mode. Hereinbelow, the HDKC and its elements and the LDKC and its elements may be explained using element IDs instead of reference signs. Also, in the following explanation, the internal controller of the DKC #x may be referred to as "internal controller #x". Furthermore, a LU in the second DKC, which is mapped in accordance with either the second or the third coupling mode to a LU in the first DKC, may be called an "external LU".

The DKC internal controller comprises multiple FE ports (Front-end communication ports) 501. The multiple FE ports 501 may comprise at least one of an FE port that becomes an initiator (the initiator port), an FE port that becomes the target (the target port), and an FE port that becomes both the initiator and the target (the initiator/target port). Hereinbelow, the initiator port may be expressed as "IP", the target port may be expressed as "TP", and the initiator/target port may be expressed as "ITP" as in the drawings. The FE port is in the F-I/F (refer to FIG. 2) of the HDKC.

A server (for example, #0) couples to the target port (for example, #H00) of the HDKC #H0. Two or more servers may be coupled to one target port.

The initiator port #H03 of the HDKC #H0 couples to the LDKC #L0 (#L01 is the target port thereof). The LDKC #L0 comprises LUs #A and #B. At least one of the LUs #A and #B may be a virtual LU according to Thin Provisioning. Thin Provisioning may also be called Dynamic Provisioning. Accordingly, a virtual LU according to Thin Provisioning may be referred to as "DP-LU" hereinbelow.

The LUs #4 and #5 are associated with the target port #H02, and the server #02 is coupled to the target port #H02. The server #02 is able to issue an I/O command that specifies LU #4 and/or #5.

External LU #A is mapped to LU #4, and external LU #B is mapped to LU #5. That is, LUs #4 and #B are virtual LUs.

According to the second coupling mode, the HDKC #H0 is able to treat the external LUs #A and #B inside the LDKC #L0 that is coupled to the initiator port #H03 virtually as LUs #4 and #5. The corresponding relationship between virtual LU #4 (#5) and external LU #A (#B) can be identified from the LU mapping table 322 (#H0). The LU mapping table 322 (#H0) comprises information related to the external LUs that are mapped to the virtual LUs inside the HDKCs that comprise this table. Specifically, the LU mapping table #0 comprises the following information for each virtual LU:
(*) The ID of the DKC that comprises an external LU mapped to a virtual LU; and
(*) the ID of this external LU.

The LU mapping table #H0 is stored in a storage resource (for example, the LM or the CM) inside the internal controller #H0. In a case where the LU #4 has been specified by an I/O command from the server #2, the internal controller #H0 (CPU#H0 (either CPU #H00 or #H01)) identifies the fact that the LU #A is mapped to the LU #4 from the LU mapping table #H0, and sends the I/O command specifying the identified LU #A to the LDKC #L0. This enables the I/O to be performed with respect to the LU #4 (LU #A).

Furthermore, the external LU mapped to one virtual LU is not limited to one external LU of one LDKC, but rather multiple external LUs of one LDKC, and either one or multiple external LUs provided from respective LDKCs (multiple external LUs provided across multiple LDKCs) may be mapped to a single virtual LU. In these cases, multiple external LU IDs are included in the ID of the above-mentioned external LU.

According to the second coupling mode, the HDKC #H0 may treat the LDKC #L0 the same as the PDEV of the HDKC #H0. A server may or may not be coupled to the FE port of the LDKC #L0. According to the second coupling mode, although the HDKC #H0 comprises a virtual LU to which the LU inside the LDKC #L0 is mapped, the LDKC #L0 does not comprise a virtual LU to which the LU inside the HDKC #H0 is mapped.

According to the second coupling mode, the virtual LUs #4 and #5 have more overhead than the LU (for example, LU#0) based on the RG inside the HDKC #H0 due to the fact that access is by way of the external bus 501 (the external bus 501 may go by way of an external switch (for example, a FC (Fibre Channel)) switch). For this reason, the virtual LUs #4 and #5 may be used as a lower tier (for example, either a mid-level tier or a lower-level tier) that is lower than the LU based on the RG inside the HDKC #H0. Furthermore, in the second embodiment, which will be explained below, load distribution is performed, but a virtual LU according to the second coupling mode, for example, may be a load distribution-source LU (a data migration-source LU) belonging to the mid-level tier and/or the lower-level tier, and/or a load distribution-destination LU (a data migration-destination LU) belonging to the mid-level tier and/or the lower-level tier. In a load distribution, for example, in a case where a virtual LU has been migrated from a first HDKC to a second HDKC by way of the third coupling medium, the data inside a first external LU (the LU inside a first LDKC) that is mapped to this virtual LU may be migrated to a second LU (the LU mapped to the virtual LU inside the second HDKC) inside a second LDKC that is coupled to the second HDKC.

Also, for example, an external LU (a LU inside the LDKC), which has been mapped according to the second coupling mode, may be mapped to at least one of the LU configuring a pool inside the HDKC #H0. Therefore, at least one of the one or more LUs (pool LUs) configuring the pool may be a virtual LU. The HDKC #H0 may comprise a DP-LU (a virtual LU according to Dynamic Provisioning). In a case where data is to be written to a certain virtual page inside the DP-LU, the HDKC #H0 is able to allocate an actual page from the pool to this virtual page. The HDKC #H0 is able to write the data to the actual page. In a case where the virtual LU to which the external LU inside the LDKC #L0 is mapped comprises this actual page, the data to be written to the actual page is written to a storage area inside the external LU corresponding to this actual page.

Furthermore, a HDKC may be coupled to a HDKC by way of the second coupling medium either instead of or in addition to the LDKC.

Furthermore, the same one or multiple LDKCs may be coupled to multiple HDKCs 201 in one HDKC unit 141. In accordance with this, each of the multiple HDKCs in the one HDKC unit 141 may provide to either one or multiple servers 101 multiple virtual volumes (the first virtual LU and the second virtual LU) to which is mapped this same LU (the first LU) by using the same LU (first LU) in the same either one or multiple LDKCs. Each of the multiple HDKCs in the one HDKC unit 141 may also provide to either one or multiple servers 101 different virtual volumes (the third virtual LU and the fourth virtual LU) to which are respectively mapped different LUs (the second LU and the third LU) by using these different LUs (the second LU and the third LU) in the same either one or multiple LDKCs.

Of these, in a case where each of the multiple HDKCs in the one HDKC unit 141 provide to either one or multiple servers 101 multiple virtual volumes (the first virtual LU and the second virtual LU) to which the same LU (the first LU) is mapped, these multiple virtual volumes (the first virtual LU and the second virtual LU) are used for either a failover or a load distribution.

As a concrete example of the use of these multiple virtual volumes in a failover, the multiple HDKCs in the one HDKC unit 141 and/or the management device (device which manages respective HDKCs) manage(s) both an active ordinary path for reading and/or writing the data of the first LU from either one or multiple servers 101 via the first virtual LU, and either an active or a passive alternate path for reading and/or writing the data of the first LU from the either one or multiple servers 101 via the second virtual LU, implement(s) a data write to the first LU and/or a data read from the first LU by processing a write command and/or a read command sent from the either one or multiple servers 101 using the above-mentioned alternate path in accordance with the failure of the above-mentioned ordinary path, and return(s) a write-complete response and/or a read-complete response to either the one or multiple servers 101. Since each of the multiple HDKCs in the one HDKC unit 141 comprises a cache memory 224, at this time, after writing the write-data and/or reading the data to the cache memory 224 inside the HDKC by processing the write command and/or the read command and returning the write-complete response and/or the read-complete response to the either one or multiple servers 101 via the above-mentioned ordinary path and/or alternate path, the multiple HDKCs in the one HDKC unit 141 may implement a data write to the first LU and/or a data read from the first LU. In the US, the specifications and drawings of U.S. Pat. No. 7,337,350 (Mimatsu et al.) may be cited with respect to this specific processing. In this case, the technology of the present application is applied such that the Host Computer of these specifications and drawings corresponds to the either one or multiple servers 101 of the present application, the Storage System 2 and the Storage System 3 of these specifications and drawings respectively correspond to the multiple HDKCs in the one HDKC unit 141 of the present application, and the Storage System 1 of these specifications and drawings corresponds to the LDKC comprising the same LU (the first LU) of the present application.

Further, the following can be cited as a concrete example of the use of these multiple virtual volumes in a load distribution. The multiple HDKCs in the one HDKC unit 141 and/or the management device manage(s) both a path for reading and/or writing the data of the first LU from either one or multiple servers 101 by way of the first virtual LU and a path for reading and/or writing the data of the first LU from either one or multiple servers 101 by way of the second virtual LU, and in accordance with the respective loads of the multiple HDKCs in the one HDKC unit 141, change(s) the processing that had been implemented using the one path of the above-mentioned multiple paths such that the processing is implemented using the other path of the above-mentioned multiple paths. The processing referred to here is for implementing a data write to the first LU and/or a data read from the first LU by processing a write command and/or a read command sent from the either one or multiple servers 101 and returning a write-complete response and/or a read-complete response to either the one or multiple servers 101. Since each of the multiple HDKCs in the one HDKC unit 141 comprises a cache memory 224, at this time, after writing the write-data and/or reading the data to the cache memory 224 inside the HDKC by processing the write command and/or the read command and returning the write-complete response and/or the read-complete response to the either one or multiple servers 101 by way of the above-mentioned multiple paths, the multiple HDKCs in the one HDKC unit 141 may implement a data write to the first LU and/or a data read from the first LU. In the US, the specifications and drawings of US Patent Application Publication No. 2006/0271758 (Innan et al.) may be cited with respect to this specific processing. In this case, the technology of the present application is applied such that the Host Device of these specifications and drawings corresponds to the either one or multiple servers 101 of the present application, the Virtualization Storage Device 1 and the Virtualization Storage Device 2 of these specifications and drawings respectively correspond to the multiple HDKCs in the one HDKC unit 141 of the present application, and the External Storage Device of these specifications and drawings corresponds to the LDKC comprising the same LU (the first LU) of the present application. Furthermore, in a case where multiple servers 101 are used in the specific examples of using the multiple virtual volumes in either a failover or a load distribution, these multiple servers 101 may correspond to servers included in a cluster relationship, in which case the processing is passed between the multiple servers 101 when either using the above-mentioned failover alternate path or using the above-mentioned load distribution other path.

At this time, either the one or multiple servers 101 may correspond to either the one or multiple virtual servers in the either one or multiple servers 101. In a case where one virtual server is used between the either one or multiple servers 101, the virtual server is migrated between the either one or multiple servers 101 when either using the above-mentioned failover alternate path or using the above-mentioned load distribution other path. In a case where multiple virtual servers are used between the either one or multiple servers 101, processing is passed between the multiple virtual servers of the either one or multiple servers 101 when either using the above-mentioned failover alternate path or using the above-mentioned load distribution other path. In this case, the failover or the load distribution may be implemented by the HDKC unit 141 or the management device determining or deciding which of the multiple HDKCs is to be the Source or the Destination of the failover or the load distribution in accordance with the performance, status (presence or absence of a failure, extent of a failure, and so forth) and/or the load of each of the multiple HDKCs in the one HDKC unit 141, or the differences in the performance, the differences in the status (presence or absence of a failure, the extent of the failure, and so forth) and the differences in the distance and/or load between the multiple HDKCs. Furthermore, the above-mentioned distance is not limited to an actual distance, but rather may be a command transceiving time, a command response time and/or a command processing time.

Furthermore, either the same one or multiple LDKCs may be coupled to multiple HDKC units 141. In this case as well, the same mode, concrete example, and citations will be applied as in the case where either the same one or multiple LDKCs is/are coupled to the multiple HDKCs 201 in the one HDKC unit 141. However, the multiple HDKCs in the one HDKC unit 141 are re-read and applied to multiple HDKC units 141. In this case, the failover or load distribution is implemented by the multiple HDKC units 141 or the management device determining or deciding which one of the multiple HDKC units 141 is to be the Source (a failover source or a load distribution source) or the Destination (the failover destination or the load distribution destination) of the failover or the load distribution in accordance with the performance, status (presence or absence of a failure, extent of a failure, and so forth) and/or the load of each of the multiple HDKC units 141, or the differences in the performance, the differences in the status (presence or absence of a failure, the extent of the failure, and so forth) and the differences in the distance and/or load between the multiple HDKC units 141. Furthermore, the above-mentioned distance is not limited to an actual distance, but rather may be a command transceiving time, a command response time and/or a command processing time (these will be explained in detail using the portion of the specifications corresponding to FIG. 10). Furthermore, in a case where the above-mentioned either one or multiple LDKCs is/are coupled to the multiple HDKCs 201 in the one HDKC unit 141, whereas the HDKC unit 141 or the management device determines or decides (does not take into account the performance or distance) which one of the multiple HDKCs is to be the Source or the Destination of the failover or the load distribution in accordance with the status (presence or absence of a failure, extent of a failure, and so forth) and/or the load of each of the multiple HDKCs in the one HDKC unit 141, or the differences in the status (presence or absence of a failure, the extent of the failure, and so forth) and/or the differences in the load between the multiple HDKCs, in a case where either the same one or multiple LDKCs is/are coupled to multiple HDKC units 141, the HDKC unit 141 or the management device may exercise control so as to determine or decide which one of the multiple HDKC units 141 is to be the Source or the Destination of the failover or the load distribution in accordance with the performance, the status (presence or absence of a failure, extent of a failure, and so forth) and/or the load of each of the multiple HDKC units 141, or the differences in the performance, and the differences in the status (presence or absence of a failure, the extent of the failure, and so forth) and/or the differences in the load between the multiple HDKC units 141.

The specification and drawings of U.S. Pat. No. 7,441,095 (Tamura et al.) is cited in relation to the second coupling mode in the United States. In accordance with this, First Storage Controller corresponds to the HDKC unit 141 of the present specification, and Second Storage Controller corresponds to the LDKC 151 of the present specification.

<Third Coupling Mode>

Figure 4:
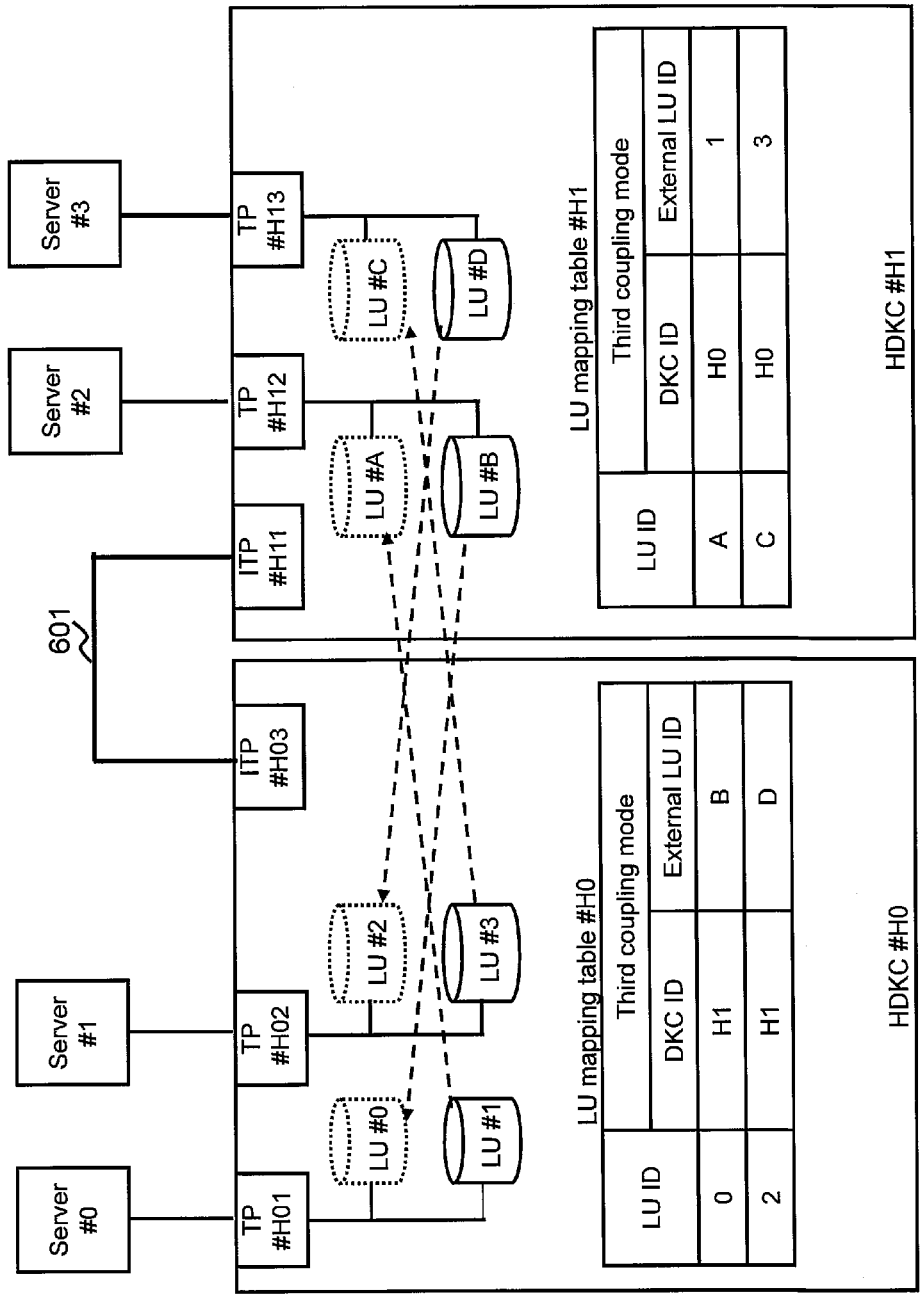
FIG. 4 shows a first example of LU mapping according to a third coupling mode.

FIG. 4 shows a first example of LU mapping according to the third coupling mode.

The HDKCs #H0 and #1 comprise target ports and initiator/target ports as the FE ports. The FE port is in the F-I/F (refer to FIG. 2) as described hereinabove.

A server (for example, #0) is coupled to the target port (for example, #H01) of the HDKC #H0, and a server (for example, #2) is coupled to the target port (for example, #H12) of the HDKC #H1.

The initiator/target port #H03 of the HDKC #H0 and the initiator/target port #H11 of the HDKC #H1 are coupled via an external bus 601 (the external bus 601 may go by way of an external switch (for example, a FC (Fibre Channel)) switch). That is, according to the third coupling mode, the HDKC #H0 may issue an I/O command to the HDKC #H1, and the HDKC #H1 may issue an I/O command to the HDKC #H0. This is because, when a LU inside the HDKC #H0 is mapped to a virtual LU inside the HDKC #H1, a LU inside the HDKC #H1 is also mapped to a virtual LU inside the HDKC #H0. According to FIG. 4, the LU #1 is mapped to the virtual LU #A, and the LU #3 is mapped to the virtual LU #C. In addition, the LU #B is mapped to the virtual LU #0, and the LU #D is mapped to the virtual LU #2. According to FIG. 4, the virtual LUs and the LUs mapped to the virtual LUs are associated with the target ports.

The HDKC #H0 comprises the LU mapping table #H0, and the HDKC #H1 comprises the LU mapping table #H1. The LU mapping table #H0 comprises information related to the external LU #B (#D), which is mapped to the virtual LU #0 (#2) of the HDKC #H0. The LU mapping table #H1 comprises information related to the external LU #1 (#3), which is mapped to the virtual LU #A (#C) of the HDKC #H1. The external LU #B (#D), which is mapped to the virtual LU #0 (#2), is identifiable from the LU mapping table #H0, and the external LU #A (#C), which is mapped to the virtual LU #1 (#3), is also identifiable from the LU mapping table #H1.

The server to which the HDKCs #H0 and #H1 are coupled is able to perceive these HDKCs as if they were a single HDKC. For example, the server #0 is able to recognize the LUs #0 and #1 inside the HDKC #H0, but the LU #0 entity is actually LU #B, and it exists in HDKC #H1 rather than HDKC #H0. However, the server #0 recognizes LU #0 and does not recognize the LU #B, which is inside the HDKC #H1 and which is mapped to this LU #0. For example, in a case where the LU #0 is specified by an I/O command from the server #0, the internal controller #H0 (CPU #H0) identifies the fact that the LU #B is mapped to the LU #0 from the LU mapping table #H0, and sends the I/O command specifying the identified LU #B to the LDKC #H1. This enables the I/O to be performed with respect to the LU #0 (LU #B).

The virtual LUs #0, #2, #A and #C according to the third coupling mode may belong to a higher-level tier since they are mapped to the LUs inside the HDKC. The virtual LU according to the third coupling mode, for example, may be a load distribution-source LU (a data migration-source LU) belonging to the higher-level tier and/or a load distribution-destination LU (a data migration-destination LU) belonging to the higher-level tier. In the load distribution, for example, the data inside the LU that is mapped to the virtual LU may be migrated from the HDKC that comprises this LU to the LU of another HDKC by way of the third coupling medium.

Figure 5:
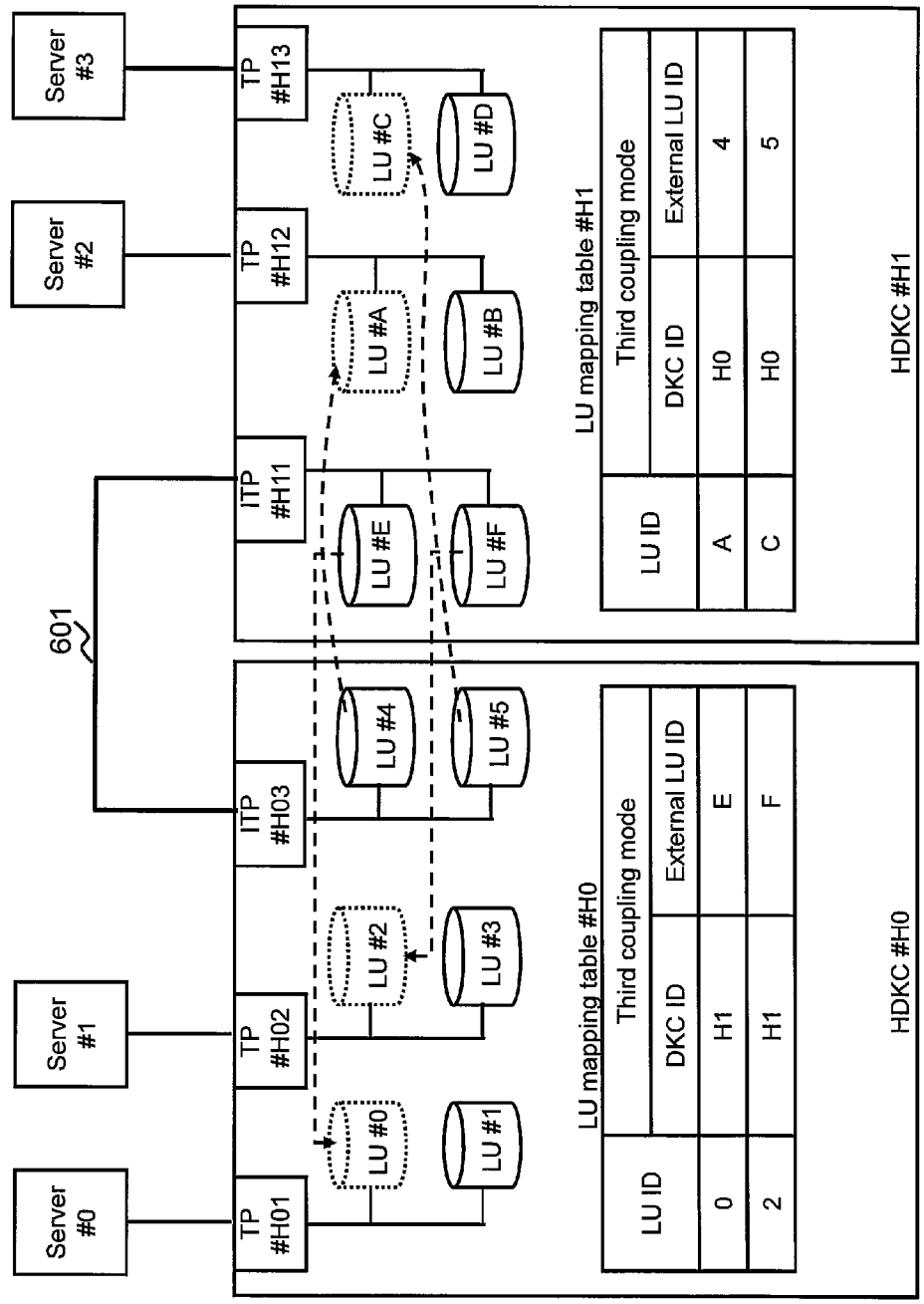
FIG. 5 shows a second example of LU mapping according to the third coupling mode.

FIG. 5 shows a second example of LU mapping according to the third coupling mode.

As shown in FIG. 5, the external LU (for example, LU #4), which is mapped to the virtual LU (for example, LU #A), may be the LU that is associated with the FE port (the initiator/target port) (for example, #H03), which is not coupled to a server, rather than the LU that is associated with the FE port (the target port), which is coupled to a server.

<HDKC Coupled to all of the First Coupling Medium, the Second Coupling Medium, and the Third Coupling Medium>

Figure 6:
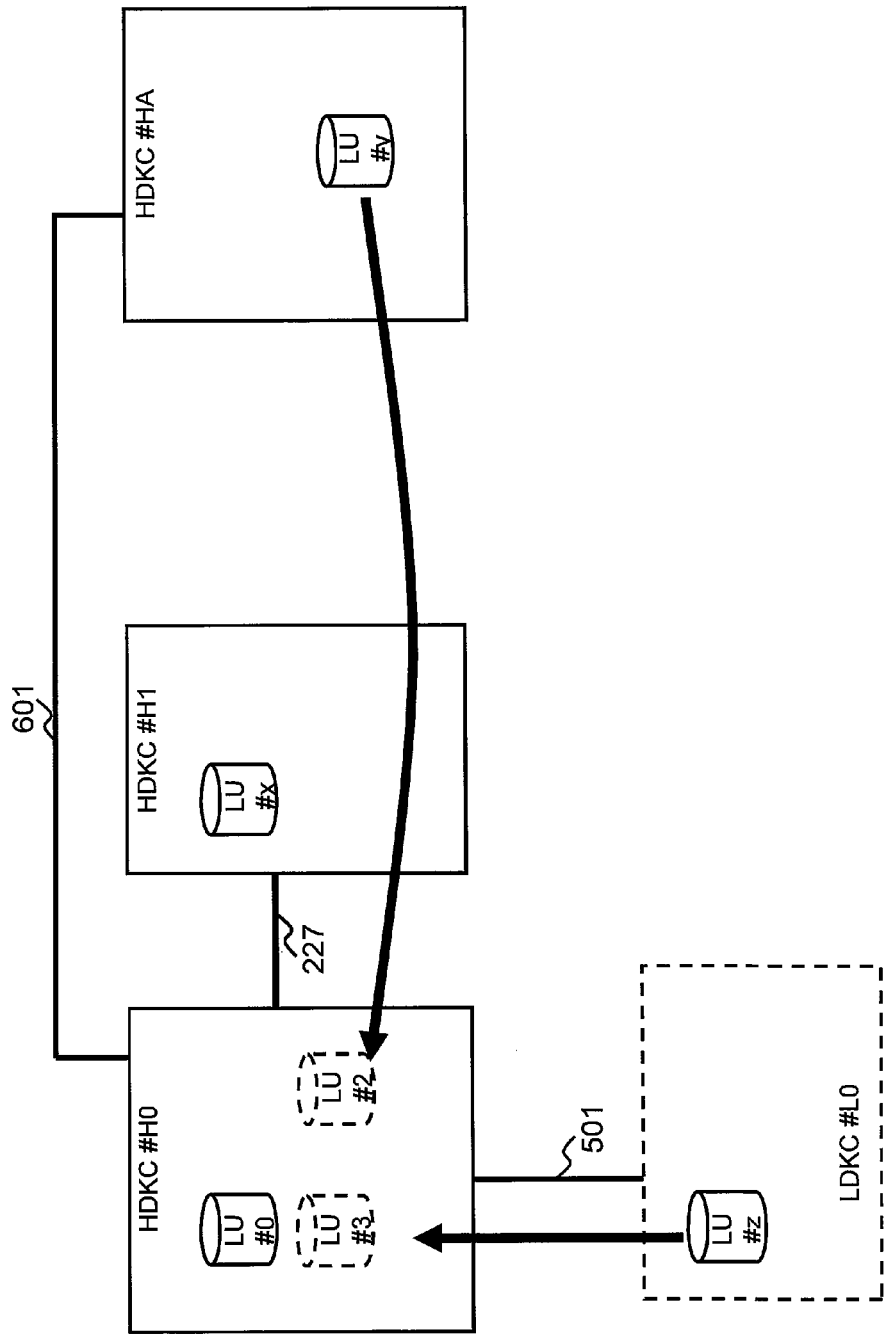
FIG. 6 shows HDKCs to which a first coupling medium, a second coupling medium, and a third coupling medium are all coupled.

FIG. 6 shows the HDKC #H0, which is coupled to all of the first coupling medium, the second coupling medium, and the third coupling medium.

The HDKC #H1 is coupled to the HDKC #H0 via the first coupling medium (the internal bus) 227, the LDKC #L0 is coupled to the HDKC #H0 via the second coupling medium (the external bus) 501, and the HDKC #HA is coupled to the HDKC #H0 via the third coupling medium (the external bus) 601.

The HDKC #H0 comprises the following LUs.
(*) LU #0 based on the RG of the HDKC #H0
(*) LU #x according to the first coupling mode (the HDKC #H0 can directly access the LU #x inside the HDKC #H1)
(*) Virtual LU #3 according to the second coupling mode (the virtual LU to which an external LU #z (the external LU inside the LDKC #L0) is mapped in accordance with the second coupling mode)
(*) Virtual LU #2 according to the third coupling mode (the virtual LU to which an external LU #y (the external LU inside the HDKC #HA) is mapped in accordance with the third coupling mode)

For example, the following can be said with respect to the multiple LUs described above.
(*) At least one of the LUs #0, #x, #2 and #3 may be the LU (for example, the DP-LU) that is recognized from the server and the LU (for example, a pool LU) that is not recognized from the server.
(*) At least one of the LUs #x, #y and #z may be the DP-LU.
(*) At least one of the LUs #x and #y may be the virtual LU according to the second coupling mode (the virtual LU to which the external LU is mapped in accordance with the second coupling mode).

In FIG. 6, at least one of the LUs #0 through #3 that the HDKC #H0 provides to the server may be an ordinary LU or a DP-LU.

The "ordinary LU" may be a LU for which a storage area, which has a capacity equivalent to the capacity of the LU when the LU was created, is allocated from the RG. The ordinary LU may be also be a virtual LU to which an external LU is mapped.

The "DP-LU" is a virtual LU that is partitioned into multiple virtual pages. In a case where the DKC has received a write command specifying an address belonging to an unallocated virtual page (a virtual page to which an actual page has not been allocated), the DKC is able to allocate an unallocated actual page (an actual page that has not been allocated to a virtual page) from the pool to this unallocated virtual page. The pool, for example, may be configured from an ordinary LU (a pool LU) that is based on one or more RG. The pool may exist in plurality. Each pool LU may be partitioned into two or more actual pages. The virtual page is a virtual storage area, and the actual page is a storage area that configures the pool.

Therefore, with the exception of a state in which respective actual pages have been allocated to all virtual pages configuring the DP-LU, the total capacity of the actual page allocated to the DP-LU is smaller than the capacity of the DP-LU (the virtual capacity). The DKC is able to consolidate the management of multiple actual pages in the form of a pool. One actual page may be based on multiple PDEVs that configure one or more RGs. Data written to the actual page may be written to the multiple PDEVs configuring this RG in accordance with the RAID level of the RG constituting the basis of this actual page.

Furthermore, either one or multiple DP-LUs may be associated with a single pool, and an actual page may be allocated to the DP-LU from the pool that is associated with this DP-LU. Also, the actual page to be allocated from the pool may be an actual page based on a RG that differs from the RG constituting the basis of the actual page that was allocated n-times before (where n is a natural number) (for example, n may equal 1). Specifically, for example, the RG that constitutes the basis of the actual page to be allocated may be switched in round-robin style. In accordance with this, it is possible to avoid the convergence of I/Os with respect to a specific RG, thereby promising enhanced I/O performance in the DKC. In a case where either a DP-LU or a group of DP-LUs (DP-LU group) associated with one pool belongs to tiers that differ for each either DP-LU or DP-LU group (for example, a case in which either a first DP-LU or a first DP-LU group belongs to a first tier, and either a second DP-LU or a second DP-LU group belongs to a second tier), an actual page may be allocated by tier from a RG that differs from a RG that is the basis of an actual page that was allocated n-times before (For example, for either the first DP-LU or the first DP-LU group, the RG that is the basis of an actual page to be allocated is shifted using the round robin mode within a range of multiple RGs configuring a first tier, and for either the second DP-LU or the second DP-LU group, the RG that is the basis of an actual page to be allocated is shifted using the round robin mode within a range of multiple RGs configuring a second tier.) Furthermore, when applying the round robin mode, the shifting of the RG that constitutes the basis of the actual page to be allocated is not limited to a single RG unit, but rather may be shifted in either partial RG units or multiple RG units (RG group units). In a case where shifting is in multiple RG units, it is possible to avoid I/Os being concentrated on specific multiple RG units (RG group units) in accordance with the processor 222 of the HDKC unit 141, the HDKC or the LDKC 151 allocating either one or multiple actual pages from other multiple RG units (RG group units) subsequent to having allocated either one or multiple actual pages from certain multiple RG units (RG group units), thereby making it possible to enhance the I/O performance of the DKC.

Furthermore, each virtual page of one or multiple DP-LUs is able to be mapped in accordance with the access characteristic of each virtual page to an actual page that corresponds to a storage medium that is suitable for this access characteristic. Or, it is also possible to change the mapping in accordance with the access characteristic of each virtual page from an actual page that corresponds to a storage medium that is unsuitable for this access characteristic to an actual page that corresponds to a storage medium that is suitable for this access characteristic. As used here, the access characteristic, for example, is the type of access of each virtual page (either a random access or a sequential access, or a type such as the access source server 101 or application 111 described hereinabove), either the I/O frequency or the write frequency of each virtual page, or the frequency at which data written to each virtual page is written from the cache memory 224 to a storage medium corresponding to an actual page mapped to the virtual page, or the frequency at which the data, which is to be written or read to each virtual page, is either written or read between the cache memory 224 and the storage medium corresponding to the actual page that is mapped to the virtual page. In accordance with this, the multiple tiers of this embodiment (for example, either the tier level or the tier level range) are managed for each virtual page of either one or multiple DP-LUs, and can be seen as tier technology for each virtual page of either one or multiple DP-LUs rather than the LU tier technology as described hereinabove. However, in a case where each virtual page is mapped in accordance with the access characteristic of each virtual page to an actual page corresponding to a storage medium that is suitable for this access characteristic, the tier technology is for each virtual page, but in a case where the actual page mapped to a virtual page in accordance with the access characteristic of each virtual page changes, since the relationship between the LU and the tier has been set beforehand, the LU tier technology is applied when creating a DP-LU, and thereafter the tier technology for each virtual page is applied in accordance with changing the actual page that is mapped to the virtual page in accordance with the access characteristic.

Furthermore, in this embodiment, an actual page is allocated, according to a write command from the server, to the virtual page to which the address specified in this write command belongs, but the present invention is not limited to an example in which actual pages are not allocated to all the areas of DP-LU when, for example, the DP-LU is created. For example, the examples given below may also apply to the present invention. The capacity that is actually used in any of the examples cited below can be reduced.

First Example

A storage area (for example, a physical page) may be allocated beforehand (prior to a write command with respect to the DP-LU being received from the server) to at least one virtual page (or a portion of the area comprising the virtual page) of multiple virtual pages configuring the DP-LU. That is, unallocated may be performed. In a case where the already allocated storage area is insufficient and additional storage area is needed to store data according to a write command, the DKC (internal controller) may additionally allocate a storage area to the DP-LU from the pool.

Second Example

Either an actual page or a control area in which is stored zero data (for example, data that is configured from the bit value "0") may be tentatively allocated beforehand (prior to a write command being received from the server with respect to a DP-LU) to at least one virtual page of the multiple virtual pages that configure this DP-LU. That is, a tentative allocation may be performed. The zero area (the actual page or control area in which the zero data is stored), for example, may be an area on a storage device such as a SSD. The DKC (internal controller), upon receiving a write command, may change the storage area to be allocated to the write-destination virtual page from the zero area to the actual page in which the data is to be stored. That is, an actual allocation may be performed. The DKC (internal controller), upon having received from the server a read command specifying an address belonging to a virtual page for which this actual allocation has not been completed, may respond to the server with the zero data inside the zero area allocated to this virtual page.

In the United States, the specification and drawings of U.S. Pat. No. 7,555,601 (Yamagami) are cited in relation to I/O with respect to the DP-LU. In accordance with this, the Storage Control System corresponds to the HDKC unit 141 and LDKC 151 of the present application, and is applied to the I/O processing by the HDKC unit 141 with respect to the DP-LU, and to the I/O processing by the LDKC unit 151 with respect to the DP-LU. Furthermore, this citation is not limited solely to the first coupling mode, but rather can also be cited in relation to the second and third coupling modes and I/Os with respect to the DP-LU.

<Example of HDKC Coupling Relationship and LU Corresponding Relationship Related to This Embodiment>

Figure 7:
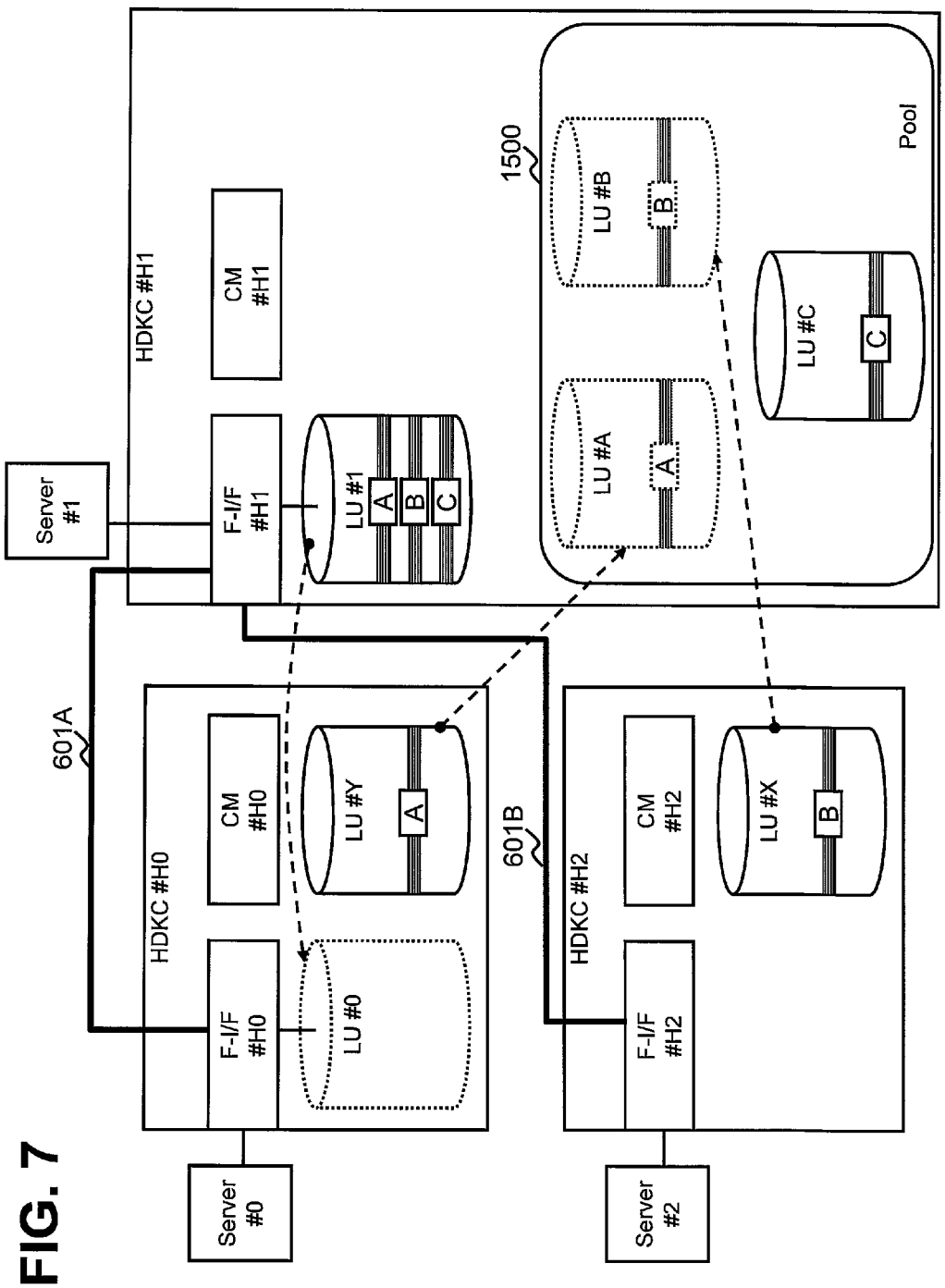
FIG. 7 shows an example of a HDKC coupling relationship and a LU corresponding relationship related to a first embodiment of the present invention.

FIG. 7 shows an example of a HDKC coupling relationship and a LU corresponding relationship related to this embodiment. Furthermore, in the following explanation, the same type of elements #p0, p1, . . . , inside the HDKC will be bundled together as element #p for the sake of convenience.

A HDKC #H0 is coupled to a HDKC #H1 via a third coupling medium 601A, and, in addition, a HDKC #H2 is coupled to the HDKC #H1 via a third coupling medium 601B.

A server #0 and the HDKC #H1 are coupled to a F-I/F #H0 of the HDKC #H0. A server #1, the HDKC #H0 and the HDKC #H1 are coupled to a F-I/F #H1 of the HDKC #H1. A server #2 and the HDKC #H1 are coupled to a F-I/F #H2 of the HDKC #H2.

The HDKC #H0 comprises a LU #0 and a LU #Y. The HDKC #H1 comprises a LU #1 and a pool 1500. The LU #1 is associated with the pool 1500, and an actual page in the pool 1500' is allocated to the LU #1. The pool 1500 comprises pool LUs #A, #B and #C. The size of an actual page is smaller than the size of each pool LU. The HDKC #H2 comprises a LU #X.

The LUs #0 and #1 are both server LUs. A "server LU" is an LU that is provided to a server. In this embodiment, any of servers #0, #1 and #2 can recognize LU #0 and LU #1. The server LU may be a DP-LU, or may be a virtual LU that is mapped to an external LU. In this embodiment, the LUs #0 and #1 are both DP-LUs. DP-LU #1 is mapped to DP-LU #0.

LUs #A, #B, #0, #X and #Y are all non-server LUs. A "non-server LU" is a LU that is not provided to a server. Therefore, none of servers #0, #1 and #2 can recognize a non-server LU. A non-server LU may be an external LU or a pool LU. An external LU may be an ordinary LU or a DP-LU. A pool LU may be an ordinary LU or a virtual LU that is mapped to an external LU. A virtual LU mapped to an external LU may be a DP-LU. In this embodiment, the LUs #X and #Y are an external LU and an ordinary LU, respectively. The pool LU #A is a virtual LU mapped to the external LU #Y, the pool LU #B is a virtual LU mapped to the external LU #X, and the pool LU #C is an ordinary LU.

A first through a third actual pages are allocated to a first through a third virtual pages in a DP-LU. Data A is stored in the first actual page, data B is stored in the second actual page, data C is stored in the third actual page.

The first actual page exists in the virtual LU #A. Consequently, the data A is stored in an area (specifically, an RG that is the basis of this area) in the external LU #Y that corresponds to the first actual page.

The second actual page exists in the virtual LU #B. Consequently, the data B is stored in an area (specifically, an RG that is the basis of this area) in the external LU #X that corresponds to the second actual page.

The third actual page exists in the virtual LU #C. Consequently, the data C is stored in the RG that is the basis of the ordinary LU #C.

In the following explanation, the HDKC that comprises a DP-LU will be called the "main HDKC", and the HDKC that comprises a LU that is mapped as an external LU to the pool LU in the pool associated with this DP-LU will be called the "sub-HDKC". According to the example shown in FIG. 7, the HDKC #H1 is the main HDKC, and both of the HDKCs #H0 and #H2 are sub-HDKCs for the DP-LU #1. In a case where the HDKC #H0 comprises a DP-LU and the LU in the HDKC #H1 is mapped as an external LU to a pool LU configuring a pool in the HDKC #H0, the HDKC #H0 is the main HDKC, and the HDKC #H1 is the sub-HDKC. That is, a main HDKC and a sub-HDKC are defined for each DP-LU.

Furthermore, in the following explanation, to make the explanation easier to understand, it is supposed that the address range of a virtual LU is the same as the address range of an external LU mapped to this virtual LU. For example, in a case where the HDKC #H0 has received an I/O command specifying an address w of the virtual LU #0, it is supposed that an I/O command specifying the same address w of the external LU #1 is sent to the HDKC #H1. Furthermore, an address in the I/O command specifying the external LU may be an address that has been decided based on an address in the I/O command specifying the virtual LU mapped to this external LU.

<Problem to be Solved by this Embodiment>

Figure 8:
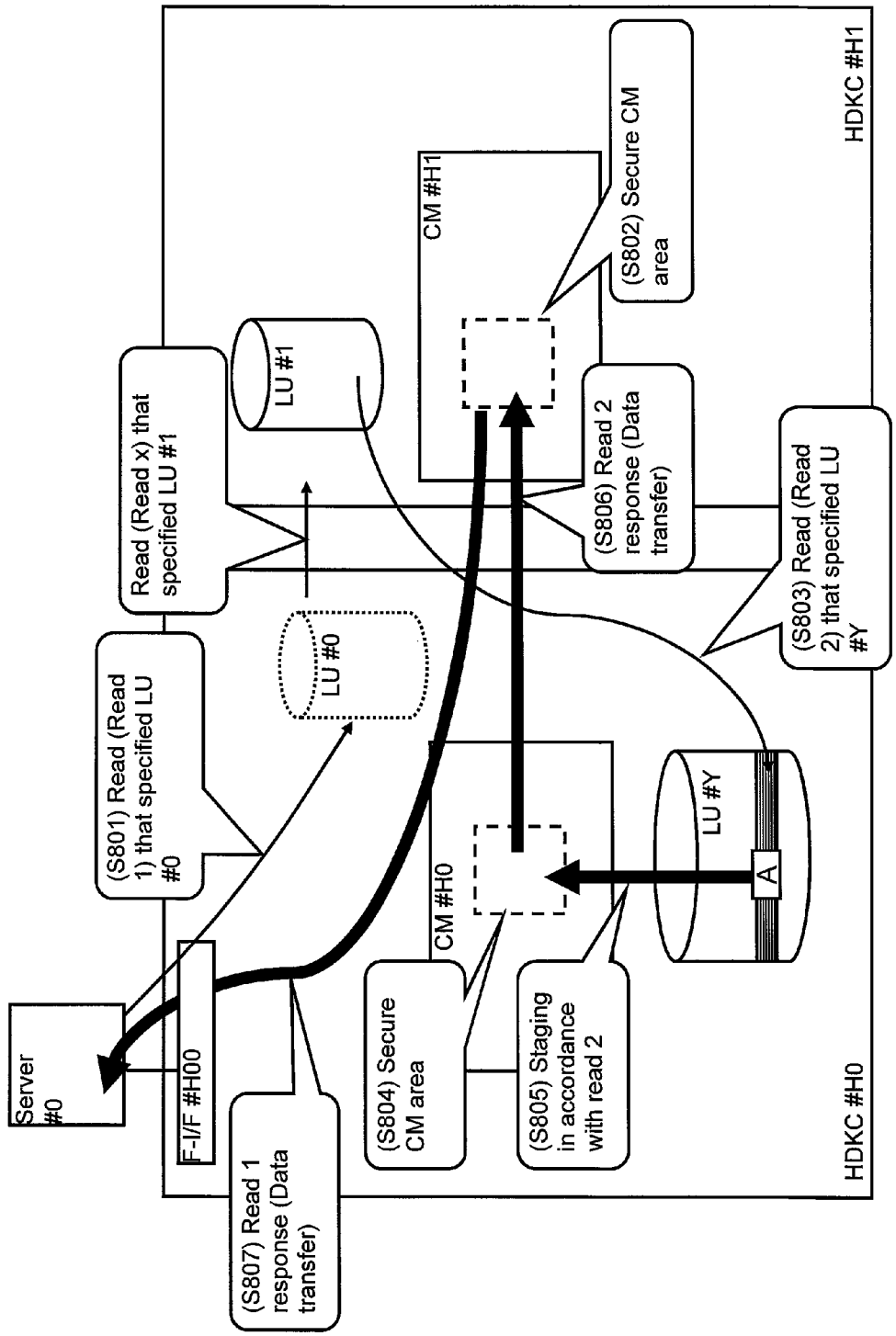
FIG. 8 is a schematic diagram of an example of one of the problems that the first embodiment of the present invention is to solve.

FIG. 8 is a schematic diagram of an example of a problem that is to be solved by this embodiment.

The problem shown in FIG. 8 is that, despite the fact that a data A, which conforms to a read 1 that the sub-HDKC #H0 received from the server #0, exists in the sub-HDKC #H0, the read-target data A is sent back and forth between the sub-HDKC #H0 and the main HDKC #H1. This will be explained in detail below.

In S801, it is supposed that the HDKC #H0 has received from the server #0 a read command (read 1 in the explanations of FIGS. 8 through 10) specifying the LUN of the LU #0 and the address of an area in the LU #0. In accordance with this, the HDKC #H0 identifies the fact that the LU #0 is mapped to the external LU #1, and sends a read command (read x in the explanation of FIG. 8) specifying the LU #1 LUN and the address of the area in the LU #1 (the address of the area in the LU #0) to the HDKC #H1.

In S802, the HDKC #H1 receives the read x. The HDKC #H1 determines whether or not the data conforming to the read x exists in the CM #H1. In a case where the result of this determination is negative, the HDKC #H1 secures a CM area in the CM #H1 for storing the data that conforms to the read x.

In S803, the HDKC #H1 identifies the fact that an actual page, which is allocated to a virtual page belonging to the address specified in the read x, corresponds to an area in the LU #Y in the HDKC #H0. The HDKC #H1 sends the read command (read 2 in the explanation of FIG. 8) specifying the address of this identified area and the LUN of the LU #Y to the HDKC #H0.

In S804, the HDKC #H0 receives the read 2. The HDKC #H0 determines whether or not the data conforming to the read 2 exists in the CM #H0. In a case where the result of this determination is negative, the HDKC #H1 secures a CM area in the CM #H0 to store the data conforming to the read 2.

In S805, the HDKC #H0 reads the data A conforming to the read 2 from the LU #Y, and stores this data A in the CM area secured in the CM #H0.

In S806, the HDKC #H0 sends the data A inside the CM #H0 to the HDKC #H1 as the response to the read 2.

In S807, the HDKC #H1 receives the data A as the response to the read 2, and stores this data A in the CM area secured in S802. Then, the HDKC #H1 receives the data A inside the CM #H1 as the response to read x, and sends this data A to the server #0 as the response to the read 1.

<First Scheme for Solving Problem to be Solved by this Embodiment>

Figure 9:
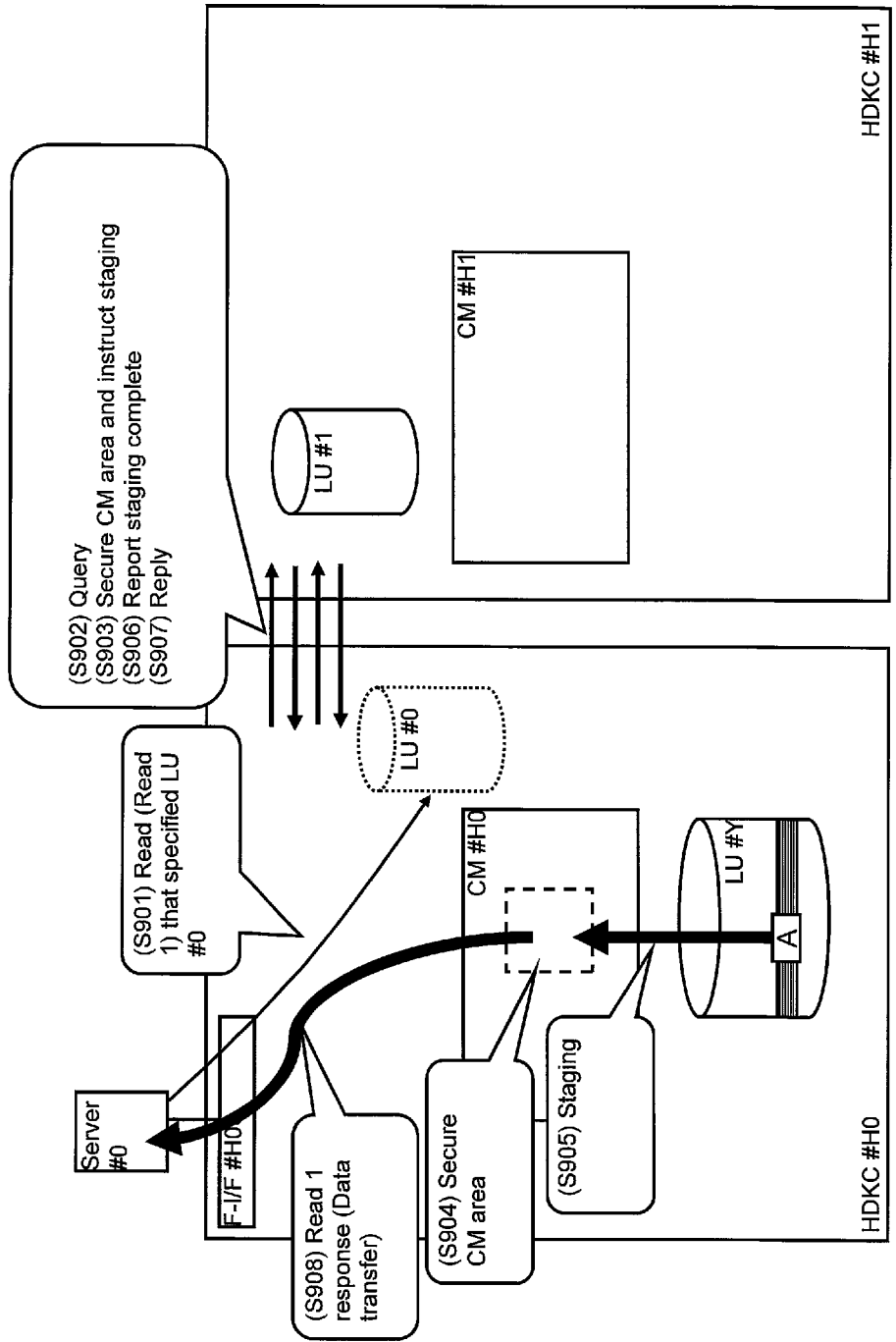
FIG. 9 is a schematic diagram of a first scheme for solving one of the problems that the first embodiment of the present invention is to solve.

FIG. 9 is a schematic diagram of a first scheme for solving a problem that is to be solved by the first embodiment of the present invention.

According to a first scheme shown in FIG. 9, in a case where the sub-HDKC #H0 has received the read 1, the sub-HDKC #H0 determines whether or not the LU #1, which is mapped to the LU #0 specified in the read 1, is a DP-LU. In a case where the result of this determination is affirmative, the sub-HDKC #H0 queries the HDKC #H1 about the DKC in which the data A conforming to the read 1 exists. In a case where the reply to this query is the HDKC #H0, the HDKC #H0 reads the data A from the LU #Y in accordance with this reply, and sends this data A to the server #0. According to this first scheme, the sub-HDKC #H0 is able to send the data A to the server #0 without transferring the data A to the main HDKC #H1. That is, it is possible to prevent the data A from being wastefully sent back and forth between the HDKC #H0 and #H1. For this reason, there is no need for a CM area to be unnecessarily secured in the CM #H1.

One example of processing that conforms to the first scheme will be explained hereinbelow by referring to FIG. 9.

In S901, the HDKC #H0 receives the read 1 from the server #0.

In S902, the HDKC #H0 determines whether or not the LU #1, which is mapped to the LU #0 specified in the read 1, is a DP-LU. In a case where the result of this determination is affirmative, the HDKC #H0 sends a query for querying the HDKC #H1 comprising the LU #1 about the DKC in which the data A conforming to the read 1 exists. This query, for example, comprises the LUN of the LU #1 and the address specified in the read 1.

In S903, the HDKC #H1 receives the query from the HDKC #H0, and, in accordance with this query, identifies the DKC in which the data A exists, the address of the LU area that will store this data A, and the ID of the LU that comprises this LU area. In a case where the HDKC #H0 is identified as the DKC, the HDKC #H1 sends a staging instruction specifying the identified address and the LU ID to the HDKC #H0.

In S904, the HDKC #H0 receives the staging instruction. The HDKC #H0 determines whether or not data conforming to the staging instruction exists in the CM #H0. In a case where the result of this determination is negative, the HDKC #H1 secures a CM area in the CM #H0 for storing the data conforming to the staging instruction.

In S905, the HDKC #H0 reads the data A conforming to the staging instruction from the LU #Y, and stores this data A in the CM area secured in the CM #H0.

In S906, the HDKC #H0 sends a staging-complete report to the source of the staging instruction (HDKC #H1) as the response to the staging instruction.

In S907, the HDKC #H1 receives the staging-complete report, and sends a reply stating that the DKC in which the data A was staged in the HDKC #H0 to the source of the query of S902 (HDKC #H0).

In S908, the HDKC #H0 receives the reply of S907, and based on this reply, identifies that the DKC where the data A has been staged is the HDKC #H0. Then, the HDKC #H0 acquires the data A from the CM #H0 in the identified HDKC, and sends the acquired data A to the server #0 as the read 1 response. Furthermore, in a case where the identified HDKC is a HDKC other than the HDKC #H0, the HDKC #H0 acquires the data A from the CM #H0 inside this HDKC (For example, the HDKC #H0 requests the data A from this HDKC and acquires the data A as the response to this request).

<Second Scheme for Solving Problem to be Solved by this Embodiment>

Figure 10:
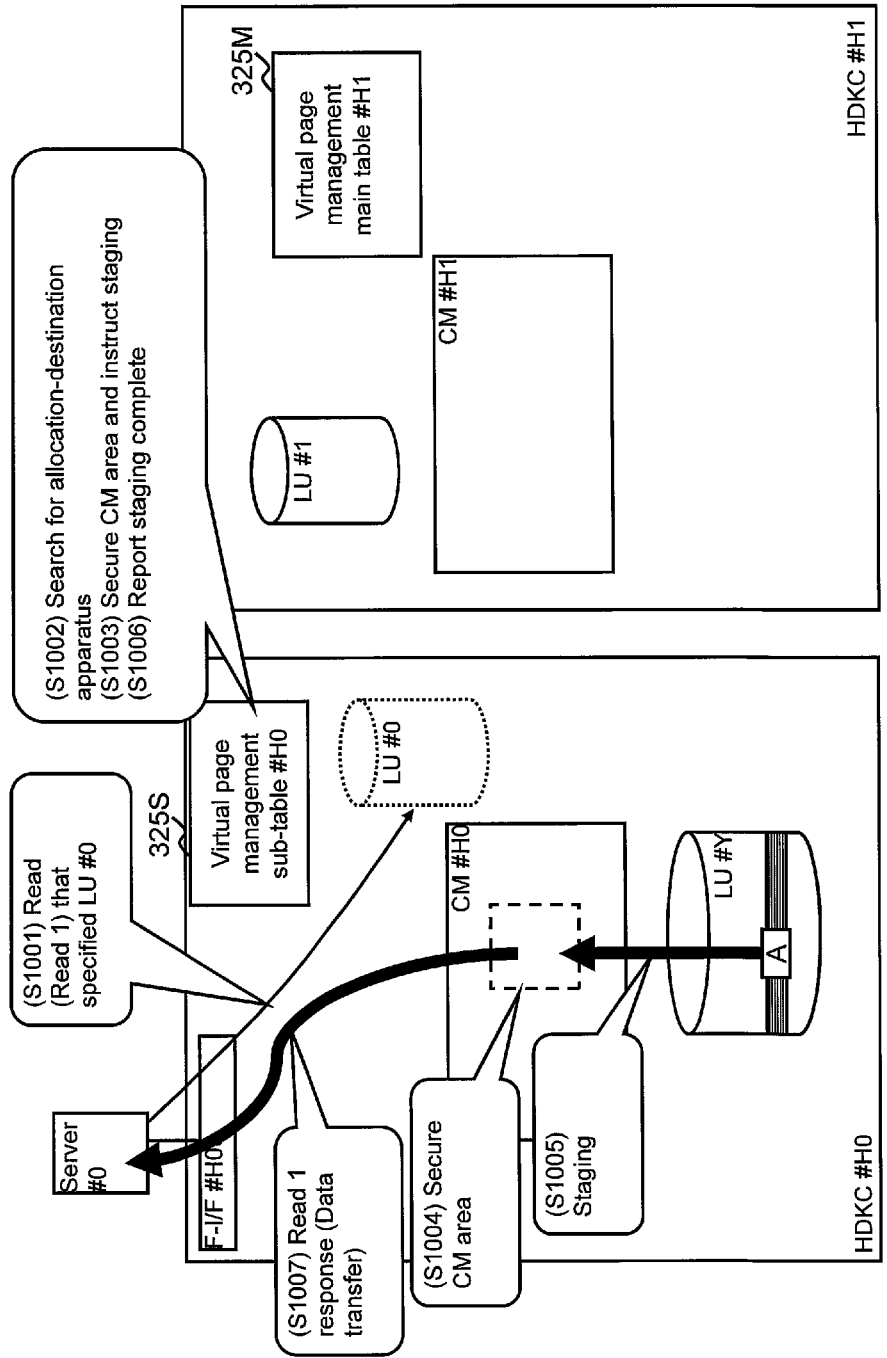
FIG. 10 is a schematic diagram of a second scheme for solving one of the problems that the first embodiment of the present invention is to solve.

FIG. 10 is a schematic diagram of a second scheme for solving a problem that is to be solved by this embodiment.

According to the second scheme shown in FIG. 10, the main HDKC #H1 comprises a virtual page management main table #H1, and the sub-HDKC #H0 comprises a virtual page management sub-table #H0 that has been created based on information denoted in this main table #H1 and information denoted in a LU mapping table #H1.

The virtual page management main table #H1 shows which actual page is allocated to which virtual page of the DP-LU #1. From the LU mapping table #H1, it is clear which actual page is included in which pool LU, and, in addition, which external LU inside the DKC is mapped to which pool LU. For this reason, a virtual page management sub-table #H0 can be created based on the virtual page management main table #H1 and the LU mapping table #H1. The sub-table #H0 may be created using any apparatus. For example, the sub-table #H0 may be created by the HDKC #H1, or the information shown in the main table #H1 and the information shown in the LU mapping table #H1 may be sent to another apparatus (for example, the HDKC #H0 or a management apparatus that manages the respective HDKCs (not shown in the drawing)) and the sub-table #H0 may be created by this other apparatus.

The sub-table #H0 denotes which actual page allocated to a virtual page of the DP-LU #1 corresponds to the LU area of this DKC. Therefore, the HDKC #H0 can refer to this sub-table #H0 to identify that the data A conforming to the address specified in the read 1 exists in the HDKC #H0. Consequently, the HDKC #H0 can send the data A to the server #1 as the read 1 response without sending the data A to the HDKC #H1. Furthermore, according to the second scheme, the sub-HDKC #H0 need not send a query to the main HDKC #H1 as was explained by referring to FIG. 9.

An example of the processing according to the second scheme will be explained below by referring to FIG. 10.

In S1001, the HDKC #H0 receives the read 1 from the server #0.

In S1002, the HDKC #H0 determines whether or not the LU #1 mapped to the LU #0 is a DP-LU. In a case where the result of this determination is affirmative, the HDKC #H0, by referring to the sub-table #H0, identifies the address of the location (the LU area address, the ID of the LU comprising this LU area, and the ID of the DKC comprising this LU area) corresponding to the actual page that is being allocated to the LU #1 access-destination virtual page (the virtual page that belongs to the address specified in the read 1).

In S1003, the HDKC #H0 sends a staging instruction to the identified DKC. Since HDKC #H0 has been identified here, the HDKC #H0 issues the staging instruction internally. The staging instruction, for example, comprises the LU area address and the ID of the LU comprising this LU area identified in S1002.

In S1004, the HDKC #H0 receives the staging instruction. The HDKC #H0 determines whether or not data conforming to this staging instruction exists in the CM #H0. In a case where the result of this determination is negative, the HDKC #H1 secures a CM area in the CM #H0 for storing the data conforming to the staging instruction.

In S1005, the HDKC #H0 reads the data A conforming to the staging instruction from the LU #Y and stores this data A in the CM area secured in the CM #H0.

In S1006, the HDKC #H0 sends a staging-complete report to the source of the staging instruction (HDKC #H0) as the response to the staging instruction.

In S1007, the HDKC #H0 receives a staging-complete report, acquires the data A from the CM #H0, and sends the acquired data A to the server #0.

The preceding has been an explanation of the second scheme. Furthermore, in either the first or second scheme, the LU #1 in the main HDKC #H1 does not have to be a DP-LU, but rather may be a virtual LU that is mapped to an external LU in the sub-HDKC. That is, the present invention is not limited to a DP-LU, and can also be applied to a case in which multiple HDKCs provide a virtual LU that is mapped to an external LU.

<Management Information>

Figure 11:
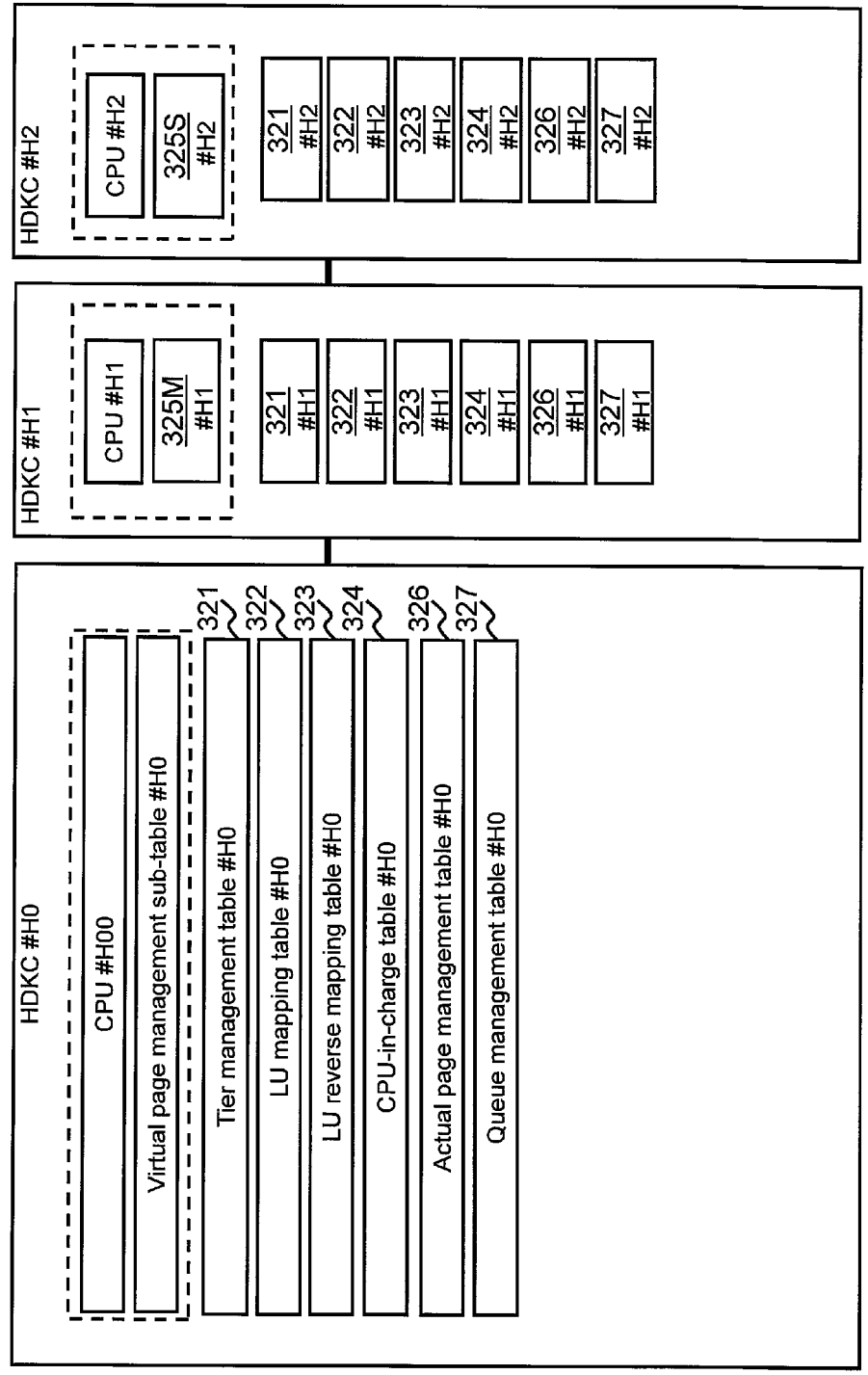
FIG. 11 shows an example of management information of a storage system 110.

FIG. 11 shows an example of management information of the storage system 110.

The management information is information that the storage system 110 manages. All of the HDKCs may store all the types of management information. The contents of the management information may be the same for all the HDKCs or it may differ for each HDKC. For example, a first type of management information stored by a first HDKC may comprise only information related to the first HDKC, and it need not comprise information that is not related to the first HDKC.

There may be management information that a storage area capable of being shared by multiple HDKCs may store, and there may be management information that individual HDKCs may store to prevent a drop in access performance.

According to FIG. 11, individual HDKCs, for example, are able to store the following management information:
(*) A tier management table 321, which comprises tier-related information;
(*) a LU mapping table 322, which comprises information denoting the corresponding relationship of the LUs;
(*) a LU/PDEV conversion table (not shown), which comprises information denoting the corresponding relationship between the LUs and PDEVs;
(*) a LU reverse mapping table 323, which denotes which external LU inside a certain DKC is mapped to a DP-LU;
(*) a CPU-in-charge table 324, which comprises information denoting which CPU is in charge of I/O with respect to which LU;
(*) an actual page management table 326, which comprises information related to an actual page that configures a pool;
(*) a top-of-queue management table 327, which comprises a pointer for the initial entry in the queue that manages unallocated actual pages; and
(*) a coupling management table 328, which comprises information related to the coupling of DKCs.

The CPU inside a HDKC is able to access the tables that this HDKC stores. In addition, the CPU inside a HDKC may be able to access a table inside a HDKC that is coupled to this HDKC via the first coupling medium, but may not be able to access a table inside a HDKC that is coupled to this HDKC via the third coupling medium.

As was explained above, the DP-LU has a virtual page management main table (may be abbreviated as main table hereinafter) 325M and a virtual page management sub-table (may be abbreviated as sub-table hereinafter) 325S. The main table 325M comprises information related to the virtual page configuring a DP-LU in the HDKC that comprises this main table. The sub-table 325S comprises information related to the virtual page configuring the DP-LU (the DP-LU in the main HDKC) that corresponds to this sub-table.

There is a main table 325M and a sub-table 325S for each DP-LU serving as a server LU. The main table 325M (#H1) and the sub-tables 325S (#H0 and #H2) are the tables for the DP-LU #1. For this reason, for example, in a case where the HDKC #H0 comprises the DP-LU #p and a LU inside the HDKC #H1 is mapped as an external LU to a pool LU configuring the pool inside the HDKC #H0, the HDKC #H0 comprises the main table 325M for the DP-LU #p, and the HDKC #H1 comprises the sub-table 325S for the DP-LU #p. The main table 325M and the sub-table 325S may both be stored in the LM.

Furthermore, a CPU that is able to access the main table 325M is predetermined for each table. For example, only the CPU #H11 is able to access the main table 325M (#H1) shown in the drawing.

Similarly, a CPU that is able to access the sub-table 325S is predetermined for each table. For example, only the CPU #H00 is able to access the sub-table 325S (#H0) shown in the drawing.

Although not shown in the drawing, each HDKC may also store a LU management table, which comprises information related to the LU of this HDKC (for example, a LU ID, a LU type, and a storage capacity for each LU). As LU types, for example, there may be an ordinary LU (a LU based on the RG inside the HDKC), a virtual LU, and a DP-LU (a LU according to Dynamic Provisioning (Thin Provisioning)). The LU ID, for example, may be a LUN (Logical Unit Number), which is the identification information that a server uses, identification information that the server does not use (a volume ID), or a combination of these.

In the case of a HDKC that does not comprise a DP-LU, the storage resource inside this HDKC need not store the tables 325 (325M, 325S) through 327.

All of the tables 321 through 327 may be stored in the same storage resource (for example, the CM (the SM area)), or tables 321 through 327 may be distributed among multiple storage resources (for example, the LM and the CM (the SM area)). In addition, in the HDKC unit, the storage resource inside a certain HDKC may store a portion of the tables 321 through 327, and the storage resource inside another HDKC may store a portion of the tables 321 through 327.

A storage resource of the LDKC (for example, the LM or CM (SM area)) may also store management information, for example, a LU/PDEV conversion table (a table comprising information that denotes the relationship between the LU inside the LDKC and the PDEV inside the LDKC) that is required for this LDKC. Also, in a case where the external LU inside the LDKC is a DP-LU, the storage resource of this LDKC is able to store a virtual page management table and an actual page management table.

In a case where the DKC comprises multiple pools, there may be an actual page management table for each of the pools in this DKC. Furthermore, the HDKC unit 141 integratively manages multiple internal volumes (a volume configured on the basis of a storage area provided from either one or multiple storage medium(s) inside the device itself) and/or multiple storage areas of a logical volume (a LU provided from the other HDKC unit 141 or the LDKC 151).

Numerous management information will be explained in detail hereinbelow by referring to the drawings. Furthermore, in the following explanation, examples of the HDKC coupling relationship and the LU corresponding relationship shown FIG. 7 will be given.

<Virtual Page Management Main Table 325M>

FIG. 12 shows the configuration of the main table 325M (#H1).

The main table #H1, for example, comprises the following information for each virtual page of the DP-LU (here DP-LU #1) corresponding to the table:
(*) A DP-LU ID 1201, which is the identifier of the DP-LU that comprises a virtual page;
(*) a virtual page address 1202, which denotes the address of the virtual page;
(*) an allocation status 1203, which denotes the status of allocation to the virtual page;
(*) a pool LU ID 1204, which is the identifier of the pool LU that includes the actual page allocated to the virtual page; and
(*) an actual page address 1205, which denotes the address of the actual page allocated to the virtual page. A main table 325M may be in each DP-LU. The table #H1 corresponding to the DP-LU #1 shown in FIG. 12 may be stored in the LM #H10 of the CPU-in-charge (for example, #H10) of the DP-LU #1.

<Tier Management Table 321>

FIG. 13 shows the configuration of a tier management table #H1.

FIG. 14 shows the configuration of a tier management table #H0.

The tier management table 321, for example, comprises the following information for each LU of the HDKC that comprises this table 321:
(*) a LU ID 1301, which is the identifier of a LU; and
(*) a coupling mode 1302 denoting the coupling mode to which a LU conforms.

According to FIG. 13, since the LU #1 belongs to the HDKC #H1, the coupling mode 1302 corresponding to the LU #1 is the "first coupling mode". Alternatively, since the LU #A is a virtual LU that is mapped to the external LU #Y via a third coupling medium, the coupling mode 1302 corresponding to the LU #A is the "third coupling mode".

According to FIG. 14, since the LU #0 is a virtual LU that is mapped to the external LU #1 via a third coupling medium, the coupling mode 1302 corresponding to the LU #0 is the "third coupling mode". Alternatively, since the LU #Y belongs to the HDKC #H0, the coupling mode 1302 corresponding to the LU #Y is the "first coupling mode".

<LU Mapping Table 322>

FIG. 15 shows the configuration of a LU mapping table #H1.

FIG. 16 shows the configuration of a LU mapping table #H0.

The LU mapping table 322, for example, comprises the following information for each virtual LU:
(*) a LU ID 1501, which is the identifier of a virtual LU;
(*) a DKC ID 1502, which is the identifier of the DKC that comprises an external LU mapped to a virtual LU;
(*) an external LU ID 1503, which is the identifier of the external LU mapped to the virtual LU; and
(*) a LU type 1504, which denotes the type of the external LU mapped to the virtual LU.

The value of the LU type 1504 may be "DP-LU" to signify a DP-LU, or "non-DP-LU" to signify a LU that is not a DP-LU.

According to FIG. 15, the external LU #Y in the HDKC #H0 is mapped to the LU #A, but since the external LU #Y is an ordinary LU, the LU type 1504 corresponding to the LU #A is "non-DP-LU".

According to FIG. 16, the external LU #1 in the HDKC #H1 is mapped to the LU #0, and since the external LU #1 is a DP-LU, the LU type 1504 corresponding to the LU #0 is "DP-LU".

<LU Reverse Mapping Table 323>

FIG. 17 shows the configuration of a LU reverse mapping table #H1.

The LU reverse mapping table #H1 is prepared together with the main table 325M for one DP-LU (DP-LU #1 here). This table #H1, for example, comprises the following information for a DP-LU serving as an external LU:
(*) an external LU ID 1701, which is the identifier of the DP-LU that serves as the external LU;
(*) a DKC ID 1702, which is the identifier of the DKC that comprises a virtual LU that is mapped to the external LU (DP-LU); and
(*) a LU ID 1703, which is the ID of the virtual LU that is mapped to the external LU (DP-LU).

This table #H1 is created by the HDKC #H1 based on the information (information that includes information denoting that the LU #1 is mapped to the LU #0), which the HDKC #H1 receives from the HDKC #H0 (or the management apparatus) when the DP-LU #1 is mapped to the virtual LU #0. From this table #H1 it is clear that the LU mapped to the LU #1 is the LU #0. This table #H1, for example, is used for identifying a notification destination in an allocated-page release process, which will be described further below.

The management apparatus can acquire from the HDKC #H1 information belonging to both the LU mapping table #H1 and the LU reverse mapping table #H1. The management apparatus is able to carry out the following displays based on the information of the LU mapping table #H1:
(*) a display having the virtual LU corresponding to the value of the LU ID 1501 as an LU of the HDKC #H1;
(*) a display having the DKC corresponding to the value of the DKC ID 1502 as an external DKC (a DKC comprising an external LU);
(*) a display having the LU corresponding to the value of the external LU ID 1503 as an external LU; and
(*) a display having the HDKC #H1 as a virtual DKC (a DKC comprising a virtual LU).

Furthermore, the management apparatus is able to carry out the following displays based on the LU reverse mapping table #H1:
(*) a display having the DP-LU corresponding to the value of the external LU ID 1701 as an external DP-LU;
(*) a display having the DKC corresponding to the value of the DKC ID 1702 as a virtual DKC (a DKC comprising a virtual LU);
(*) a display having the LU corresponding to the value of the LU ID 1703 as a virtual LU; and
(*) a display having the HDKC #H1 as an external DKC (a DKC comprising an external LU).

<Consolidated LU Mapping Table>

FIG. 18 shows the configuration of a consolidated LU mapping table 1800.

This table 1800 (#H1) is not shown in FIG. 11, but is created by consolidating the LU mapping table #H1 and the LU reverse mapping table #H1 shown in FIG. 11. For this reason, this table #H1 comprises information with respect to a LU (an external LU and a virtual LU mapped to the external LU) corresponding to an identification condition from among the multiple LUs of the HDKC #H1.

The consolidated LU mapping table #H1, for example, comprises the following information for each corresponding relationship between a virtual LU and an external LU:
(*) a virtual DKC ID 1801, which is the identifier of the DKC comprising a virtual LU;
(*) a virtual LU ID 1802, which is the identifier of the virtual LU;
(*) an external DKC ID 1803, which is the identifier of a DKC comprising an external LU; and
(*) an external LU ID 1804, which is the identifier of the external LU.

The information shown in this table #H1 is sent to the management apparatus, and displayed by the management apparatus. In accordance with this, the administrator is able to learn which LU in a certain DKC is mapped, as an external LU, to which virtual LU in a certain DKC.

<Virtual Page Management Sub-Table 325S>

FIG. 19 shows the configuration of the virtual page management sub-table 325S (#H0).

The virtual page management sub-table #H0, for example, comprises the following information for each virtual page of the external DP-LU #1 mapped to the virtual LU #0:
(*) a DP-LU DKC ID 1901, which is the identifier of the DKC comprising a DP-LU that comprises a virtual page;

(*) a DP-LU ID 1902, which is the identifier of the DP-LU comprising a virtual page;
(*) a virtual page address 1903, which denotes the address of a virtual page;
(*) an allocation status 1904, which denotes the allocation status with respect to a virtual page;
(*) a coupling mode 1905, which denotes the coupling mode with respect to a pool LU entity comprising an actual page that is allocated to a virtual page;
(*) a pool LU DKC ID 1906, which is the identifier of the DKC that comprises a pool LU entity comprising an actual page that is allocated to a virtual page;
(*) a pool LU ID 1907, which is the identifier of a pool LU entity comprising an actual page that is allocated to a virtual page; and
(*) an actual page address 1908, which denotes the address (the address of a pool LU) of the actual page entity that is allocated to a virtual page.

There may be a sub-table 325S for each external DP-LU. As shown in FIG. 19, the table #H0 corresponding to the DP-LU #1 may be stored in the LM #H00 of the CPU-in-charge (for example, #H00) of the virtual LU #0 to which the external DP-LU #1 is mapped.

Figure 38:
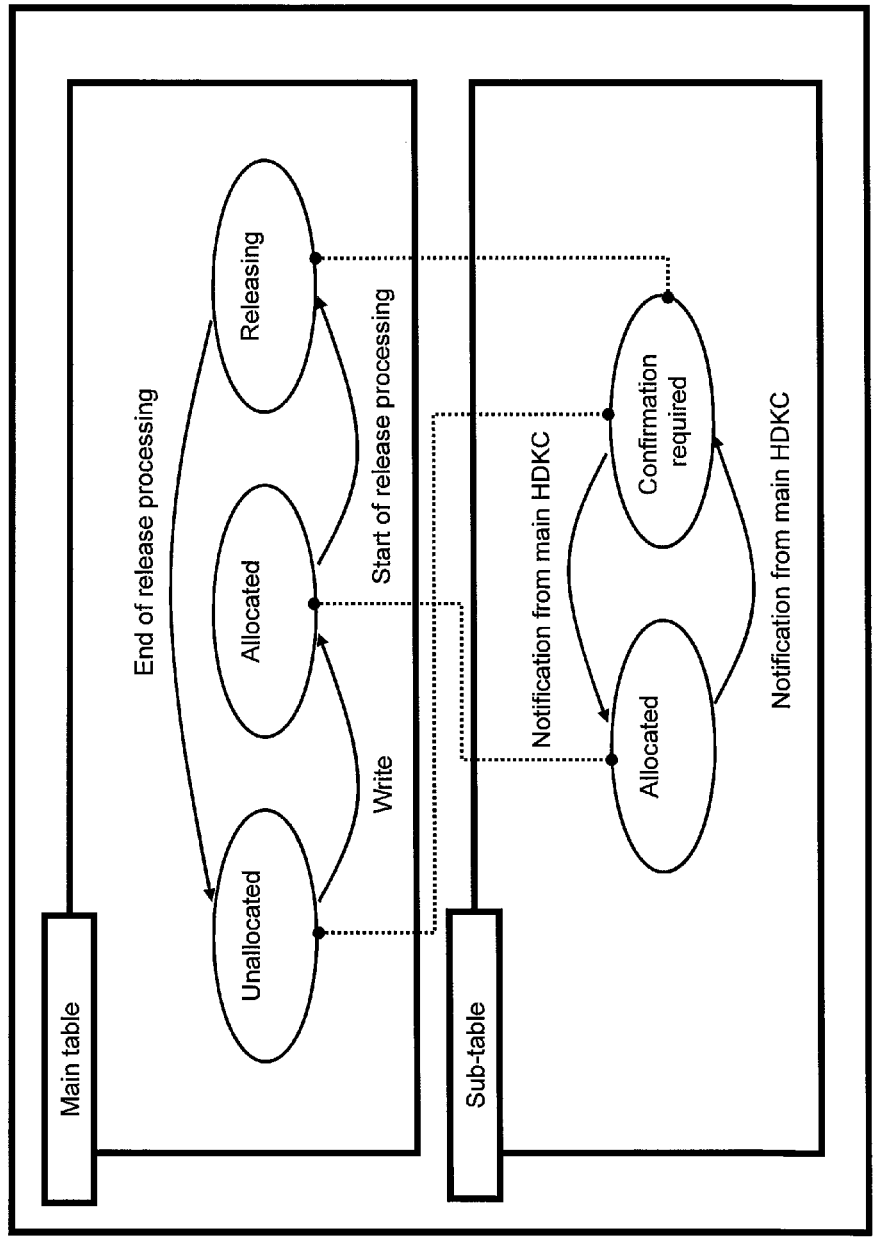
FIG. 38 shows the corresponding relationship between the value of the allocation status 1904 in the sub-table 325S and the value of the allocation status 1203 in the main table 325M.

FIG. 38 will be referred to here to explain the types of values of the allocation status 1904 in the sub-table 325S and the types of values of the allocation status 1203 in the main table 325M, and, in addition, to explain the corresponding relationship between the values of the allocation status 1904 in the sub-table 325S and the values of the allocation status 1203 in the main table 325M.

There are three types of values of the allocation status 1203 in the main table 325M. These are "unallocated", "allocated" and "releasing".

"Unallocated" signifies that an actual page has not been allocated to a virtual page.

"Allocated" signifies that an actual page has been allocated to a virtual page, and, in addition, that an allocated page release process has not been carried out with respect to the actual page that is allocated to the virtual page.

"Releasing" signifies that an actual page has been allocated to a virtual page, and, in addition, that the allocated-page release process has been started with respect to the actual page that is allocated to the virtual page, but that the release process has not ended.

The values of the allocation status 1203 transition as follows.
(*) In a case where the HDKC #H1 receives an I/O command specifying an address that belongs to a virtual page whose allocation status 1203 is "unallocated", the allocation status 1203 transitions from ""unallocated"" to "allocated".
(*) The allocation status 1203 transitions from "allocated" to "releasing" at the first stage of the allocated-page release process (for example, at the start-time) with respect to an actual page that is allocated to a virtual page whose allocation status 1203 is "allocated".
(*) The allocation status 1203 transitions from "releasing" to "unallocated" at the second stage of the allocated-page release process (the stage subsequent to the first stage, for example, at the end-time of the allocated-page release process) with respect to an actual page that is allocated to a virtual page whose allocation status 1203 is "releasing".

There are two types of values of the allocation status 1904 in the sub-table 325S. These are "allocated" and "confirmation required".

"Allocated" signifies that the virtual page allocation status 1203 in the main table 325M is "allocated".

"Confirmation required" signifies that the virtual page allocation status 1203 in the main table 325M is either "unallocated" or "releasing".

The allocation status 1904 value is configured as needed in response to a notification from the master HDKC.

<Actual Page Management Table 326>

FIG. 20A shows the configuration of the actual page management table 326 (for example, #H1).

The actual page management table #H1, for example, comprises the following information for each actual page of the HDKC #H1:
(*) A table pointer 2001, which denotes the address to the row that comprises information related to an actual page;
(*) a pool LU ID 2002, which is the identifier of the pool LU that includes the actual page;
(*) an actual page address 2003, which denotes the address of the actual page;
(*) an allocation status 2004, which denotes the allocation status of the actual page;
(*) a DP-LU 2005, which is the identifier of the DP-LU comprising the allocation-destination virtual page of the actual page; and
(*) an unallocated queue pointer 2006, which denotes the table pointer 1401 of a row related to another unallocated actual page.

The unallocated actual page is managed by a queue (hereinafter, the unallocated queue). The unallocated queue pointer 1406 denotes the table pointer 1401 of the row that corresponds to the unallocated actual page subsequent to the actual page corresponding to this pointer 1406. The CPU #H0 finds the actual page (the actual page corresponding to the table pointer 2001 that coincides with the pointer of the queue management table 327 (#H1) shown in FIG. 20B) at the top of the unallocated queue as the actual page to be allocated to the virtual page. Furthermore, according to FIG. 20B, the queue management table 327 (#H1) comprises a table pointer in the row corresponding to the first actual page of the unallocated queue, as well as a table pointer in the row corresponding to the last actual page of the unallocated queue.

Furthermore, in the unallocated queue, multiple unallocated actual pages may be lined up such that the internal volume (RG) becomes round-robin (refer to the multiple unallocated queue pointers 2006 of FIG. 20A). I/O is performed uniformly with respect to all of the internal volumes, and this makes it possible to avoid the concentration of I/O in only a specific internal volume.

<Dynamic Provisioning (Thin Provisioning)>

Figure 37:
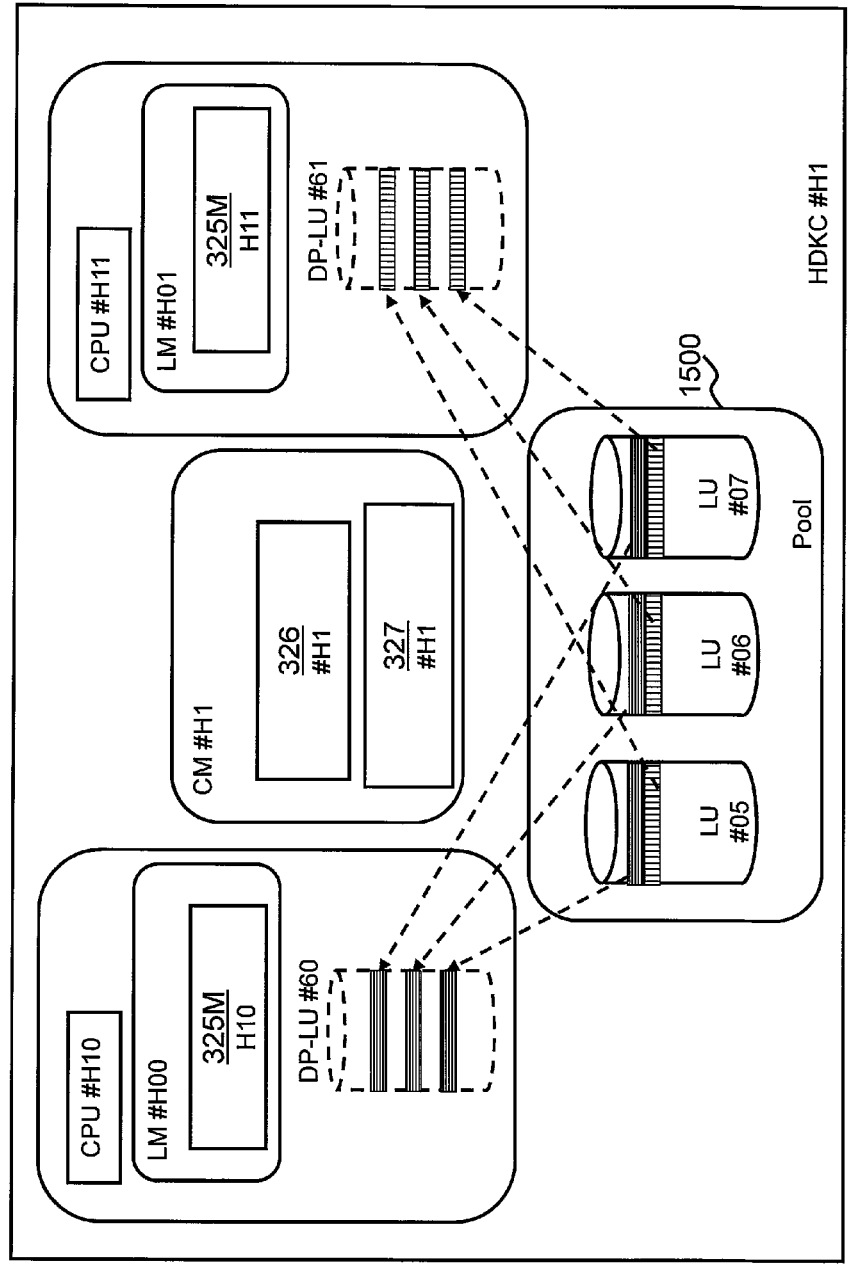
FIG. 37 shows a HDKC (#H1) to which dynamic provisioning (thin provisioning) is applied.

FIG. 37 shows a HDKC (#H1) to which Dynamic Provisioning (This Provisioning) is applied.

The HDKC #H1, as also shown in FIG. 2, comprises a CPU #H10 and a CPU #H11. A LM #H10 is coupled to the CPU #H10, and a LM #H11 is coupled to the CPU #H11. Furthermore, both the CPU #H10 and the CPU #H11 are able to access the CM #H1. The CM #H1 is the CMs #H10 and/or #H11 shown in FIG. 2.

A pool 1500 (#H10) is configured from multiple internal volumes. As used here, the "internal volume" is a volume in which physical storage capacity exists, and, for example, may be an ordinary LU, a virtual LU according to the second coupling mode, or a portion or all of a RG. Furthermore, the internal volume is not accessible from the server (is not recognize by the server).

The DP-LU is a LU that is accessible from the server, the same as an ordinary LU. There is a CPU-in-charge for the DP-LU. According to the example shown in FIG. 37, the CPU #H10 is in charge of the DP-LU #60, and the CPU #H11 is charge of the DP-LU #61.

The LM #H10 stores the virtual page management main table 325M (#H10), and similarly, the LM #H01 stores the virtual page management main table 325M (#H11). Because the virtual page management table #H10 (#H11) is accessed frequently, it is preferable that only the CPU-in-charge #H10 (#H11) perform referencing and updating, and that exclusive access control not be required to access the table. The virtual page management table #H10 comprises only information related to the DP-LU that is under the charge of the CPU #H10 and the virtual page management table #H11 comprises only information related to the DP-LU that is under the charge of the CPU #H11.

The CM #H1 stores the actual page management table 326 (#H1) and the top-of-queue management table 327 (#H1). In this example, since the pool #H10 is associated with both the DP-LU #60 that is under the charge of the CPU #H10 and the DP-LU #61 that is under the charge of the CPU #H11, the actual page management table #H1 must be able to be referenced and upgraded from all the CPUs (in this example, the CPUs #H10 and #H11). For this reason, the CM #H1 stores the actual page management table #H1 rather than the LMs #H10 and #H11. Furthermore, exclusive access control is exercised with respect to the actual page management table #H1.

<Processing Performed by First Embodiment>

The various processes carried out by the first embodiment will be explained hereinbelow. Furthermore, each type of process is realized by the CPU executing a computer program, but a hardware circuit may execute a portion of these processes.

<<LU Mapping Process>>

Figure 22:
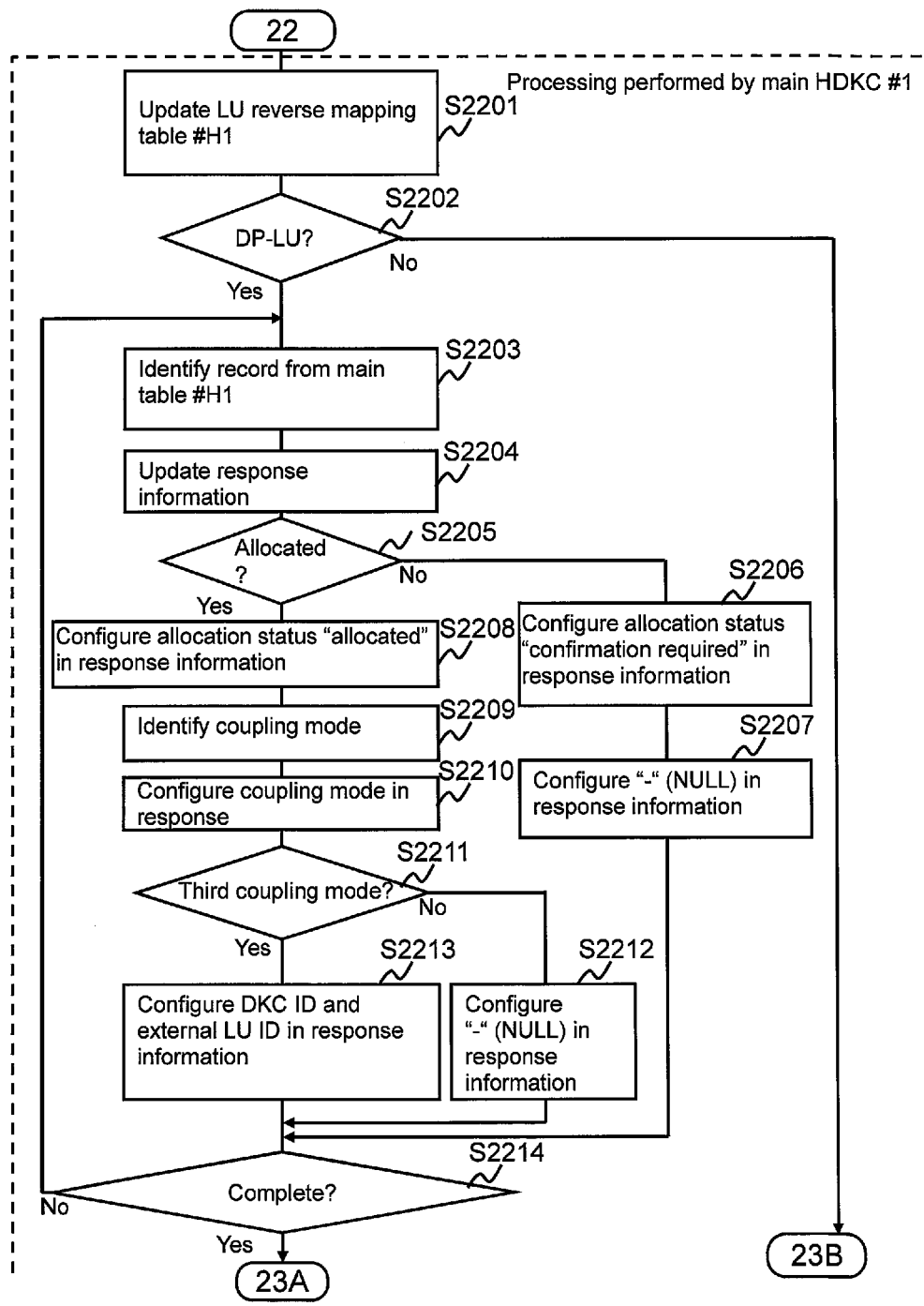
FIG. 22 shows a second part of the example of the flow of the LU mapping processing.
Figure 23:
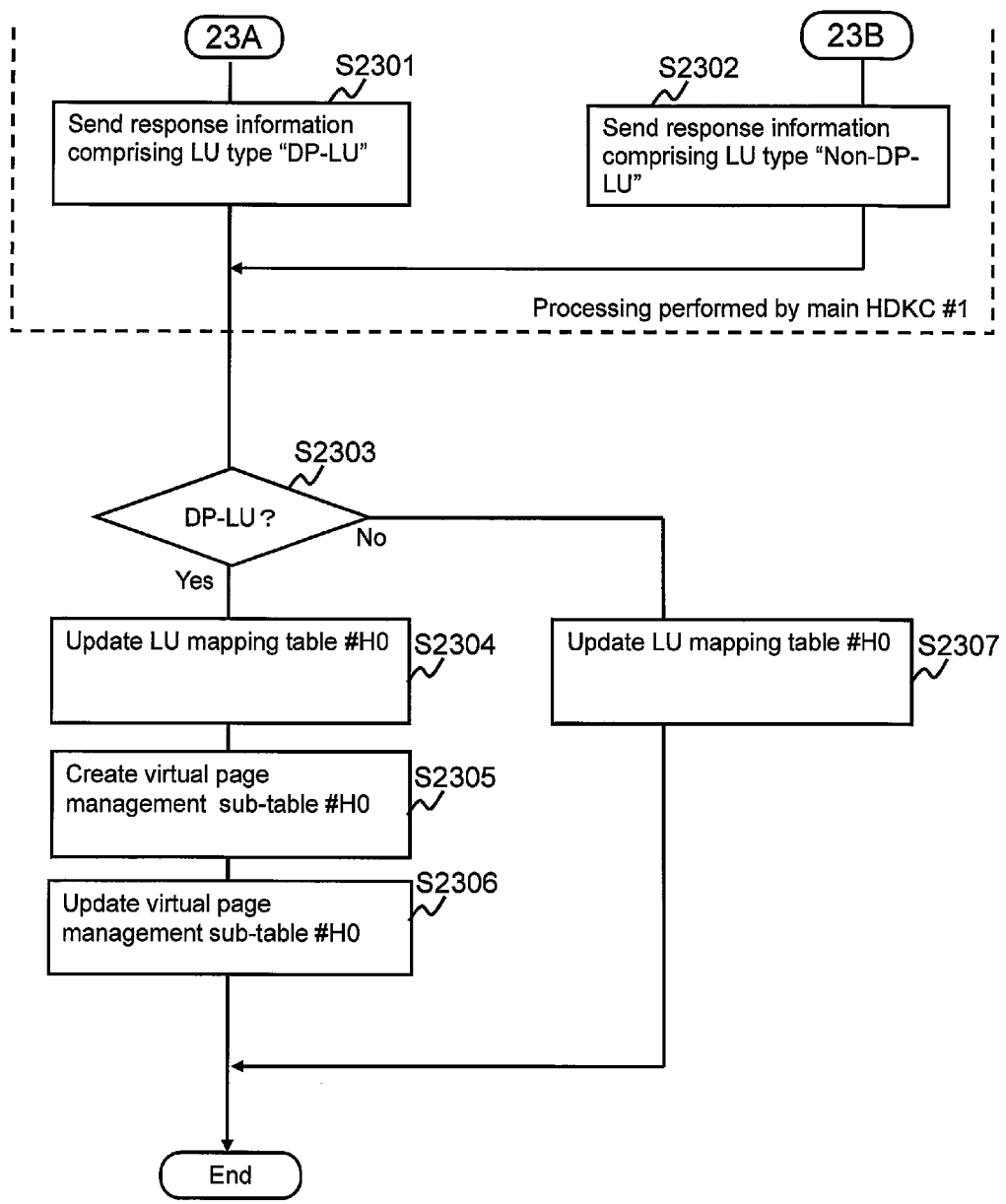
FIG. 23 shows a third part of the example of the flow of the LU mapping processing.

FIGS. 21, 22 and 23 show an example of the flow of a LU mapping process. The LU mapping process maps an external LU inside a second HDKC to a virtual LU inside a first HDKC. The LU mapping process will be explained below by referring to FIGS. 21 through 23, and giving examples in which the LU #0 inside the HDKC #H0 serves as the virtual LU inside the first HDKC and the LU #1 inside the HDKC #H1 serves as the external LU inside the second HDKC.

In S2101, the internal controller #H0 adds information related to the virtual LU #0 to the tier management table #H0. Specifically, for example, the internal controller #H0 carries out the following processing:
(*) adds a record to the tier management table #H0; and
(*) registers "0" as the LU ID 1301, and, in addition, registers "third coupling mode" as the coupling mode 1302 in the added record.

The registered information, for example, may be information that was inputted from the management apparatus.

In S2102, the internal controller #H0 adds information related to the virtual LU #0 to the LU mapping table #H0. Specifically, for example, the internal controller #H0 carries out the following processing:
(*) adds a record to the LU mapping table #H0; and
(*) registers "0" as the LU ID 1501, registers "H1" as the DKC ID 1502, registers "1" as the external LU ID 1503, and, in addition, registers "DP-LU" as the LU type 1504 in the added record.

The registered information, for example, may be information that was inputted from the management apparatus.

In S2103, in the internal controller #H0, the CPU-in-charge #H00 of the virtual LU #0 sends a query to the HDKC #H1 denoted by the DKC ID 1502 registered in S2102 having as the query target the LU #1 denoted by the external LU ID 1503 registered in S2102. This query comprises "1" as the ID of the LU #1, which is the query target. Furthermore, this query may comprise "0" as the ID of the LU #0, which is mapped to the LU #1. This is so that the LU reverse mapping table #H1 described hereinabove will be updated. Furthermore, instead of including the ID "0" of the LU #0 mapped to the LU #1 in the query of S2103, this ID "0" may be sent at a different timing from the sending of the query of S2103.

Next, processing is carried out in the HDKC #H1 as shown in FIG. 22. The HDKC #H1 carries out S2201 to S2214, and S2301 to S2302 in FIG. 23.

In S2201, the internal controller #H1 receives the query of S2103, and based on this query, updates the LU reverse mapping table #H1. Specifically, for example, the internal controller #H1 carries out the following processing:
(*) adds a record to the LU reverse mapping table #H1; and
(*) registers the ID "1" of the above-mentioned query-target LU #1 as the external LU ID 1701, registers the ID "1" of the above-mentioned query-source HDKC #H0 as the DKC ID 1702, and, in addition, registers the ID "0" of the above-mentioned query virtual LU as the LU ID 1703 in the added record.

In S2202, the internal controller #H1 determines whether or not the query-target LU #1 received in S2201 is a DP-LU. This determination, for example, may be carried out based on the above-described LU management table (the table in which is registered to LU type for each LU).

In a case where the result of the determination of S2202 is affirmative (S2202: Yes), S2203 through S2214 are carried out with respect to all the records in the main table #H1 corresponding to the LU #1 (As is clear from FIG. 22, not all processing is carried out in accordance with branching).

In S2203, the CPU-in-charge #H10 of the query-target DP-LU #1 identifies one record for which this LU mapping process has yet to be identified from the main table #H1 corresponding to the LU #1 (for example, by searching from the first record to the last record of the main table #H1).

In S2204, the CPU-in-charge #H10 updates the response information to be sent as a response to the above-mentioned query. Specifically, for example, the CPU-in-charge #H10 carries out the following processing:
(*) adds a record to the response information; and
(*) registers an address set (the address of the virtual page and the address of the actual page allocated to this virtual page) of the record identified in S2203 in the added record.

In S2205, the CPU-in-charge #H10 determines whether or not the allocation status 1203 in the record identified in S2203 is "allocated".

In a case where the result of the determination of S2205 is negative (a case in which the allocation status 1203 is "unallocated or releasing") (S2205: No), in S2206, the CPU-in-charge #H10 configures the allocation status "confirmation required" in the record added to the response information.

In S2207, the CPU-in-charge #H10 configures "-" (a value signifying NULL) for all of the below information elements in the record added to the response information. Therefore, in S2206, the value of the actual page address configured in S2204 is changed to "-".
(*) The coupling mode corresponding to the pool LU denoted in the record identified in S2203
(*) the ID of the DKC comprising this pool LU entity
(*) the ID of this pool LU entity
(*) the address of the actual page in this pool LU entity In a case where the result of the determination of S2205 is affirmative (a case in which the allocation status 1203 is "allocated") (S2205: Yes), in S2208, the CPU-in-charge #H10 configures the allocation status "allocated" in the record added to the response information.

In S2209, the CPU-in-charge #H10 identifies from the tier management table #H1 the value of the coupling mode 1302 that corresponds to the value of the pool LU ID 1204 in the record identified in S2203.

In S2210, the CPU-in-charge #H10 configures the coupling mode 1302 identified in S2209 as the coupling mode in the record added to the response information.

In S2211, the CPU-in-charge #H10 determines whether or not the value of the coupling mode 1302 identified in S2209 is the "third coupling mode".

In a case where the result of the determination of S2211 is negative (S2211: No), the CPU-in-charge #H10 configures "-" (a value signifying NULL) for all of the below information elements in the record added to the response information:
(*) The ID of the DKC comprising the pool LU entity denoted in the record identified in S2203;
(*) ID of this pool LU entity.

In a case where the result of the determination of S2211 is affirmative (S2211: Yes), in S2213, the CPU-in-charge #H10 identifies from the LU mapping table #H1 the DKC ID 1502 corresponding to the value of the pool LU ID 1204 and the external LU ID 1503 in the record identified in S2203. Then, the CPU-in-charge #H10 configures the following values in the record added to the response information:
(*) the value of the DKC ID 1502 identified in this S2213 as the ID of the DKC comprising the pool LU entity denoted in the record identified in S2203; and
(*) the value of the external LU ID 1503 identified in this S2213 as the ID of this pool LU entity.

In S2214, the CPU-in-charge #H10 determines whether or not the last record of the main table #H1 corresponding to the DP-LU #1 was identified in the recent S2103. In a case where the result of this determination is negative, S2203 is carried out once again to identify an as yet unidentified record from the main table #H1. Alternatively, in a case where the result of this determination is affirmative, S2301 of FIG. 23 is carried out.

In a case where the result of the determination of S2202 is negative (S2202: No), S2302 of FIG. 23 is carried out.

In S2301, the CPU-in-charge #H10 includes "DP-LU" as the information denoting the LU type in the record added to the response information, and sends this response information to the HDKC #H0, which is the source of the above-mentioned query.

In S2302, the CPU-in-charge #H10 sends the response information comprising "non-DP-LU" as the information denoting the LU type to the HDKC #H0, which is the source of the above-mentioned query.

In S2303, the internal controller #H0 receives the response information from the HDKC #H1, and determines whether or not the LU type of this response information is "DP-LU".

In a case where the result of the determination of S2303 is affirmative (S2303: Yes), in S2304, the CPU-in-charge #H00 of the LU #0 identifies the record corresponding to the LU #0 from the LU mapping table #H0 and registers the following values in this record:
(*) "H1" as the value of the DKC ID of the received response information;
(*) "1" as the value of the external LU ID of the received response information; and
(*) "DP-LU" as the value of the LU type of the received response information.

In S2305, the CPU-in-charge #H00 creates a sub-table #H0 corresponding to the LU #0, and registers the following information in this table #H0:
(*) ID of HDKC #H1 comprising the LU #1 mapped to the LU #0 as the DP-LU DKC ID 1901; and
(*) ID of the LU #1 mapped to the LU #0 as the DP-LU ID 1902.

In S2306, the CPU-in-charge #H00 registers each parameter (the value of the allocation status, the value of the coupling mode, the ID of the DKC comprising the pool LU entity, the ID of the pool LU entity, and the actual page address) of the response information received in S2303 for each virtual page configuring the LU #0 (for each address corresponding to each virtual page address with respect to the LU #1) in the sub-table #H0 created in S2305.

In a case where the result of the determination of S2303 is negative (S2303: No), in S2307, the CPU-in-charge #H00 of the LU #0 identifies the record corresponding to the LU #0 from the LU mapping table #H0 and configures "non-DP-LU" as the value of the LU type of the received response information as the LU type 1504.

<First Type I/O Command Processing Carried Out when HDKC (for Example, #H1) Receives I/O Command Specifying DP-LU (Server LU) (for Example, #1) Inside this HDKC from Server (for Example, #1) Coupled to this HDKC>

A first type of I/O command processing will be explained by referring to FIGS. 24 through 28.

Figure 24:
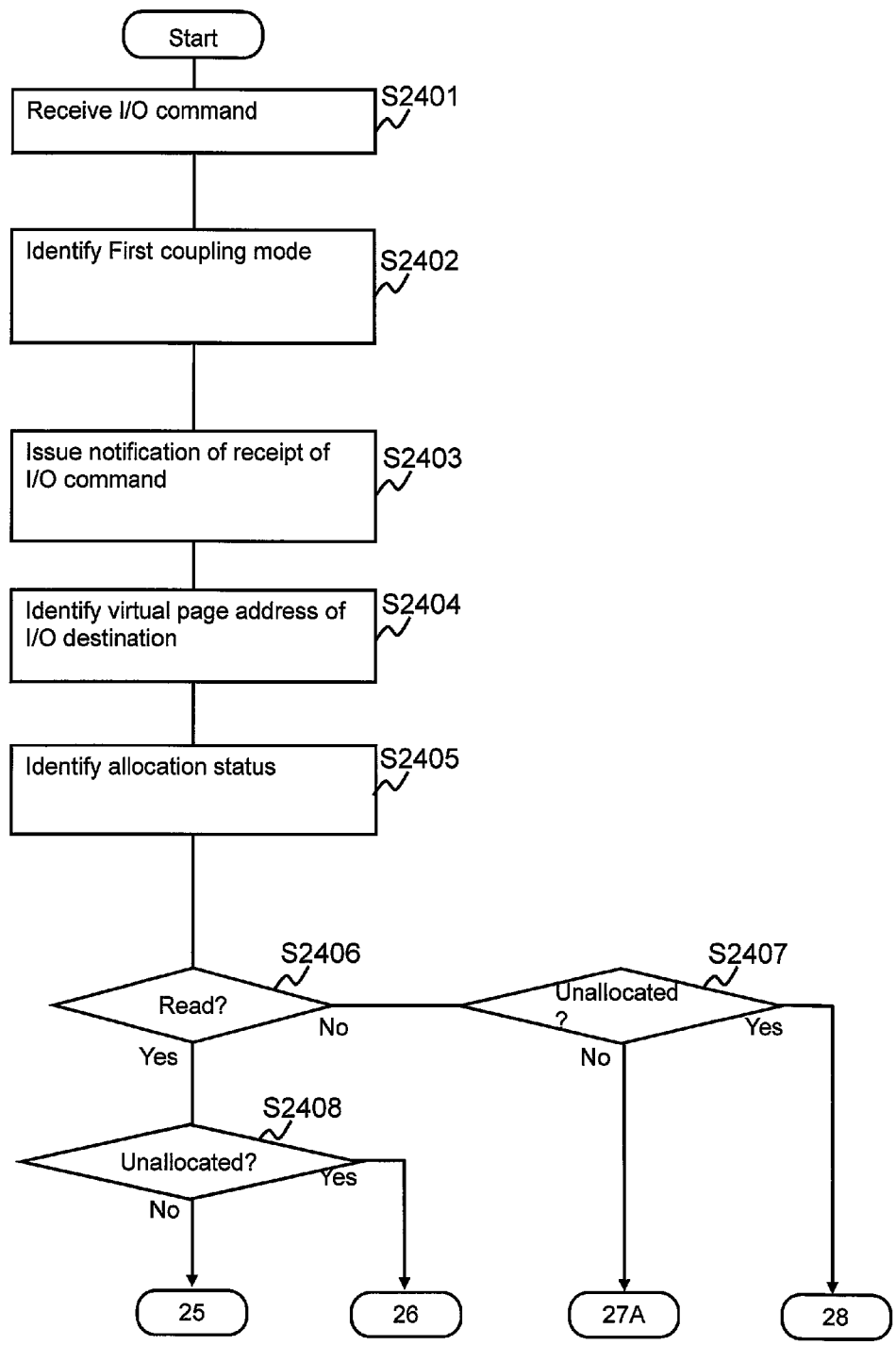
FIG. 24 shows a first part of an example of the flow of a first type of I/O command processing.

As shown in FIG. 24, in S2401, the internal controller #H1 of the HDKC #H1 (for example, F-I/F #H1) receives an I/O command from the server. The I/O command, for example, comprises a LUN "1", and an I/O-destination virtual page address (for example, a LBA (Logical Block Address)) as information related to the I/O-destination LU.

In S2402, the internal controller #H1 (for example, the F-I/F #H1 that received the I/O command in S2401) identifies the "first coupling mode" from the tier management table #H1 as the value of the coupling mode 1302 corresponding to the I/O-destination LU #1.

In S2403, the internal controller #H1 (for example, the F-I/F #H1 that received the I/O command in S2401) identifies the CPU-in-charge #H10 corresponding to the LU #1 from the CPU-in-charge table #H1, and notifies the identified CPU-in-charge #H10 of the receipt of the I/O command.

In S2404, the CPU-in-charge #H10 identifies the virtual page address of the I/O destination from the above-mentioned received I/O command.

In S2405, the CPU-in-charge #H10 identifies the allocation status 1203 corresponding to the virtual page address identified in S2404 from the main table #H1.

<<Case where I/O command received in S2401 is read command, and value of allocation status 1203 identified in S2405 is "unallocated" (S2406: Yes, S2408: No)>>

Figure 25:
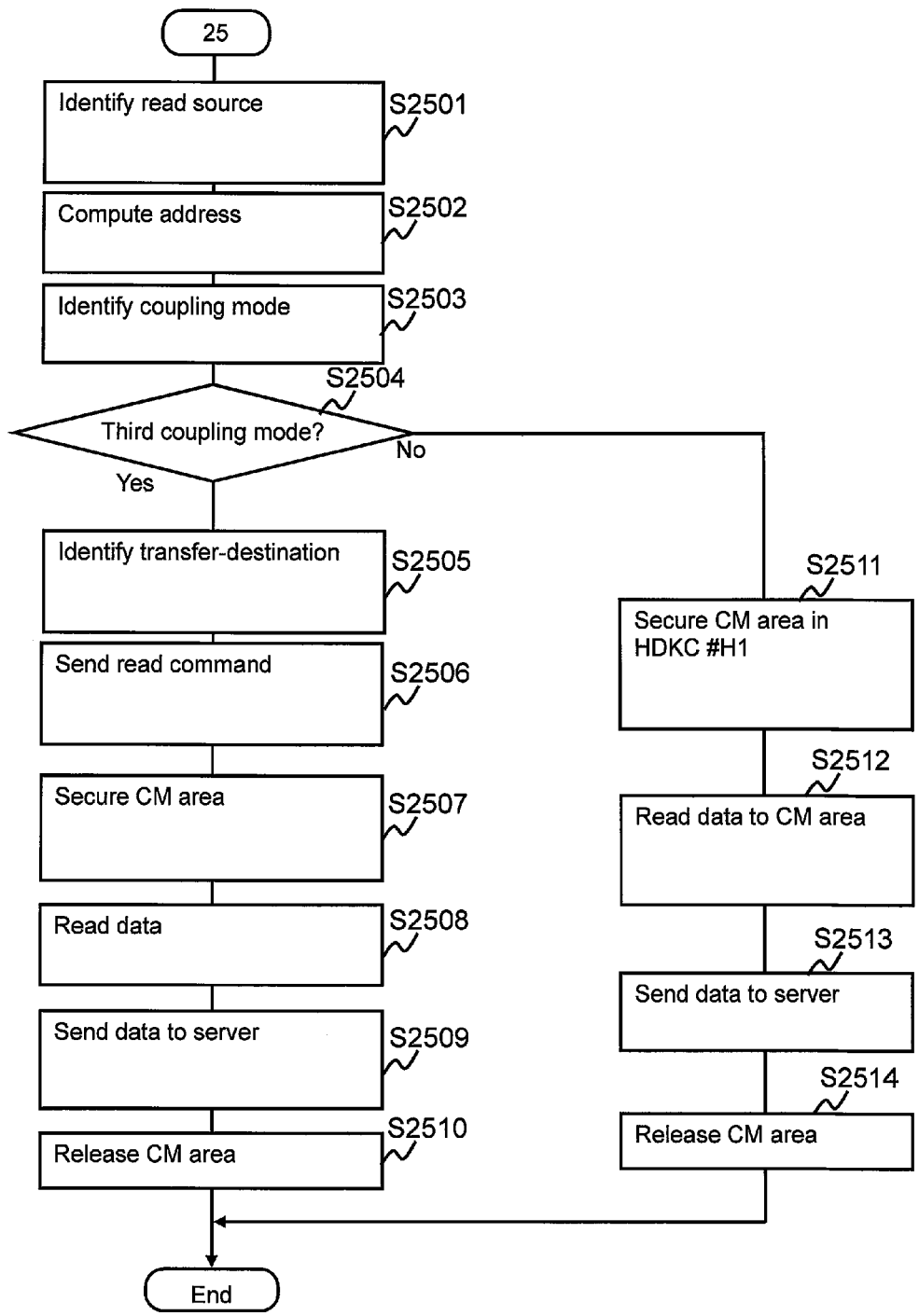
FIG. 25 shows a second part of the example of the flow of the first type of I/O command processing.

The processing of FIG. 25 is carried out.

That is, in S2501, the CPU-in-charge #H10 identifies from the main table #H1 the pool LU ID 1204 and the actual page address 1205 corresponding to the virtual page address identified in S2404.

In S2502, the CPU-in-charge #H10 computes the actual address based on the value of the actual page address 1205 identified in S2501.

In S2503, the CPU-in-charge #H10 identifies the coupling mode 1302 corresponding to the I/O-destination LU #1 from the tier management table #H1.

In S2504, the CPU-in-charge #H10 determines whether or not the value of the coupling mode 1302 identified in S2503 is the "third coupling mode".

In a case where the result of the determination of S2504 is affirmative (S2504: Yes), in S2505, the CPU-in-charge #H10 identifies the DKC ID 1502 (for example, #H2) and the external LU ID 1503 (for example, #X) corresponding to the pool LU (for example, #B) identified in S2501 from the LU mapping table #H1.

In S2506, the CPU-in-charge #H10 sends a read command specifying the address computed in the S2502 and the external LU #X identified in S2505 to the HDKC #H2 identified in S2505.

In S2507, the HDKC #H2 receives the read command, the CPU-in-charge #H20 of the LU #X secures a CM area in the CM #H2 with respect to the address specified in the received read command. Furthermore, in a case where this CM area has already been secured, the CPU-in-charge #H20 waits until this CM area is released.

In S2508, the CPU-in-charge #H20 reads from the LU #X the read-target data that conforms to the read command received in S2507, stores this data in the CM area secured in S2507, and reports to the HDKC #H1 that the processing has been completed.

In S2509, the CPU-in-charge #H10 receives the data in the CM area inside the HDKC #H2 from the HDKC #H2, sends this data to the server #1, and reports read-complete to the HDKC #H2.

In S2510, the CPU-in-charge #H20 releases the CM area secured in S2507.

In a case where the result of the determination of S2504 is negative (S2504: No), in S2511, the CPU-in-charge #H10 of the LU #1 secures a CM area in the CM #H1 with respect to the address computed in S2502. Furthermore, in a case where this CM area has already been secured, the CPU-in-charge #H10 waits until this CM area is released.

In S2512, the CPU-in-charge #H10 reads the data from the pool LU inside the HDKC #H1 (or the external pool LU inside the LDKC) based on the address computed in S2502, and stores this data in the CM area secured in S2504.

In S2513, the CPU-in-charge #H10 sends the data stored in S2512 from the CM area to the server #1.

In S2514, the CPU-in-charge #H10 releases the CM area secured in S2511.

<<Case where I/O command received in S2401 is read command, and value of allocation status 1203 identified in S2405 is "unallocated" (S2406: Yes, S2408: Yes)>>

Figure 26:
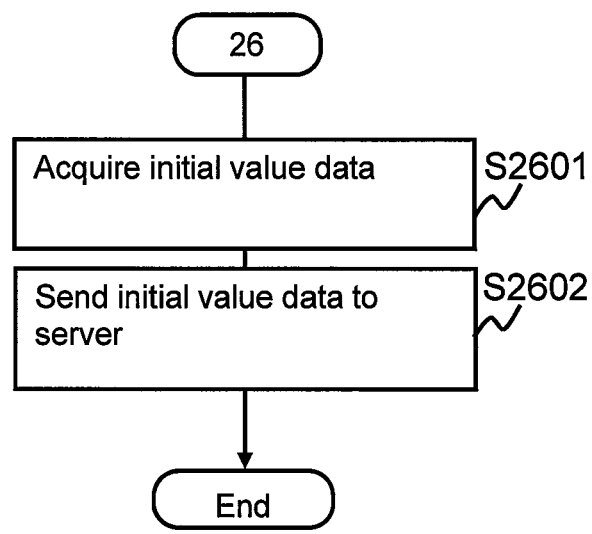
FIG. 26 shows a third part of the example of the flow of the first type of I/O command processing.

The processing of FIG. 26 is carried out.

That is, in S2601, the CPU-in-charge #H10 creates initial value data in the CM #H1 (the initial value data may exist in a prescribed storage area inside the HDKC #H1).

In S2602, the CPU-in-charge #H10 sends the initial value data created in S2601 to the server #1.

<<Case where I/O command received in S2401 is write command, and value of allocation status 1203 identified in S2405 is not "unallocated" (S2406: No, S2407: No)>>

Figure 27:
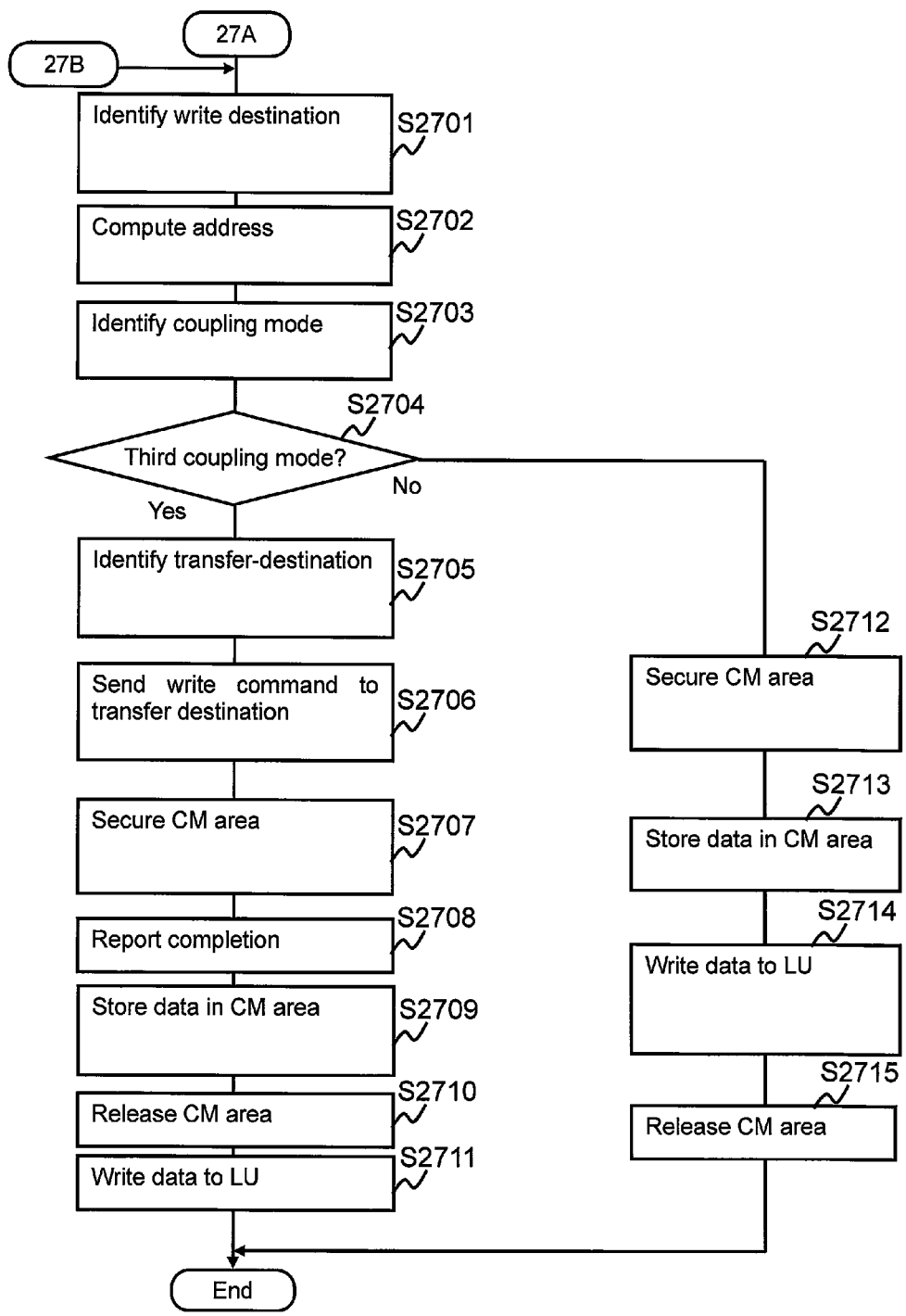
FIG. 27 shows a fourth part of the example of the flow of the first type of I/O command processing.

The processing of FIG. 27 is carried out.

That is, in S2701, the CPU-in-charge #H10 identifies the pool LU ID 1204 and the actual page address 1205 corresponding to the virtual page address identified in S2404 from the main table #H1.

In S2702, the CPU-in-charge #H10 computes the actual address based on the value of the actual page address 1205 identified in S2701.

In S2703, the CPU-in-charge #H10 identifies the coupling mode 1302 corresponding to the I/O-destination LU #1 from the tier management table #H1.

In S2704, the CPU-in-charge #H10 determines whether or not the value of the coupling mode 1302 identified in S2703 is the "third coupling mode".

In a case where the result of the determination of S2704 is affirmative (S2704: Yes), in S2705, the CPU-in-charge #H10 identifies DKC ID 1502 (for example, #H2) and the external LU ID 1503 (for example, #X) corresponding to the pool LU (for example, #B) identified in S2701 from the LU mapping table #H1.

In S2706, the CPU-in-charge #H10 sends a write command specifying the external LU #X identified in S2705 and the address computed in S2702 to the HDKC #H2 identified in S2705.

In S2707, the HDKC #H2 receives the write command, and the CPU-in-charge #H20 of the LU #X secures a CM area in the CM #H2 with respect to the address specified in the received write command. Furthermore, in a case where this CM area has already been secured, the CPU-in-charge #H20 waits until this CM area is released.

In S2708, the CPU-in-charge #H20 reports to the HDKC #H1 that processing is complete.

In S2709, the CPU-in-charge #H20 receives write-target data that conforms to the write command received in S2707, stores this data in the CM area secured in S2707, and reports processing complete to the HDKC #H1.

In S2710, the CPU-in-charge #H20 releases the CM area secured in S2707.

In S2711, the CPU-in-charge #H20 writes the write-target data inside the CM #H2 (the data that has not been written to the LU #X) to the LU #X.

In a case where the result of the determination in S2704 is negative (S2704: No), in S2712, the CPU-in-charge #H10 of the LU #1 secures a CM area in the CM #H1 with respect to the address computed in S2702. Furthermore, in a case where this CM area has already been secured, the CPU-in-charge #H10 waits until this CM area is released.

In S2713, the CPU-in-charge #H10 stores the write-target data conforming to the above-mentioned write command to the CM area secured in S2712, and issues a processing-complete response to the server #1.

In S2714, the CPU-in-charge #H10 writes the write-target data inside the CM #H1 to the pool LU inside the HDKC #H1 (or the external pool LU inside the LDKC) based on the address computed in S2702.

In S2715, the CPU-in-charge #H10 releases the CM area secured in S2712.

<<Case where I/O command received in S2401 is write command, and value of allocation status 1203 identified in S2405 is "unallocated" (S2406: No, S2407: Yes)>>

Figure 28:
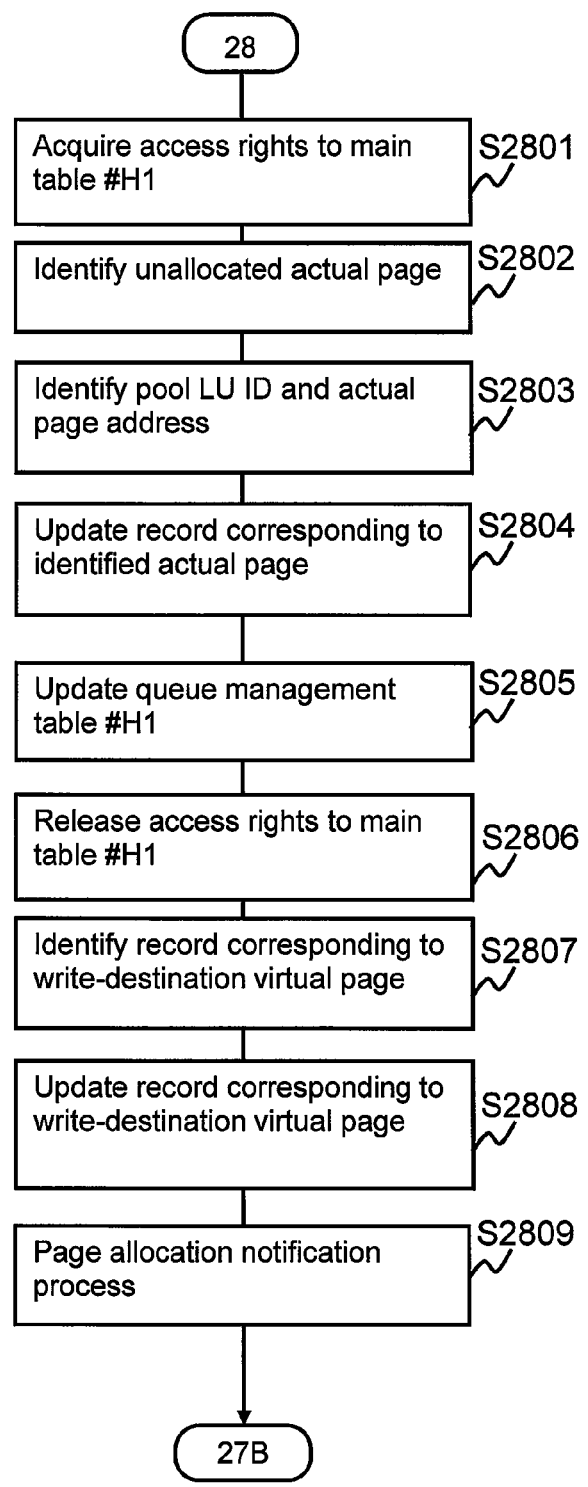
FIG. 28 shows a fifth part of the example of the flow of the first type of I/O command processing.

The processing of FIG. 28 is carried out.

In S2801, the CPU-in-charge #H10 acquires the rights for accessing the actual page management table #H1. Thereafter, the other CPU #H1 is not able to access the actual page management table #H1.

In S2802, the CPU-in-charge #H10 identifies the table pointer corresponding to an unallocated actual page from the first-page pointer of the queue management table #H1.

In S2803, the CPU-in-charge #H10 identifies the record in the actual page management table #H1 that corresponds to the table pointer identified in S2802, and identifies the pool LU ID 2002 and the actual page address 2003 from this record.

In S2804, the CPU-in-charge #H10 updates the actual page management table #H1. Specifically, for example, the CPU-in-charge #H10 carries out the following processing:
(*) updates the allocation status 2004 in the record identified in S2803 to "allocated"; and
(*) updates the DP-LU ID 2005 in the record identified in S2803 to "1" (the ID of the write-destination DP-LU #1).

In S2805, the CPU-in-charge #H10 updates the actual page management table #H1 and the queue management table #H1. Specifically, for example, the CPU-in-charge #H10 carries out the following processing:
(*) copies the unallocated queue pointer 2006 in the record identified in S2803 to the first-page pointer of the queue management table #H1; and (*) updates the unallocated queue pointer 2006 in the record identified in S2803 to the NULL value "-".

In S2806, the CPU-in-charge #H10 releases the access rights acquired in S2801. Thereafter, the other CPU #H1 is able to access the actual page management table #H1.

In S2807, the CPU-in-charge #H10 identifies the record corresponding to the write-destination virtual page address in the main table #H1.

In S2808, the CPU-in-charge #H10 updates the main table #H1. Specifically, for example, the CPU-in-charge #H10 carries out the following processing:
(*) updates the allocation status 1203 in the identified record to "allocated";
(*) updates the pool LU ID 1204 in the identified record to an ID that matches the pool LU ID 2002 identified in S2803; and
(*) updates the actual page address 1205 in the identified record to an address that matches the actual page address 2003 identified in S2803.

Figure 29:
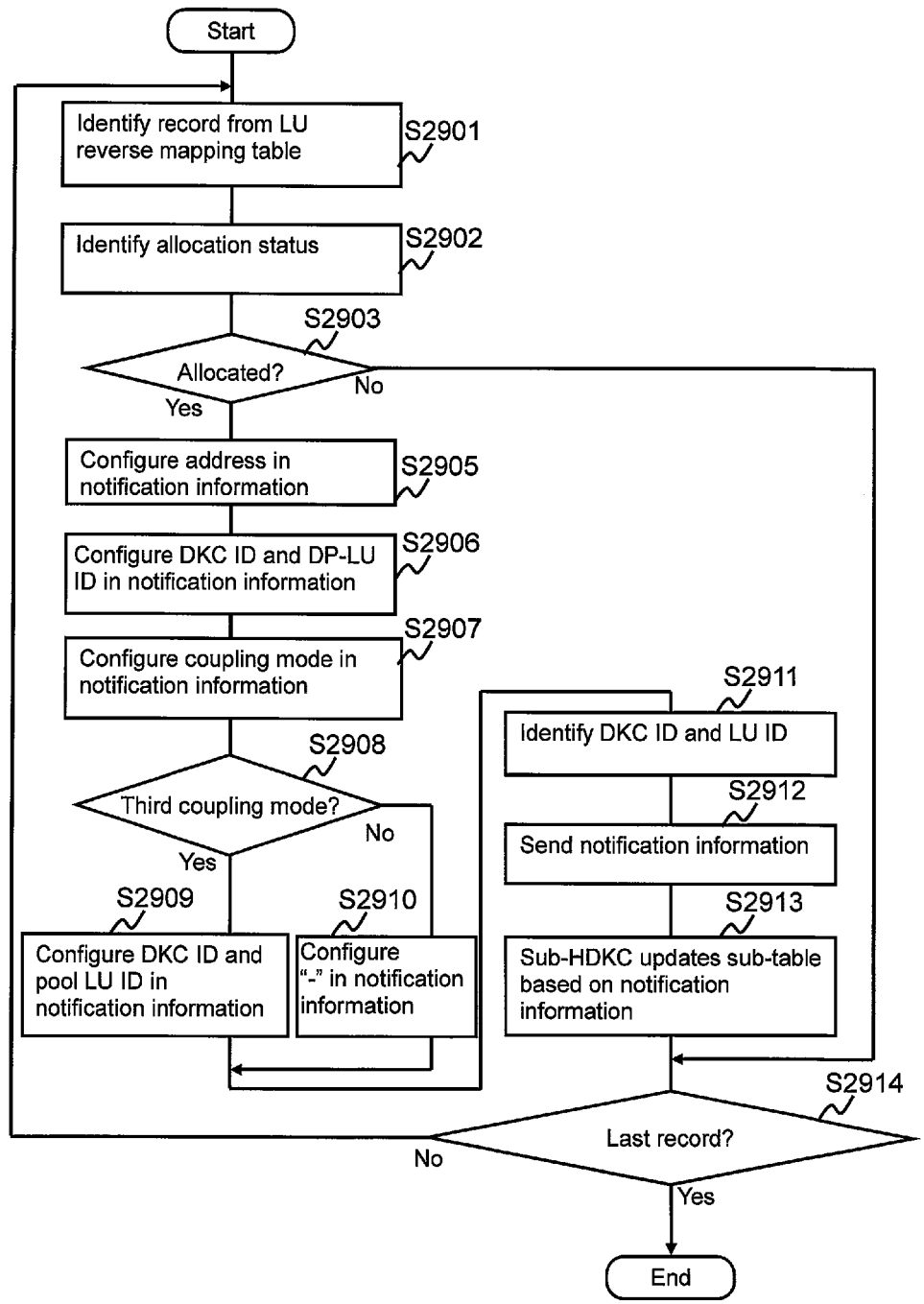
FIG. 29 shows an example of the flow of page allocation notification processing.

In S2809, the CPU-in-charge #H10 may start a page allocation notification process shown in FIG. 29 (a process for notifying the sub-HDKCs #H0 and #H2 of the value of the allocation status 1203 of the virtual page in the main HDKC #H1). The CPU-in-charge #H10 may start S2701 of FIG. 27 without waiting for this processing to end. In this first type of I/O command processing (for example, between S2701 and S2808), the page allocation notification process does not need to be carried out. For example, the page allocation notification process may be carried out at a timing that is unrelated to the first type of I/O command processing (as one example, the page allocation notification process may be carried out on a regular basis). However, as in S2808, it is considered preferable that the page allocation notification process be carried out at the time the virtual page allocation status 1203 is updated. This is because, in a case where the sub-HDKCs #H0 and #H2 receive an I/O command specifying an address belonging to a virtual LU, queries have to be sent from the sub-HDKCs #H0 and #H2 to the main HDKC #H1 when the allocation status of the virtual page (the I/O-destination virtual page) to which this address belongs is "confirmation required". In other words, this is because in a case where the allocation status of the I/O-destination virtual page is changed from "confirmation required" to "allocated" even a little early in the sub-HDKCs #H0 and #H2, the queries from the sub-HDKCs #H0 and #H2 to the main HDKC #H1 become unnecessary, thereby making it possible to shorten the time required to process the I/O command received by the sub-HDKCs #H0 and #H2.

<Page Allocation Notification Process>

The page allocation notification process will be explained by giving an example of a case in which the DP-LU is LU #1.

The page allocation notification process is for notifying the sub-HDKCs #H0 and #H2 of the value of the allocation status 1203 of the virtual page in the main HDKC #H1. The page allocation notification process sends notification information (a page allocation notification) to the sub-HDKCs #H0 and #H2 comprising the pool LU entity that comprises this actual page when an actual page has been allocated to an "unallocated" virtual page of the DP-LU #1.

FIG. 29 shows an example of the flow of the page allocation notification process.

S2901 through S2914 are carried out with respect to all records in the LU reverse mapping table #H1 (As is clear from FIG. 29, not all of the processing is carried out in accordance with branching).

In S2901, the internal controller #H1 inside the main HDKC #H1 identifies one record for which this page allocation notification process has yet to be identified from the LU mapping table #H1 (for example, by searching from the first record to the last record of the LU reverse mapping table #H1).

In S2902, the CPU-in-charge #H10 (the CPU-in-charge of the DP-LU #1 corresponding to the external LU ID 1701 in the record identified in S2901) identifies the main table #H1 corresponding to the external LU ID 1701 (DP-LU #1) in the record identified in S2901. For example, in a case where this page allocation notification process is carried out during the first type of I/O command processing, the record corresponding to the I/O-destination virtual page address is identified from the main table #H1. Hereinafter, this identified record will be called the "target record" in the explanation of FIG. 29.

In S2903, the CPU-in-charge #H10 determines whether or not the value of the allocation status 1203 in the target record is "allocated".

In a case where the result of the determination of S2903 is negative (a case in which the value of the allocation status 1203 is either "unallocated" or "releasing") (S2903: No), S2914 is carried out.

Alternatively, in a case where the result of the determination of S2903 is affirmative (a case in which the value of the allocation status 1203 is "allocated") (S2903: Yes), in S2905, the CPU-in-charge #H10 identifies the virtual page address 1202, the pool LU ID 1204, and the actual page address 1205 in the target record, and configures each of these values in the notification information.

In S2906, the CPU-in-charge #H10 configures "H1" in the notification information as the ID of the DKC comprising the DP-LU, and, in addition, configures "1" as the ID of the DP-LU in the notification information.

In S2907, the CPU-in-charge #H10 identifies from the tier management table #H1 the coupling mode 1302 corresponding to the value of the pool LU ID 1204 identified in S2905.

In S2908, the CPU-in-charge #H10 determines whether or not the value of the coupling mode 1302 identified in S2907 is the "third coupling mode".

In a case where the result of the determination of S2908 is affirmative (S2908: Yes), the CPU-in-charge #H10 carries out the following processing in S2909:
(*) identifies from the LU mapping table #H1 the DKC ID 1502 and the external LU ID 1503 corresponding to the value of the pool LU ID 1204 identified in S2905;
(*) configures the value of the identified DKC ID 1502 in the notification information as the ID of the DKC comprising the pool LU entity; and
(*) configures the value of the identified external LU ID 1503 in the notification information as the ID of the pool LU entity.

In a case where the result of the determination of S2908 is negative (S2908: No), in S2910, the CPU-in-charge #H10 configures "-" (the NULL value) in the notification information as both the ID of the DKC comprising the pool LU entity and the pool LU.

Hereinafter, it is supposed that the result of the determination of S2908 is affirmative, and that the pool LU corresponding to the target record is the "pool LU #C".

In S2911, the CPU-in-charge #H10 identifies the DKC ID 1702 and the LU ID 1703 from the record identified in S2901.

In S2912, the CPU-in-charge #H10 sends the notification information (information comprising "0" as the value of the LU ID 1703 identified in S2911) to the HDKC #H0 corresponding to the DKC ID 1702 identified in S2911.

In S2913, the HDKC #H0, which received the notification information sent in S2912, identifies the CPU-in-charge #H00 corresponding to the LU ID "0" in this notification information. The identified CPU-in-charge #H00 identifies the sub-table #H0 corresponding to the external LU ID "1" in the notification information, and updates the record corresponding to the virtual page address in the notification information in this sub-table #H0 as follows.

(*) The "third coupling mode" is registered as the coupling mode 1905. This is because valid values (for example, DKC ID "H0", external LU ID "Y") are configured as the DKC ID, the external LU ID, and the actual page address in the notification information. In a case where the NULL value is configured as these values in the notification information, the "first coupling mode" or "second coupling mode" is registered as the coupling mode 1905.

(*) "0" is registered as the pool LU DKC ID 1906.
(*) "Y" is registered as the pool LU ID 1907.
(*) The actual page address inside the notification information is registered as the actual page address 1908.

In S2914, the internal controller #H1 determines whether or not all of the records from the LU reverse mapping table #H1 have been identified in this page allocation notification information. In a case where the result of this determination is negative (S2914: No), S2901 is carried out once again.

<Second type I/O command processing carried out when HDKC (for example, #H0) receives I/O command specifying virtual LU (server LU) (for example, #0) inside this HDKC from server (for example, #0) coupled to this HDKC>

A second type of I/O command processing will be explained by referring to FIGS. 30 through 35.

Figure 30:
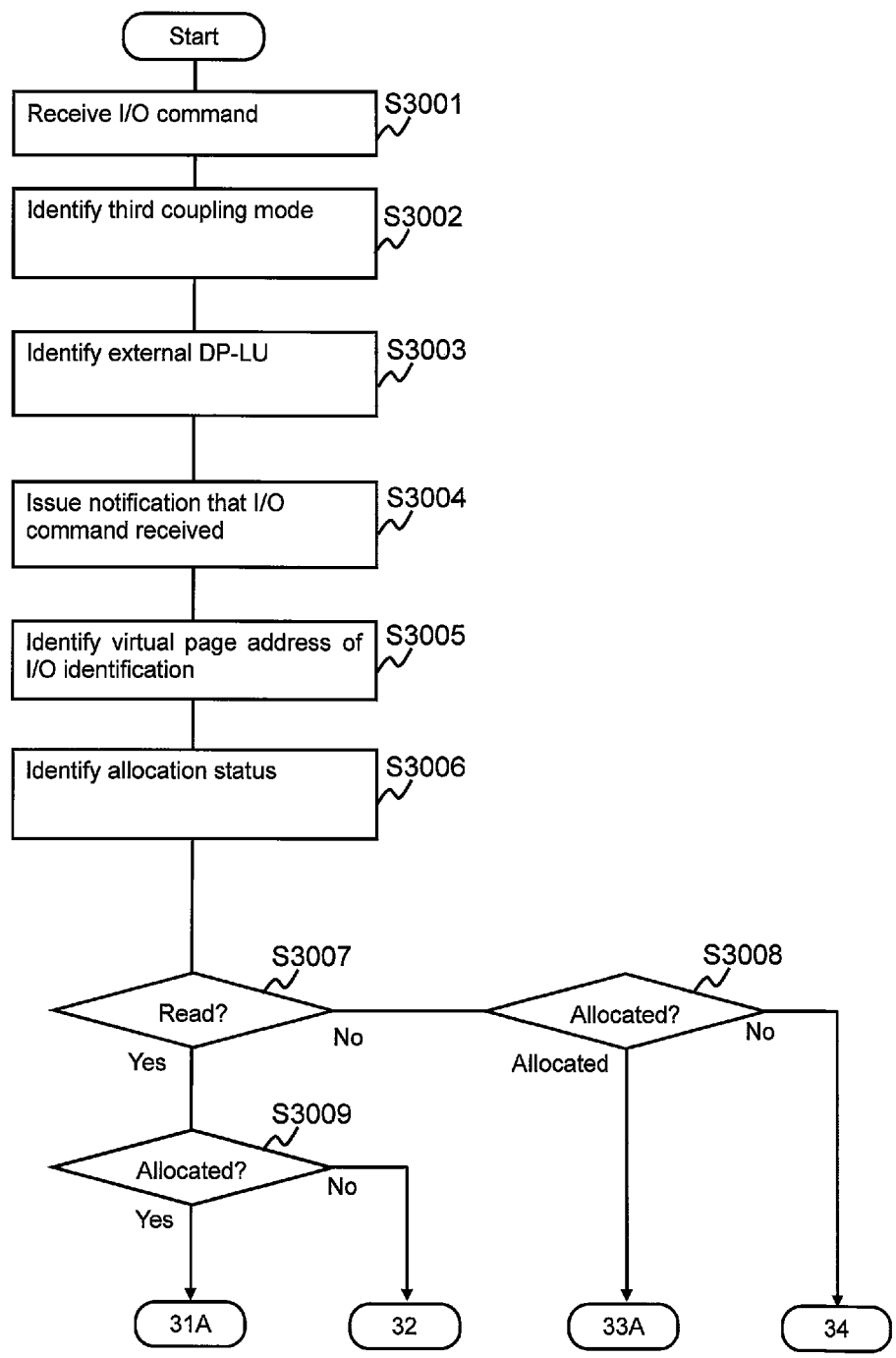
FIG. 30 shows a first part of an example of the flow of a second type of I/O command processing.

As shown in FIG. 30, in S3001, the internal controller #H0 of the HDKC #H0 (for example, F-I/F #H0) receives an I/O command from the server. The I/O command, for example, comprises a LUN "0" and an I/O-destination virtual page address as information related to the I/O-destination LU.

In S3002, the internal controller #H0 (for example, the F-I/F #H0 that received the I/O command in S3001) identifies the "third coupling mode" from the tier management table #H0 as the value of the coupling mode 1302 corresponding to the I/O-destination LU #0.

In S3003, the internal controller #H0 (for example, the F-I/F #H0 that received the I/O command in S3001) identifies the HDKC #H1 comprising the external LU #1 and this LU #1 corresponding to the LU #0 from the LU mapping table #H0.

In S3004, the internal controller #H0 (for example, the F-I/F #H0 that received the I/O command in S3001) identifies the CPU-in-charge #H00 corresponding to the LU #0 from the CPU-in-charge table #H0, and notifies the identified CPU-in-charge #H00 of the receipt of the I/O command.

In S3005, the CPU-in-charge #H00 identifies the virtual page address of the I/O destination from the above-mentioned received I/O command.

In S3006, the CPU-in-charge #H00 identifies the allocation status 1304 corresponding to the virtual page address identified in S3005 from the sub-table #H0 corresponding to the external LU #1 identified in S3003.

<<Case where I/O command received in S3001 is read command, and value of allocation status 1304 identified in S3006 is "allocated" (S3007: Yes, S3009: Yes)>>

Figure 31:
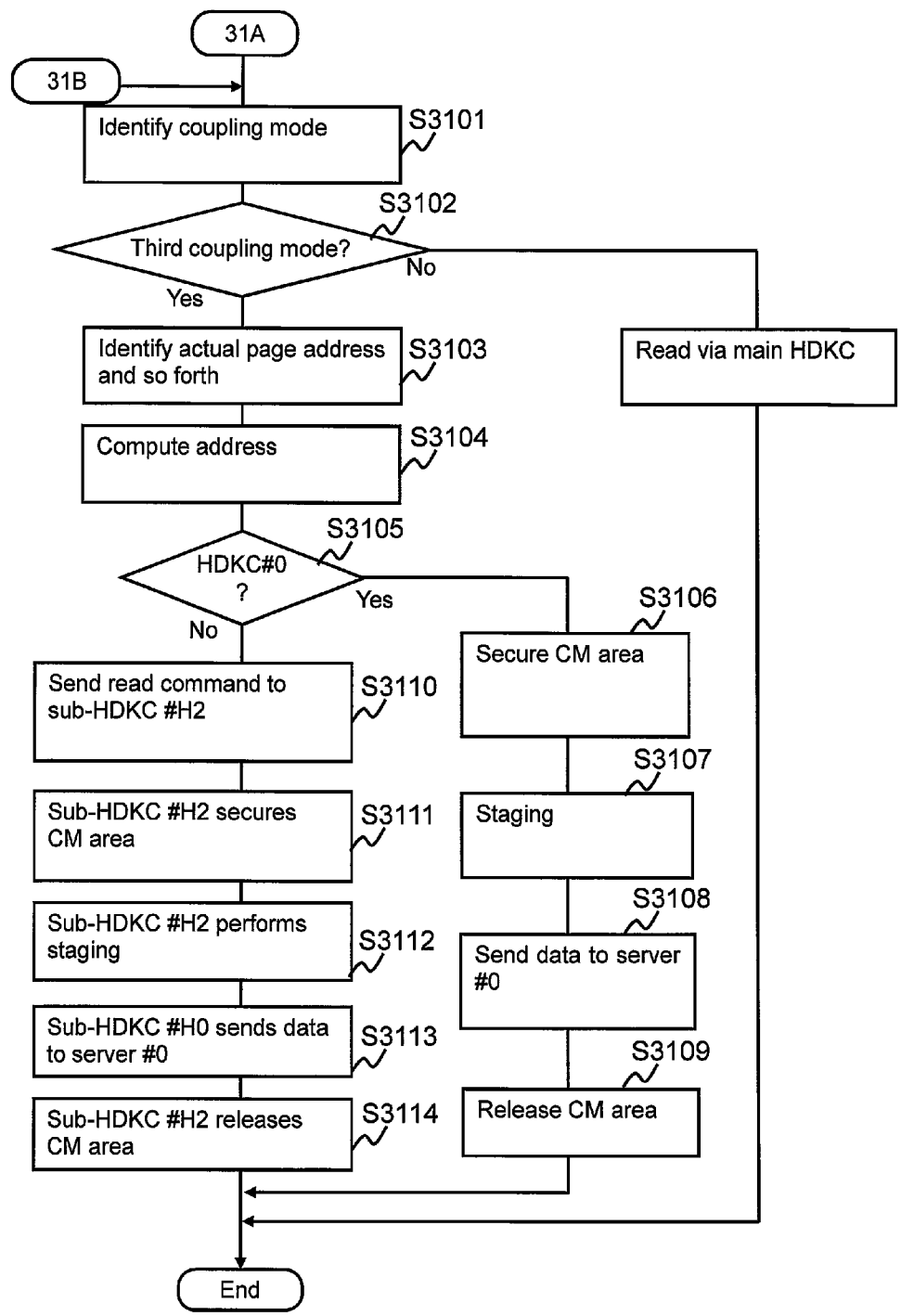
FIG. 31 shows a second part of the example of the flow of the second type of I/O command processing.

The processing of FIG. 31 is carried out.

That is, in S3101, the CPU-in-charge #H00 identifies from the sub-table #H0 the coupling mode 1905 corresponding to the virtual page address identified in S3005.

In S3102, the CPU-in-charge #H00 determines whether or not the value of the identified coupling mode 1905 is the "third coupling mode".

In a case where the result of the determination of S3102 is affirmative (S3102: Yes), in S3103, the CPU-in-charge #H00 identifies from the sub-table #H0 the DKC ID 1906, the pool LU ID 1907, and the actual page address 1908 corresponding to the virtual page address identified in S3005.

In S3104, the CPU-in-charge #H00 computes an address based on the value of the actual page address 1908 identified in S3103.

In S3105, the CPU-in-charge #H00 determines whether or not the value of the DKC ID 1906 identified in S3103 is "H0". That is, a determination is made as to whether or not the DKC in which exists the actual page entity that is allocated to the virtual page in the I/O-destination virtual LU is the HDKC #H0.

In a case where the result of the determination of S3105 is affirmative (S3105: Yes), the read-target data inside the HDKC #H0 is sent to the server #0, which is the source of the read command, without carrying out communications with the main HDKC #H1.

That is, in S3106, the CPU-in-charge #H00 secures a CM area in the CM #H0 based on the ID "Y" of the pool LU ID 1907 identified in S3103 and the address computed in S3104. In a case where this CM area has already been secured, the CPU-in-charge #H00 waits until this CM area is released.

In S3107, the CPU-in-charge #H00 reads the read-target data conforming to the address computed in S3104 from the LU #Y, and stores this data in the CM area secured in S3105.

In S3108, the CPU-in-charge #H00 sends the data stored in S3107 from the CM area to the server #0.

In S3109, the CPU-in-charge #H00 releases the CM area secured in S3105.

In a case where the result of the determination of S3105 is negative (S3105: No), communication is carried out with a sub-HDKC #H2 other than the HDKC #H0, and in accordance with this, the read-target data is read from the sub-HDKC #H2 to the HDKC #H0 without going through the main HDKC #H1, and the read-target data is sent from the HDKC #H0 to the server #0.

That is, in S3110, the CPU-in-charge #H00 sends to the sub-HDKC #H2 a read command specifying the pool LU ID "X" identified in S3103 and the address computed in S3104.

In S3111, the sub-HDKC #H2 receives the read command, and the CPU-in-charge #H20 of the pool LU ID "X" specified in this read command is identified. The CPU-in-charge #H20 secures a CM area in the CM #H2 based on the LU ID and the address specified in the read command. In a case where this CM area has already been secured, the CPU-in-charge #H20 waits for this CM area to be released.

In S3112, the CPU-in-charge #H20 reads the read-target data from the LU #X, stores this data in the CM area secured in S3111, and reports to the CPU-in-charge #H00 that the processing has been completed.

In S3113, the CPU-in-charge #H00 reads the read-target data from the HDKC #H2, sends this data to the server #0, and reports to the HDKC #H2 that the read has been completed.

In S3114, the CPU-in-charge #H20 releases the CM area secured in S3111.

In a case where the result of the determination of S3102 is negative (S3102: No), the read-target data is read from the HDKC #H1 to the HDKC #H0, and this data is sent from the HDKC #H0 to the server #0. Specifically, for example, the following processing is carried out.

(*) The CPU-in-charge #H00 sends to the main HDKC #H1 a read command specifying the external LU ID "1" corresponding to the LU #H0 and the address specified in the read command.

(*) The main HDKC #H1 receives the read command, and the CPU-in-charge #H10 of the DP-LU #1 reads data from the actual page entity (either the HDKC #H1 or the LDKC coupled thereto) allocated to the virtual page belonging to the address specified in this command, and sends the read data to the HDKC #H0.

(*) The CPU-in-charge #H00 sends the read-target data from the HDKC #H1 to the server #0.

<<Case where I/O command received in S3001 is read command, and value of allocation status 1304 identified in S3006 is "confirmation required" (S3007: Yes, S3009: No)>>

Figure 32:
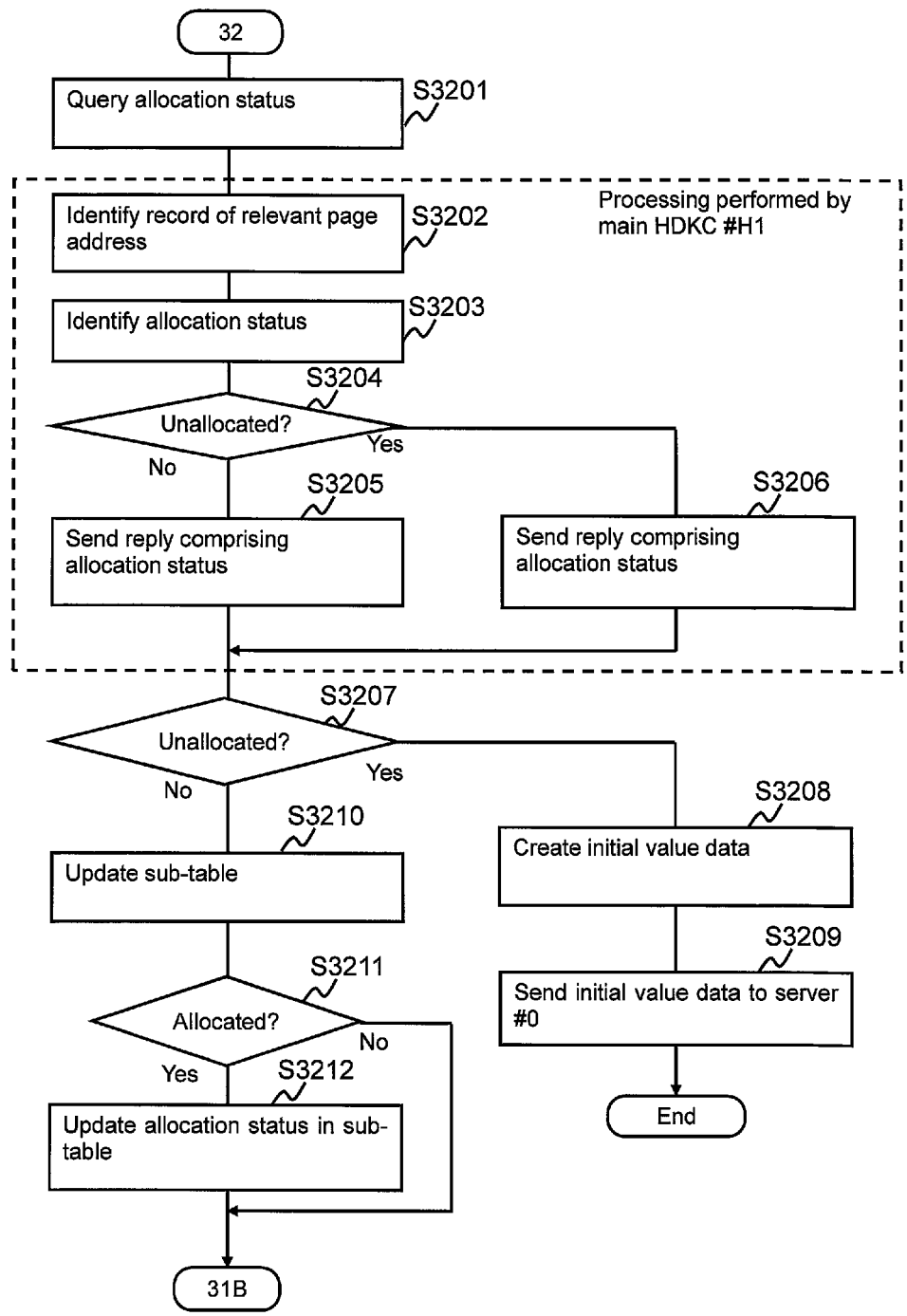
FIG. 32 shows a third part of the example of the flow of the second type of I/O command processing.

The processing of FIG. 32 is carried out.

That is, in S3201, the CPU-in-charge #H00 sends to the HDKC #H1 a query (a query comprising the external LU ID "1") with respect to the allocation status corresponding to the address of the read-source virtual page (the virtual page to which address specified in the read command belongs).

In S3202, the HDKC #H1 receives the query, and the CPU-in-charge #H10 of the external LU #1 identifies the record corresponding to the address of the read-source virtual page from the main table #H1 corresponding to the external LU #1.

In S3203, the CPU-in-charge #H10 identifies the allocation status 1203 from the record identified in S3202.

In S3204, the CPU-in-charge #H10 determines whether or not the value of the allocation status 1203 identified in S3203 is unallocated.

In a case where the result of the determination of S3204 is negative (a case in which the value of the allocation status 1203 is either "allocated" or "releasing") (S3204: No), in S3205, the CPU-in-charge #H10 identifies from the LU mapping table #H1 the DKC ID 1502 and the external LU ID 1503 corresponding to the value of the pool LU ID 1204 in the record identified in S3202. The CPU-in-charge #H10 sends information comprising the following information elements to the HDKC #H0:

(*) Allocation status either "allocated" or "releasing"; and
(*) values of both the identified DKC ID 1502 and the external LU ID 1503.

In a case where the result of the determination of S3204 is affirmative (S3204: Yes), in S3206, the CPU-in-charge #H10 sends information comprising the allocation status "unallocated" to the HDKC #H0.

In S3207, the HDKC #H0 receives the information that was sent in either S3205 or S3206, and the CPU-in-charge #H00 determines whether or not the allocation status included in the received information is "unallocated".

In a case where the result of the determination of S3207 is affirmative (S3207: Yes), the CPU-in-charge #H00 creates initial value data in the CM #H0 (the initial value data may exist in a prescribed storage area in the HDKC #H0).

In S3208, the CPU-in-charge #H00 sends the initial value data created in S3207 to the server #0.

In a case where the result of the determination of S3207 is negative (a case in which the allocation status included in the received information is either "allocated" or "releasing") (S3207: No), in S3210, the CPU-in-charge #H00 updates the sub-table #H0 corresponding to the LU #1 as follows.

(*) The CPU-in-charge #H00 registers the DKC ID included in the received information as the value of the DKC ID 1906 corresponding to the read-source virtual page.

(*) The CPU-in-charge #H00 registers the external LU ID included in the received information as the value of the pool LU ID 1907 corresponding to the read-source virtual page.

In S3211, the CPU-in-charge #H00 determines whether or not the allocation status included in the above-mentioned received information is "allocated".

In a case where the result of the determination of S3211 is affirmative (S3211: Yes), in S3212, the CPU-in-charge #H00 registers "allocated" as the value of the allocation status 1904 in the record corresponding to the read-source virtual page in the sub-table #H0 corresponding to the LU #1.

In a case where the result of the determination of S3211 is negative (a case in which the allocation status included in the received information is "releasing") (S3211: No), S3212 is skipped. That is, the value of the allocation status 1904 corresponding to the read-source virtual page in the sub-table #H0 corresponding to the LU #1 is not changed.

S3101 of FIG. 31 is carried out either in the case where S3211 is No or subsequent to S3212.

<<Case where I/O command received in S3001 is write command, and value of allocation status 1304 identified in S3006 is "allocated" (S3007: No, S3008: Yes)>>

Figure 33:
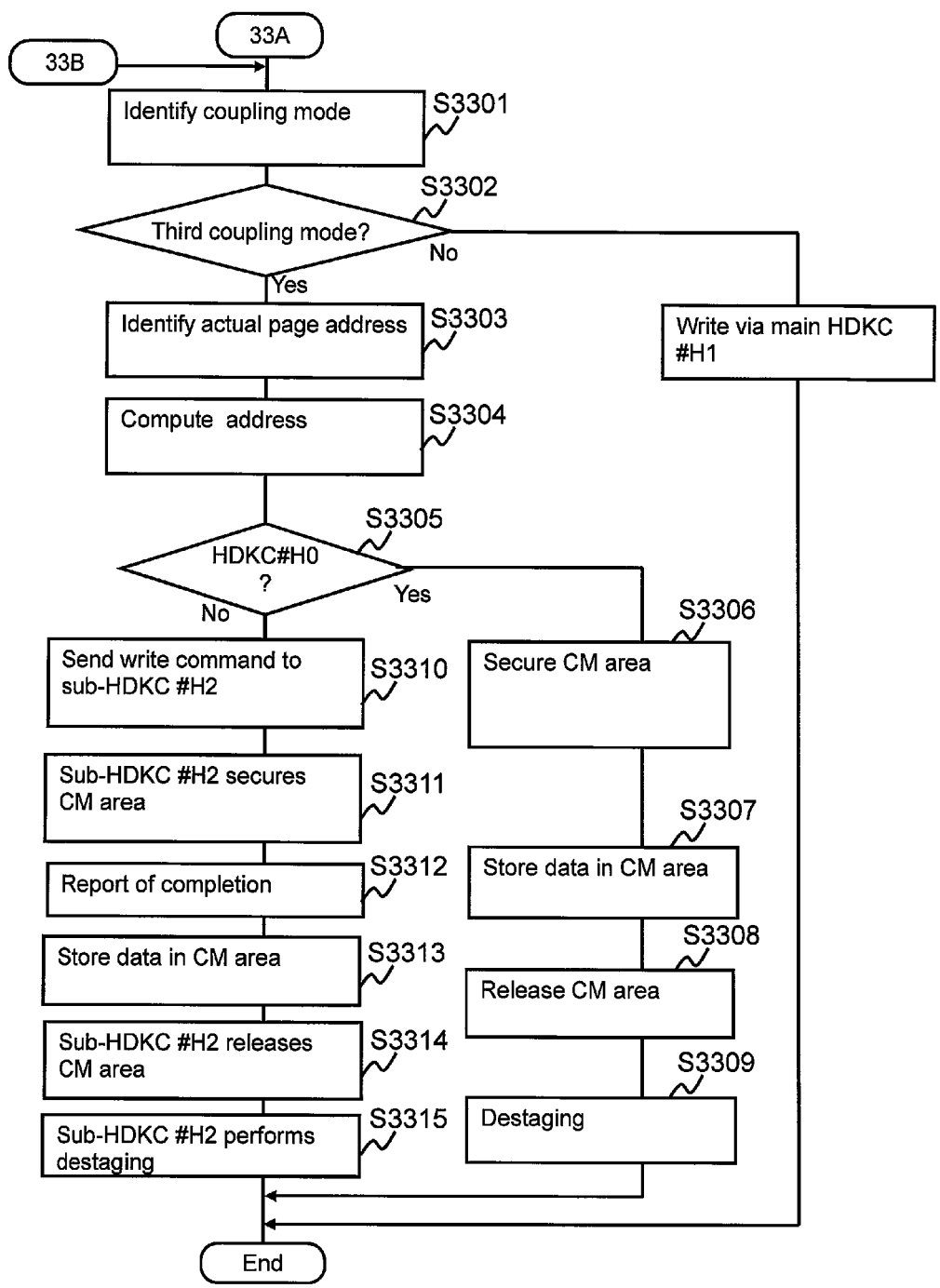
FIG. 33 shows a fourth part of the example of the flow of the second type of I/O command processing.

The processing of FIG. 33 is carried out.

That is, in S3301, the CPU-in-charge #H00 identifies the coupling mode 1905 corresponding to the virtual page (the write-destination virtual page) to which the address identified in S3005 belongs from the sub-table #H0 corresponding to the LU #1.

In S3302, the CPU-in-charge #H00 determines whether or not the value of the coupling mode 1905 identified in S3301 is the "third coupling mode".

In a case where the result of the determination of S3302 is affirmative (S3302: Yes), in S3303, the CPU-in-charge #H00 identifies from the sub-table #H1 the DKC ID 1906, the pool LU ID 1907, and the actual page address 1908 corresponding to the write-target virtual page.

In S3304, the CPU-in-charge #H00 computes an address based on the value of the actual page address 1908 identified in S3303.

In S3305, the CPU-in-charge #H00 determines whether or not the value of the DKC ID 1906 identified in S3303 is "H0".

In a case where the result of the determination of S3305 is affirmative (S3305: Yes), write-target data conforming to the write command received by the sub-HDKC #H0 is written to the LU #Y in the sub-HDKC #H0 without the sub-HDKC #H0 communicating with the main HDKC #H1.

That is, in S3306, the CPU-in-charge #H00 secures a CM area in the CM #H0 based on the value "Y" of the pool LU ID 1907 identified in S3303 and the address computed in S3304. In a case where this CM area has already been secured, the CPU-in-charge #H00 waits until this CM area is released.

In S3307, the CPU-in-charge #H00 stores the above-mentioned write-target data in the CM area secured in S3306, and reports to the server #0 that the processing has been completed.

In S3308, the CPU-in-charge #H00 releases the CM area secured in S3306.

In S3309, the CPU-in-charge #H00 writes the data stored in S3307 from the CM #H0 to the LU #Y.

In a case where the result of the determination of S3305 is negative (S3305: No), the write-target data conforming to the write command received by the sub-HDKC #H0 is written to the LU (for example, #X) inside another sub-HDKC (for example, #H2) without the sub-HDKC #H0 communicating with the main HDKC #H1.

That is, in S3310, the CPU-in-charge #H00 sends the write command specifying the LU ID "X" and the address computed in S3304 to the sub-HDKC #H2.

In S3311, the HDKC #H2 receives the write command, and the CPU-in-charge #H20 of the LU #X secures a CM area in the CM #H2 based on the LU ID and the address specified in the write command. In a case where this CM area has already been secured, the CPU-in-charge #H20 waits for this CM area to be released.

In S3312, the CPU-in-charge #H20 reports to the HDKC #H0 that the processing has been completed.

In S3313, the CPU-in-charge #H00 stores the write-target data from the server #0 in the above-mentioned CM area secured in the CM #H2, and reports to the server #0 and to the HDKC #H2 that the processing has been completed.

In S3314, the CPU-in-charge #H20 releases the CM area secured in S3311.

In S3315, the CPU-in-charge #H20 writes the data stored in S3313 from the CM #H2 to the LU #X. Furthermore, the writing of the data from the CM to the LU is carried out asynchronously with respect to the second type (and the first type) of I/O command processing.

In a case where the result of the determination of S3302 is negative (S3302: No), the write-target data is written from the sub-HDKC #H0 to the LU inside the HDKC #H0 (or the LDKC coupled thereto) via the main HDKC #H1. Specifically, for example, the following processing is carried out.

(*) The CPU-in-charge #H00 sends a write command specifying the external LU ID "1" corresponding to the LU #H0 and the address specified in the write command to the main HDKC #H1.

(*) The main HDKC #H1 receives the write command, and the CPU-in-charge #H10 of the DP-LU #1 writes the write-target data to the actual page entity (either the HDKC #H1 or the LDKC coupled thereto) allocated to the virtual page belonging to the address specified in this command.

<<Case where I/O command received in S3001 is write command, and value of allocation status 1304 identified in S3006 is "confirmation required" (S3007: No, S3008: No)>>

Figure 34:
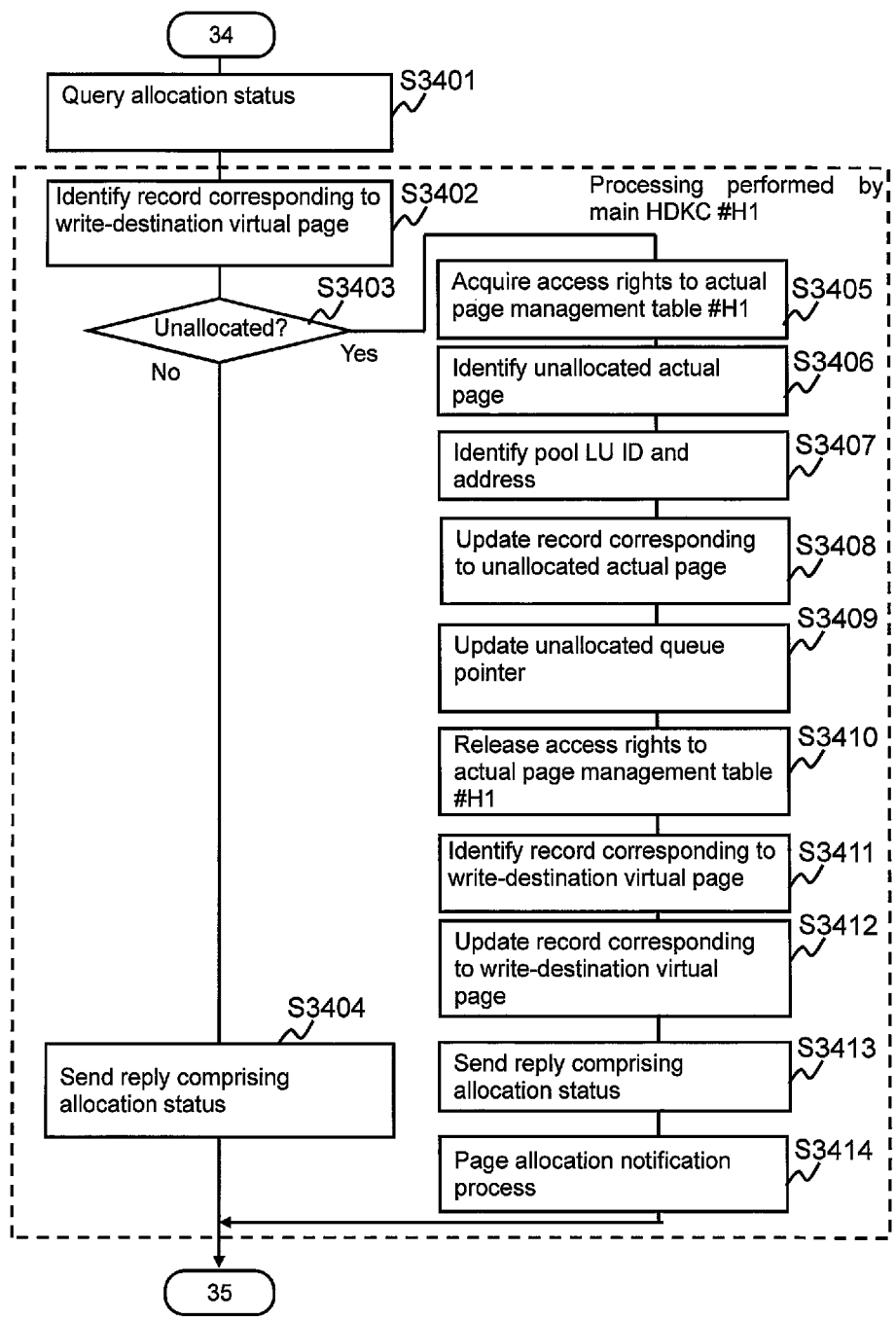
FIG. 34 shows a fifth part of the example of the flow of the second type of I/O command processing.

The processing of FIG. 34 is carried out.

In S3401, the CPU-in-charge #H00 sends to the main HDKC #H1 a query (a query comprising the external LU ID "1") with respect to the allocation status corresponding to the address of the write-source virtual page.

In S3402, the main HDKC #H1 receives the query of S3401, and identifies the allocation status 1203 corresponding to write-source virtual page from the main table #H1 corresponding to the LU #1.

In S3403, the CPU-in-charge #H00 determines whether or not the value of the allocation status 1203 identified in S3402 is "unallocated".

In a case where the result of the determination of S3403 is negative (a case in which the value of the allocation status 1203 identified in S3402 is either "allocated" or "releasing") (S3403: No), in S3404, from the LU mapping table #H1, the CPU-in-charge #H10 identifies the pool LU ID 1204 corresponding to write-source virtual page, and identifies the DKC ID 1502 and the external LU ID 1503 corresponding to the value of this pool LU ID 1204. The CPU-in-charge #H10 configures the following information elements in response information, and sends the response information in which the following information elements have been configured to the HDKC #H0:

(*) Allocation status either "allocated" or "releasing"; and
(*) values of both the DKC ID 1502 and the external LU ID 1503 identified in S3404.

In a case where the result of the determination of S3403 is affirmative (S3403: Yes), in S3405, the CPU-in-charge #H10 acquires the rights for accessing the actual page management table #H1.

In S3406, the CPU-in-charge #H10 identifies the table pointer corresponding to an unallocated actual page from the first-page pointer of the queue management table #H1.

In S3407, the CPU-in-charge #H10 identifies the record in the actual page management table #H1 that corresponds to the table pointer identified in S3406, and identifies the pool LU ID 2002 and the actual page address 2003 from this record.

In S3408, the CPU-in-charge #H10 updates the actual page management table #H1. Specifically, for example, the CPU-in-charge #H10 carries out the following processing:

(*) updates the allocation status 2004 in the record identified in S3407 to "allocated"; and
(*) updates the DP-LU ID 2005 in the record identified in S3407 to "1" (the ID of the DP-LU #1).

In S3409, the CPU-in-charge #H10 updates the actual page management table #H1 and the queue management table #H1. Specifically, for example, the CPU-in-charge #H10 carries out the following processing:

(*) copies the unallocated queue pointer 2006 in the record identified in S3407 to the first-page pointer of the queue management table #H1; and
(*) updates the unallocated queue pointer 2006 in the record identified in S3407 to the NULL value "-".

In S3410, the CPU-in-charge #H10 releases the access rights acquired in S3405.

In S3411, the CPU-in-charge #H10 identifies the record corresponding to the write-destination virtual page address in the main table #H1.

In S3412, the CPU-in-charge #H10 updates the main table #H1. Specifically, for example, the CPU-in-charge #H10 carries out the following processing:

(*) updates the allocation status 1203 in the record identified in S3411 to "allocated";
(*) updates the pool LU ID 1204 in the record identified in S3411 to an ID that matches the pool LU ID 2002 identified in S3407; and
(*) updates the actual page address 1205 in the record identified in S3411 to an address that matches the actual page address 2003 identified in S3407.

In S3413, the CPU-in-charge #H10 identifies from the LU mapping table #H1 the DKC ID 1502 and the external LU ID 1503 corresponding to the value of the pool LU ID 1204 in the record identified in S3411. The CPU-in-charge #H10 configures the following information elements in response information, and sends the response information in which the following information elements have been configured to the HDKC #H0:

(*) allocation status either "allocated" or "releasing"; and
(*) values of both the DKC ID 1502 and the external LU ID 1503 identified in S3413.

In S3414, the CPU-in-charge #H10 may start a page allocation notification process shown in FIG. 29. The CPU-in-charge #H10 may start S3501 of FIG. 35 without waiting for this processing to end. Furthermore, in this second type of I/O command processing (for example, between S3413 and S3501 of FIG. 35), the page allocation notification process does not need to be carried out. For example, the page allocation notification process may be carried out at a timing that is unrelated to the second type of I/O command processing (as one example, the page allocation notification process may be carried out on a regular basis). However, as in S3413, it is considered preferable that the page allocation notification process be carried out at the time the virtual page allocation status 1203 is updated. This is because, in a case where the sub-HDKCs #H0 and #H2 receive an I/O command that specifies an address belonging to a virtual LU, queries have to be sent from the sub-HDKCs #H0 and #H2 to the main HDKC #H1 when the allocation status of the virtual page (the I/O-destination virtual page) to which this address belongs is "confirmation required". In other words, this is because in a case where the allocation status of the I/O-destination virtual page is changed from "confirmation required" to "allocated" even a little early in the sub-HDKCs #H0 and #H2, the queries from the sub-HDKCs #H0 and #H2 to the main HDKC #H1 become unnecessary, thereby making it possible to shorten the time required to process the I/O command received by the sub-HDKCs #H0 and #H2.

Figure 35:
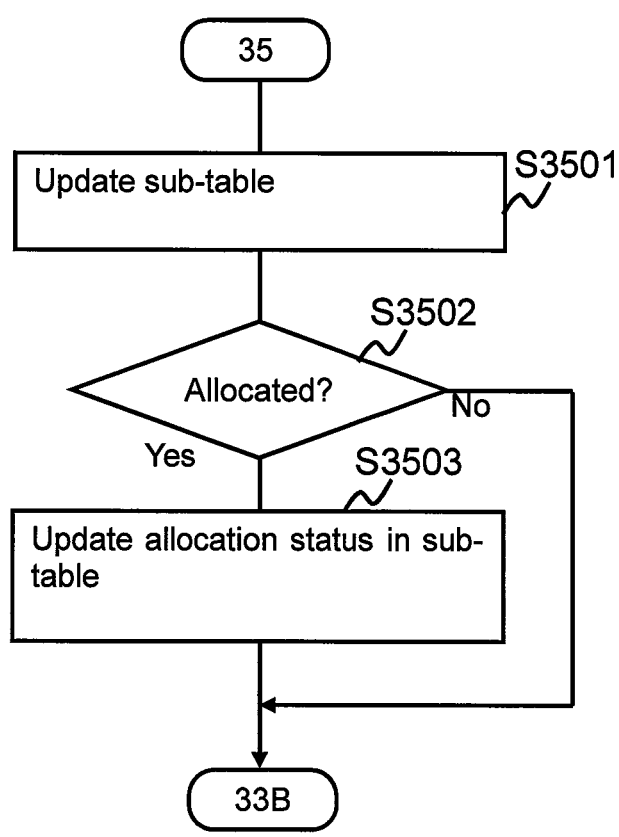
FIG. 35 shows a sixth part of the example of the flow of the second type of I/O command processing.

Subsequent to either S3404 or S3414, as shown in FIG. 35, in S3501, the sub-HDKC #H0 receives the response information from the main HDKC #H1, and the CPU-in-charge #H00 registers the DKC ID and the LU ID included in the received response information as the DKC ID 1906 and the pool LU ID 1907 in the record corresponding to the write-destination virtual page in the sub-table #H0 corresponding to the LU #1.

In S3502, the CPU-in-charge #H00 determines whether or not the allocation status included in the response information received in S3501 is "allocated".

In a case where the result of the determination of S3502 is affirmative, the CPU-in-charge #H00 registers "allocated" as the value of the allocation status 1904 corresponding to the write-destination virtual page in the sub-table #H0.

In a case where the result of the determination of S3503 is negative (a case in which the allocation status included in the received information is "releasing") (S3503: No), S3503 is skipped. That is, the value of the allocation status 1940 corresponding to the write-source virtual page in the sub-table #H0 corresponding to the LU #1 is not changed.

S3301 of FIG. 33 is carried out either in the case where S3502 is No or subsequent to S3503.

<Allocated-Page Release Process>

Figure 36:
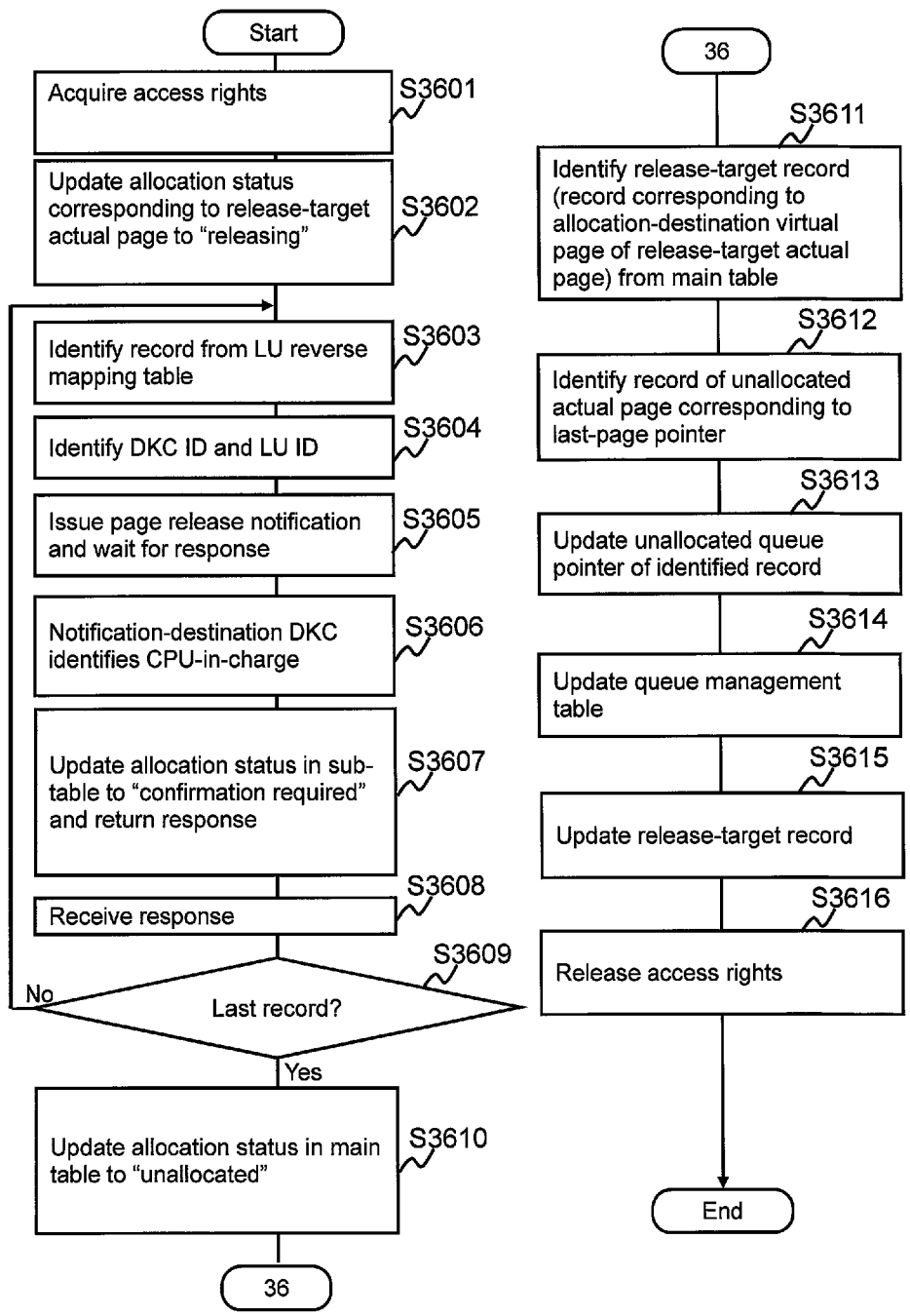
FIG. 36 shows an example of the flow of allocated-page release processing.

FIG. 36 shows the flow of an allocated-page release process. This process will be explained below by giving the release of an actual page allocated to the DP-LU #1 as an example.

For this process, for example, a release instruction comprising the address of the release-target virtual page and the ID "1" of the DP-LU comprising this virtual page are inputted. This release instruction, for example, may be inputted from the management apparatus of the HDKC #H1, or may be inputted to a page release program in the HDKC #H1 (a program that executes the allocated-page release process in accordance with being executed by the CPU) from a program in the HDKC #H1 that received a DP-LU #1 unmount instruction. There may be multiple release-target virtual pages, but in order to make the explanation easier to understand, it is supposed that there is one release-target virtual page.

In S3601, the CPU-in-charge #H10 of the LU #1 acquires access rights to the actual page management table #H1.

In S3602, the CPU-in-charge #H10 updates the value of the allocation status 1203 corresponding to the inputted virtual page address to "releasing" in the main table #H1 corresponding to the LU #1.

In S3603, the CPU-in-charge #H10 identifies the record comprising the ID of LU #1 as the external LU ID 1701 from the LU reverse mapping table #H1 (for example, by searching from the first record to the last record of the LU reverse mapping table #H1).

In S3604, the CPU-in-charge #H10 identifies the DKC ID 1702 and the LU ID 1703 from the record identified in S3603.

In S3605, the CPU-in-charge #H10 sends a release notification comprising the following information to the sub-HDKC corresponding to the value of the DKC ID 1702 identified in S3604:

(*) value of the LU ID 1703 identified in S3604 (virtual LU ID);
(*) LU #1 DP-LU ID (LU ID specified in the above-mentioned release instruction); and
(*) address of release-target virtual page (virtual page address specified in above-mentioned release instruction).

In S3606, in the sub-HDKC that receives the release notification, the CPU-in-charge of the virtual LU specified by this notification is identified from the CPU-in-charge table in this sub-HDKC.

In S3607, the CPU-in-charge identified in S3606 identifies the allocation status 1904 of the virtual page address specified in the release notification from the sub-tables corresponding to the release notification source HDKC #H1 and the DP-LU #1 specified in the release notification. This CPU-in-charge changes the value of this allocation status 1904 to "confirmation required" and sends response information comprising this allocation status "confirmation required" to the main HDKC #H1.

In S3608, the CPU-in-charge #H10 receives response information from the sub-HDKC.

In S3609, the CPU-in-charge #H10 determines whether or not the LU reverse mapping table #H1 has been searched down to the last page. In a case where the result of this determination is negative (S3609: No), S3603 is carried out once again.

In a case where the result of the determination of S3609 is affirmative (S3609: Yes), in S3610, the CPU-in-charge #H10 identifies the pool LU ID 1204 and the actual page address 1205 corresponding to the address of the above-mentioned release-target virtual page from the main table #H1 corresponding to the LU #1, and, in addition, updates the value of the allocation status 1203 corresponding to the above-mentioned address of one or more release-target virtual pages to "unallocated".

In S3611, the CPU-in-charge #H10 identifies from the actual page management table #H1 the record (hereinafter, the release-target record) corresponding to the values of both the pool LU ID 1204 and the actual page address 1205 identified in S3610.

In S3612, the CPU-in-charge #H10 identifies the table pointer denoted by the last-page pointer of the queue management table #H1.

In S3613, the CPU-in-charge #H10 registers the value of the table pointer 2001 of the release-target record as the unallocated queue pointer 2006 in the record corresponding to the table pointer identified in S3612 in the actual page management table #H1.

In S3614, the CPU-in-charge #H10 registers the value of the table pointer 2001 of the release-target record as the last-page pointer in the actual page management table #H1.

In S3615, the CPU-in-charge #H10 registers "unallocated" as the allocation status 2004 in the release-target record, and registers "-" (NULL value) as the value of the DP-LU ID 2005.

In S3616, the CPU-in-charge #H10 releases the access rights to the actual page management table #H1.

In a case where there is multiple release-target virtual pages for the DP-LU #1, S3610 through S3615 are carried out for each release-target virtual page.

The embodiment of the present invention has been explained hereinabove, but it goes without saying that the present invention is not limited to this embodiment and that various changes can be made without departing from the scope thereof.

REFERENCE SIGNS LIST

110 Storage system

The invention claimed is:

1. A storage system comprising multiple storage control apparatus units comprising first and second storage control apparatus units, wherein:

each storage control apparatus unit comprises one or more storage control apparatuses that are coupled to one or more hosts;

the first storage control apparatus unit comprises a first logical volume, and a pool, which is a storage area that comprises multiple actual areas and is associated with the first logical volume;

the pool comprises a fourth logical volume comprising two or more actual areas;

the fourth logical volume is a virtual logical volume to which the third logical volume is mapped;

the second storage control apparatus unit comprises a second logical volume, which is a virtual logical volume that is mapped to the first logical volume, and a third logical volume that is associated with the first logical volume;

(A) the second storage control apparatus unit receives, from the host, an I/O command which comprises information including, as information denoting an I/O-destination area, an ID of the second logical volume and an address of an area of the second logical volume;

(B) the second storage control apparatus unit identifies a logical volume including an area that serves as an entity of the I/O-destination area and a storage control apparatus unit that comprises this logical volume;

(C) in a case where the second storage control apparatus unit identifies the third logical volume and the second storage control apparatus unit in carrying out the (B), the second storage control apparatus unit carries out an I/O with respect to the area that serves as the entity of the I/O-destination area in the third logical volume;

wherein the first logical volume is a virtual logical volume that conforms to thin provisioning and comprises multiple virtual areas;

in a case where an actual area inside the fourth logical volume is allocated to a virtual area corresponding to the I/O-destination area, the second storage control apparatus unit identifies the logical volume including the area serving as the entity of the I/O-destination area in carrying out the (B) which is an area inside the third logical volume that corresponds to an actual area allocated to the virtual area corresponding to the I/O-destination area;

the first and second storage control apparatus units respectively manage an allocation status for each virtual area configuring the first logical volume;

the first storage control apparatus unit sends notification information comprising an allocation status corresponding to a certain virtual area in the first logical volume to the second storage control apparatus unit, and the second storage control apparatus unit receives this notification information and changes the allocation status corresponding to the certain virtual area to the allocation status denoted by the notification information;

in the (B) wherein the second storage control apparatus unit identifies the logical volume including the area that serves as the entity of the I/O-destination area and the storage control apparatus unit that comprises this logical volume, in a case where the second storage control apparatus unit does not manage an allocation status that signifies an actual area has been allocated as the allocation status of the virtual area corresponding to the I/O-destination area, the second storage control apparatus unit sends, to the first storage control apparatus unit, an query of the status allocation of the virtual area corresponding to the I/O-destination area, and receives a reply of the allocation status of the virtual area corresponding to the I/O-destination area, from the first storage control apparatus unit as the notification information in response to this query; and in a case where the reply received by the second storage control apparatus unit comprises an allocation status that signifies allocated, and where the second storage control apparatus unit identifies the third logical volume and the second storage control apparatus in carrying out the (B), the (C) is carried out.

2. A storage system according to claim 1, wherein the second storage control apparatus unit comprises area management information denoting a correspondence between an actual area allocated to a certain virtual area configuring the first logical volume, and a certain area in a certain logical volume in a certain storage control apparatus unit, and in carrying out the (B), the second storage control apparatus unit identifies, based on the area management information, the logical volume including the area that serves as the entity of the I/O-destination area and the storage control apparatus unit comprising this logical volume.

3. A storage system according to claim 2, wherein the first storage control apparatus unit comprises virtual area management information denoting an allocation of a certain actual area in a certain logical volume to a certain virtual area configuring the first logical volume, and mapping management information denoting a mapping of a certain volume in a certain storage control apparatus unit to a certain logical volume in the first storage control apparatus unit, and the area management information is created based on information of the virtual area management information and information of the mapping management information.

4. A storage system according to claim 3, wherein the area management information is created when the first logical volume is mapped to the second logical volume.

5. A storage system according to claim 1, wherein in a case where the I/O command is a write command, and the first storage control apparatus unit manages, when receiving the query, an allocation status that signifies an actual area is not allocated as the allocation status of the virtual area corresponding to the I/O-destination area, the first storage control apparatus unit allocates an unallocated actual area inside the pool to the virtual area corresponding to the I/O-destination area, manages an allocation status that signifies allocated as the allocation status of this virtual area, and at this time sends, to the second storage control apparatus unit, notification information including a fact that an allocation status of this virtual area is in an allocation status signifying allocated.

6. A storage system according to claim 1, wherein the first storage control apparatus unit regularly sends notification information including an allocation status of a virtual area to the second storage control apparatus unit.

7. A storage system according to claim 1, wherein the first storage control apparatus unit, in a case where an actual area that has been allocated to a virtual area is to be released from this virtual area, manages an allocation status that signifies releasing as the allocation status of this virtual area, and in a case where the reply includes an allocation status that signifies allocated, the second storage control apparatus unit changes the allocation status of the virtual area corresponding to the I/O-destination area to the allocation status signifying allocated, and in a case where the reply includes an allocation status that signifies releasing, does not change the allocation status of the virtual area corresponding to the I/O-destination area to the allocation status signifying allocated.

8. A storage system according to claim 7, wherein the second storage control apparatus unit sends, to the first storage control apparatus unit, information denoting that the first logical volume is mapped to the second logical volume, and based on this information, the first storage control apparatus unit creates reverse mapping management information denoting that the first logical volume is mapped to the second logical volume inside the second storage control apparatus unit, and comprises this reverse mapping management information, and in a case where the first storage control apparatus unit changes an allocation status of a virtual area to the allocation status that signifies releasing, the first storage control apparatus unit identifies, from the reverse mapping management information, the second storage control apparatus unit comprising the second logical volume to which the first logical volume that comprises this virtual area is mapped, sends information comprising the address of the virtual area whose allocation status is releasing to the second storage control apparatus unit as the notification information, and the second storage control apparatus unit changes the allocation status corresponding to the virtual area that conforms to this notification information to an allocation status different from the allocation status that signifies allocated.

9. A storage system according to claim 1, wherein the multiple storage control apparatus units comprise a third storage control apparatus unit, the pool comprises a fifth logical volume, which comprises two or more actual areas and is a virtual logical volume, the third storage control apparatus unit comprises a sixth logical volume that is mapped to the fifth logical volume, and in a case where an actual area inside the fifth logical volume is allocated to the virtual area corresponding to the I/O-destination area, the second storage control apparatus unit identifies the logical volume including the area serving as the entity of the I/O-destination area in carrying out the (B) which is an area inside the sixth logical volume, which corresponds to the actual area that is allocated to the virtual area corresponding to the I/O-destination area, and the second storage control apparatus identifies the third storage control apparatus unit and the sixth logical volume in accordance with this in carrying out the (B), whereby the second storage control apparatus unit carries out the I/O with respect to the area serving as the entity of the I/O-destination area in the sixth logical volume.

10. A storage system according to claim 1, wherein, in the (B) wherein the second storage control apparatus unit identifies the logical volume including the area that serves as the entity of the I/O-destination area and the storage control apparatus unit that comprises this logical volume, the second storage control apparatus unit sends a query with respect to the logical volume that comprises the area serving as the entity of the I/O-destination area and the storage control apparatus unit comprising this logical volume, to the first storage control apparatus unit comprising the first logical volume that is mapped to the second logical volume, and based on a reply received in response to this query, identifies the logical volume that comprises the area serving as the entity of the I/O-destination area and the storage control apparatus unit comprising this logical volume.

11. A storage system according to claim 1, wherein the multiple storage control apparatus units comprise multiple thin provisioning volumes, which are virtual logical volumes that conform to thin provisioning, and for each of the thin provisioning volumes, the storage control apparatus unit comprising the thin provisioning volume is the first storage control apparatus unit, and this thin provisioning volume is the first logical volume.

* * * * *